United States Patent
Ashihara et al.

(10) Patent No.: US 9,361,149 B2
(45) Date of Patent: Jun. 7, 2016

(54) COMPUTER SYSTEM AND MAINTENANCE METHOD OF COMPUTER SYSTEM

(75) Inventors: Koji Ashihara, Tokyo (JP); Junichi Yamato, Tokyo (JP)

(73) Assignee: NEC CORPORATION, Tokyo (JP)

(*) Notice: Subject to any disclaimer, the term of this patent is extended or adjusted under 35 U.S.C. 154(b) by 32 days.

(21) Appl. No.: 13/500,577

(22) PCT Filed: Oct. 1, 2010

(86) PCT No.: PCT/JP2010/067277
§ 371 (c)(1),
(2), (4) Date: Apr. 5, 2012

(87) PCT Pub. No.: WO2011/043270
PCT Pub. Date: Apr. 14, 2011

(65) Prior Publication Data
US 2012/0195187 A1    Aug. 2, 2012

(30) Foreign Application Priority Data
Oct. 7, 2009    (JP) ................. 2009-233095

(51) Int. Cl.
*G06F 11/00* (2006.01)
*G06F 9/46* (2006.01)
(Continued)

(52) U.S. Cl.
CPC  *G06F 9/46* (2013.01); *G06F 11/00* (2013.01); *G06F 11/20* (2013.01); *G06Q 50/00* (2013.01); *H04L 12/24* (2013.01); *H04L 12/46* (2013.01); *H04L 12/56* (2013.01); *H04L 61/103* (2013.01)

(58) Field of Classification Search
CPC ......... H04L 12/24; H04L 12/28; H04L 12/56; H04L 9/00; G06F 11/20; G06F 15/173; G06F 9/755

USPC ......... 370/352, 254, 235, 389, 220, 217, 216, 370/225, 255, 392; 709/227, 224, 223, 221, 709/218, 220, 203; 707/823; 711/114, 161, 711/162, 165, 170
See application file for complete search history.

(56) References Cited

U.S. PATENT DOCUMENTS 7,107,329 B1    9/2006  Schroder et al.
7,484,208 B1    1/2009  Nelson
(Continued)

FOREIGN PATENT DOCUMENTS

CN    1725182 A    1/2006
JP    2003-500928 A    1/2003
(Continued)

OTHER PUBLICATIONS

International Search Report in PCT/JP2010/067277 dated Dec. 7, 2010 (English Translation Thereof).
(Continued)

*Primary Examiner* — Bob Phunkulh
*Assistant Examiner* — Wali Butt
(74) *Attorney, Agent, or Firm* — McGinn IP Law Group, PLLC.

(57) ABSTRACT

A computer system of the present invention is provided with a switch for transferring a received packet data to a destination according to a flow set to itself, an integrated management apparatus which specifies a maintenance object unit and a controller. The controller separates the maintenance object unit from the computer system by controlling the setting or deletion of the flow to the switch. Thus, the maintenance processing of the computer system can be performed without stopping the function by controlling the side of the network and the side of the computer integratedly.

18 Claims, 36 Drawing Sheets

(51) Int. Cl.
*G06F 11/20* (2006.01)
*G06Q 50/00* (2012.01)
*H04L 12/24* (2006.01)
*H04L 12/46* (2006.01)
*H04L 12/54* (2013.01)
*H04L 29/12* (2006.01)

(56) References Cited

U.S. PATENT DOCUMENTS

| | | | |
|---|---|---|---|
| 8,054,832 B1* | 11/2011 | Shukla et al. | 370/389 |
| 8,078,690 B2* | 12/2011 | Shimozono et al. | 709/218 |
| 2004/0062195 A1* | 4/2004 | Mishra et al. | 370/217 |
| 2006/0020943 A1 | 1/2006 | Boutcher et al. | |
| 2006/0224751 A1 | 10/2006 | Kuwata | |
| 2007/0244999 A1* | 10/2007 | Hamanaka et al. | 709/220 |
| 2008/0049621 A1 | 2/2008 | McGuire et al. | |
| 2008/0101345 A1 | 5/2008 | Suzuki | |
| 2008/0104606 A1 | 5/2008 | Boutcher et al. | |
| 2008/0178191 A1 | 7/2008 | Boutcher et al. | |
| 2009/0138577 A1* | 5/2009 | Casado et al. | 709/220 |
| 2009/0157846 A1 | 6/2009 | Shimozono et al. | |
| 2009/0240790 A1* | 9/2009 | Utsunomiya et al. | 709/221 |
| 2010/0054129 A1* | 3/2010 | Kuik et al. | 370/235 |
| 2012/0060010 A1 | 3/2012 | Shimozono et al. | |

FOREIGN PATENT DOCUMENTS

| | | |
|---|---|---|
| JP | 2006-040280 A | 2/2006 |
| JP | 2006-285597 A | 10/2006 |
| JP | 2007-304845 A | 11/2007 |
| JP | 2008-118236 A | 5/2008 |
| JP | 2008-217201 A | 9/2008 |
| JP | 2008217201 A * | 9/2008 |
| JP | 2009-146106 A | 7/2009 |
| WO | WO2006/040810 A1 | 4/2006 |
| WO | EP 1832976 A1 | 9/2007 |

OTHER PUBLICATIONS

Chinese Office Action dated Apr. 3, 2014 with partial English translation.

Japanese Office Action dated Nov. 20, 2013, with English translation.

Nikhil Handigol et al., Plug-n-Serve: Load-Balancing Web Traffic Using OpenFlow, SIGCOMM 2009, Aug. 21, 2009, URL: http://conferences.sigcomm.org/sigcomm/2009/demos/sigcomm-pd-2009-final26.pdf.

Yasunobu Chiba, et. al., Trial Production and Evaluation of OpenFlow Switch, The Institute of Electronics, Information and Communication Engineers, Expert Committee for Researching New Generation Network Time Limit, Aug. 11, 2009, pp. 138-143, URL, http://www.ieice.org/~nwgn/file_ws09/24_chiba.pdf.

Extended European Search Report dated Jul. 1, 2015.

"OpenFlow Switch Specification Version 0.9.0 (Wire Protocol 0x98)", Jul. 20, 2009, pp. 1-36, XP008157068.

United States Office Action dated Nov. 4, 2015 in U.S. Appl. No. 14/754,081.

* cited by examiner

Fig. 9

| Port /λ/VC/ Wireless | (L2) MAC DESTINATION ADDRESS | (L2) MAC SOURCE ADDRESS | VLAN TAG | (L3) IP DESTINATION ADDRESS | (L3) IP SOURCE ADDRESS | (L4) DESTINATION PORT NO. | (L4) SOURCE PORT NO. | DATA |

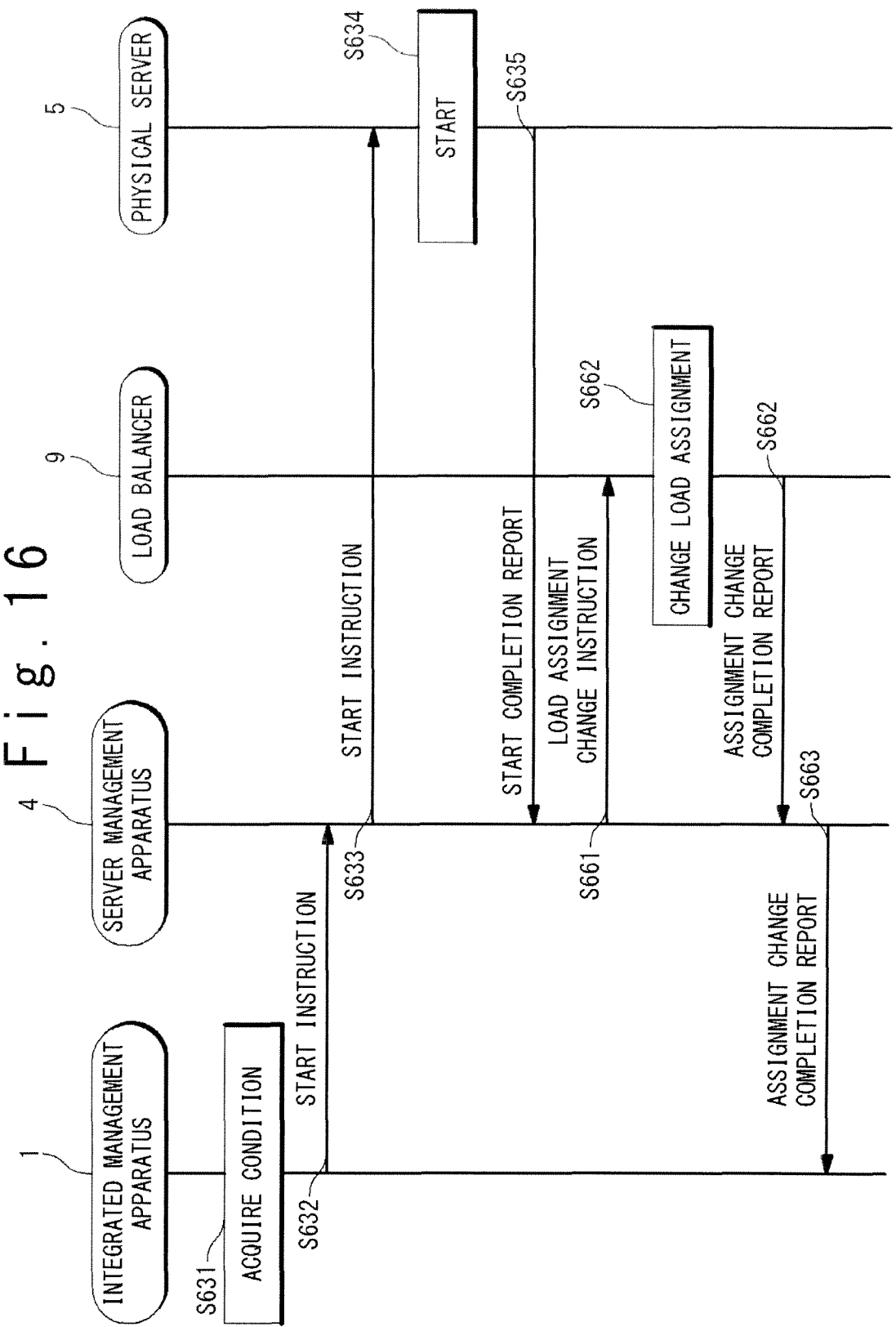

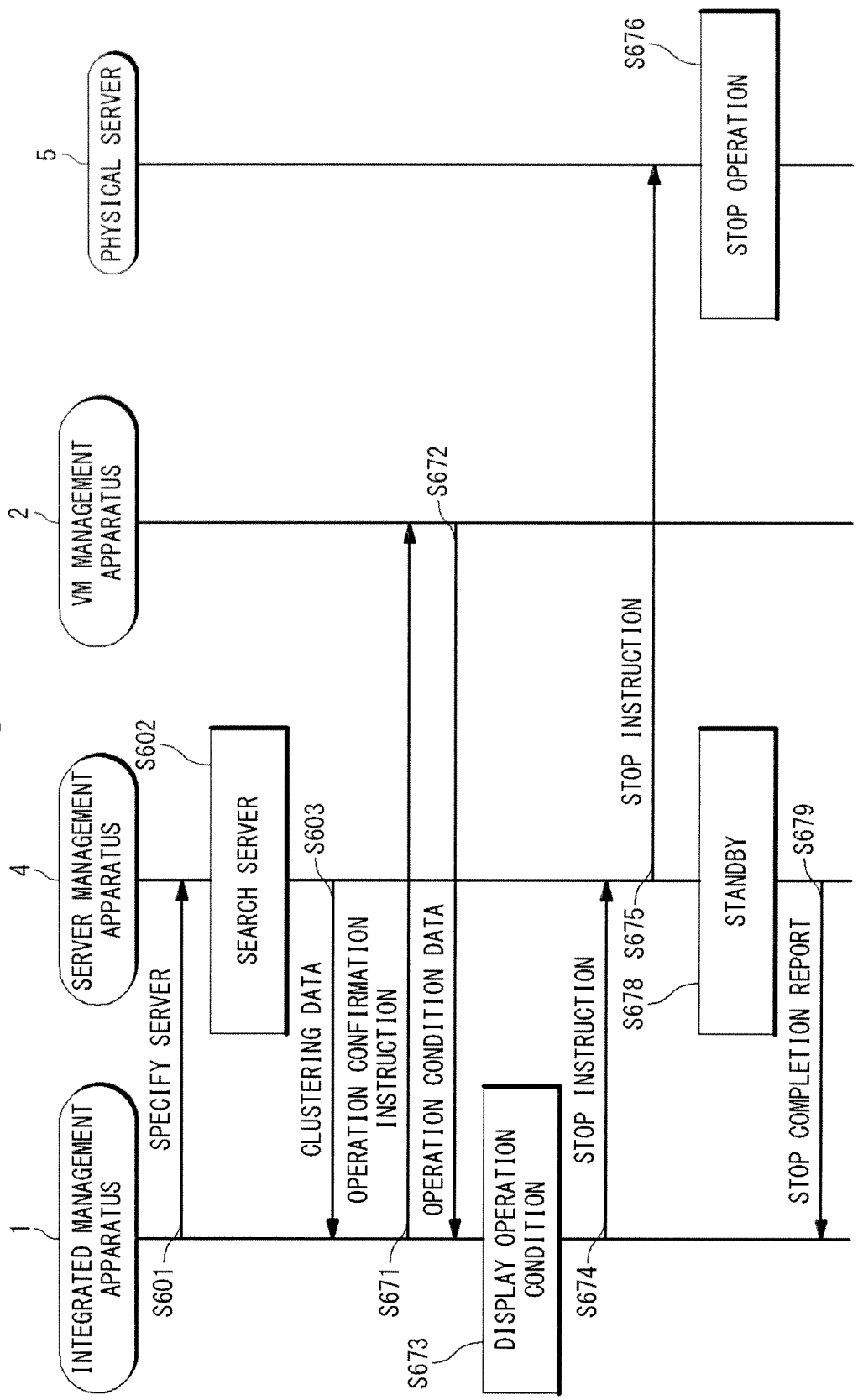

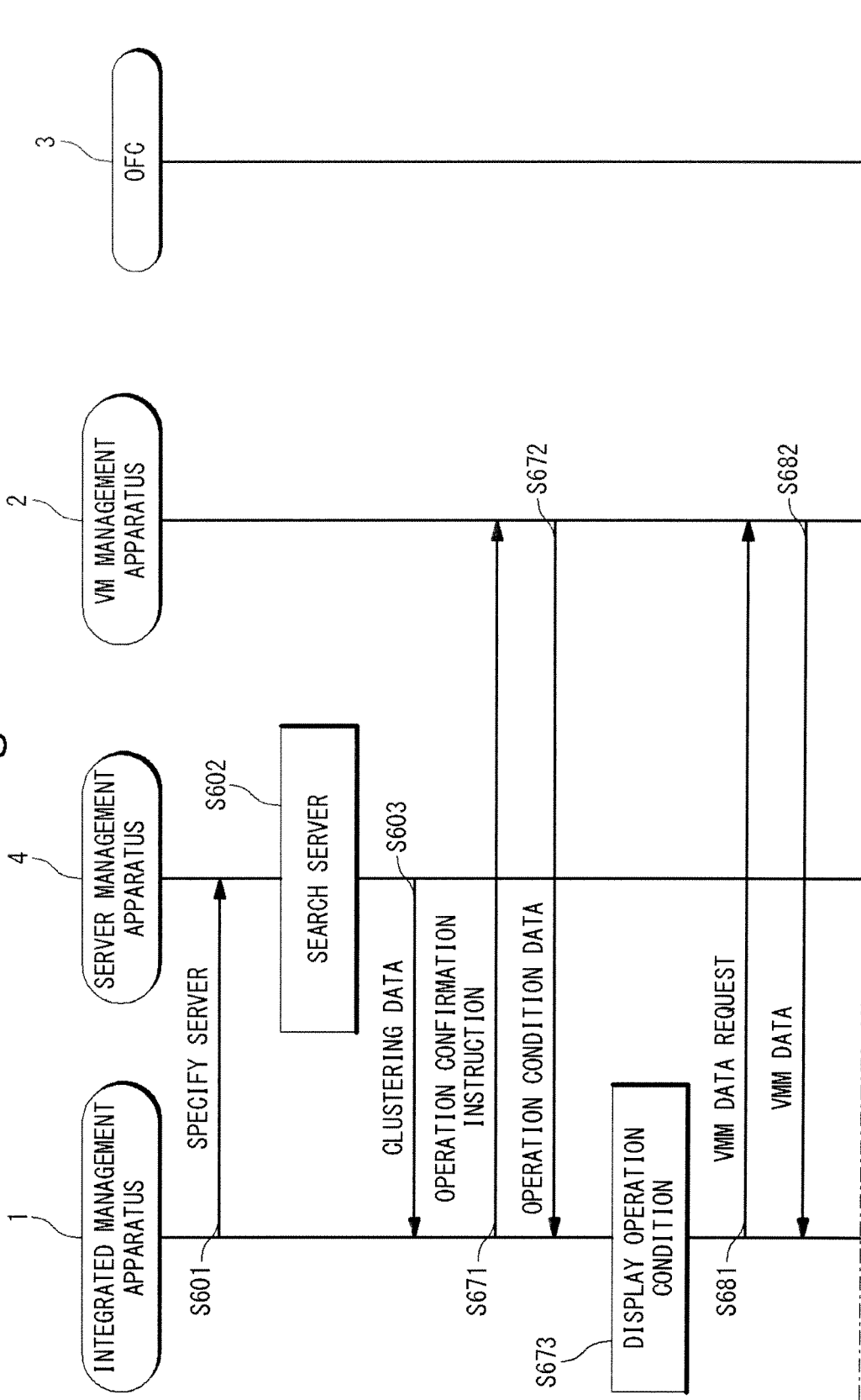

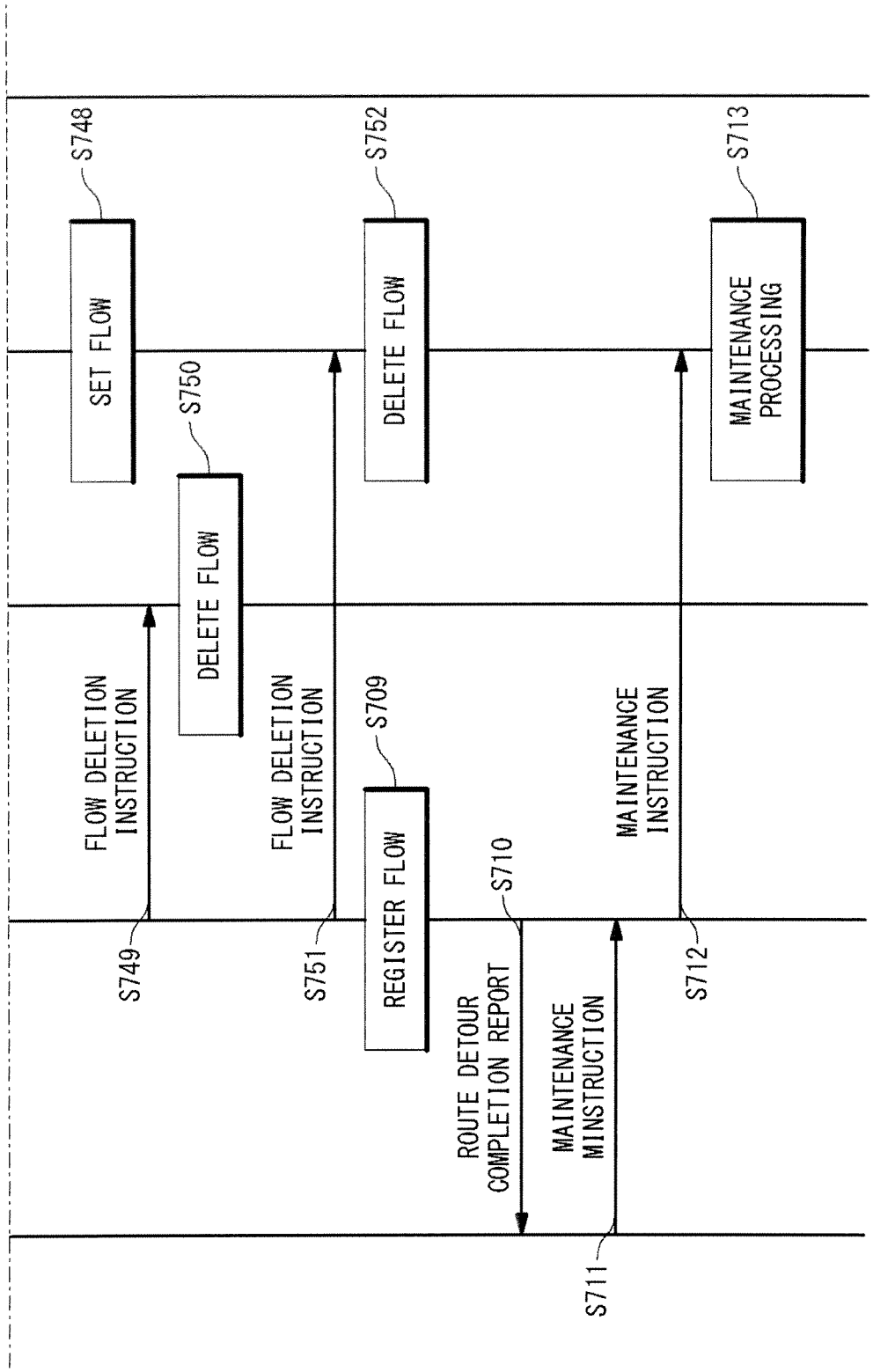

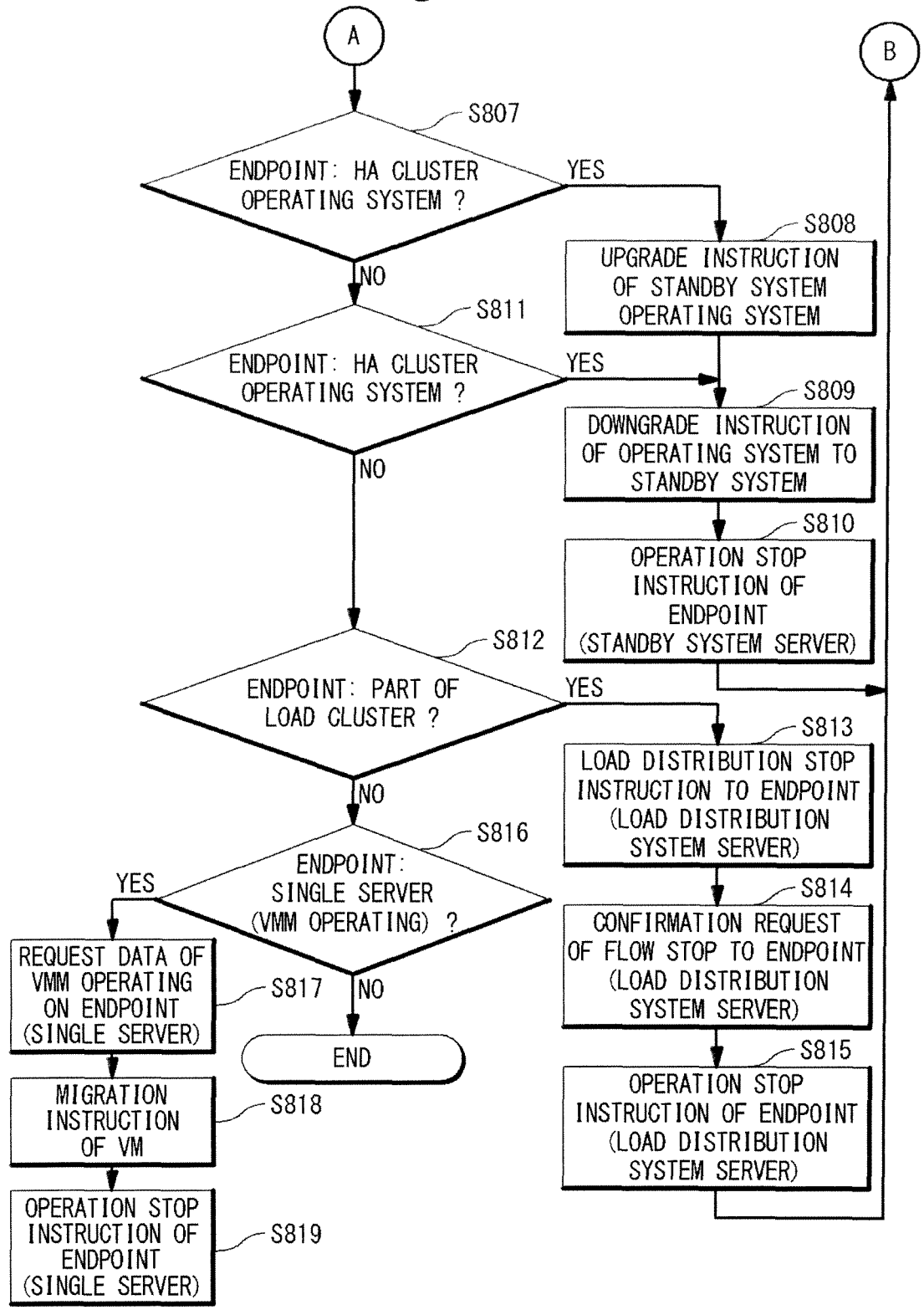

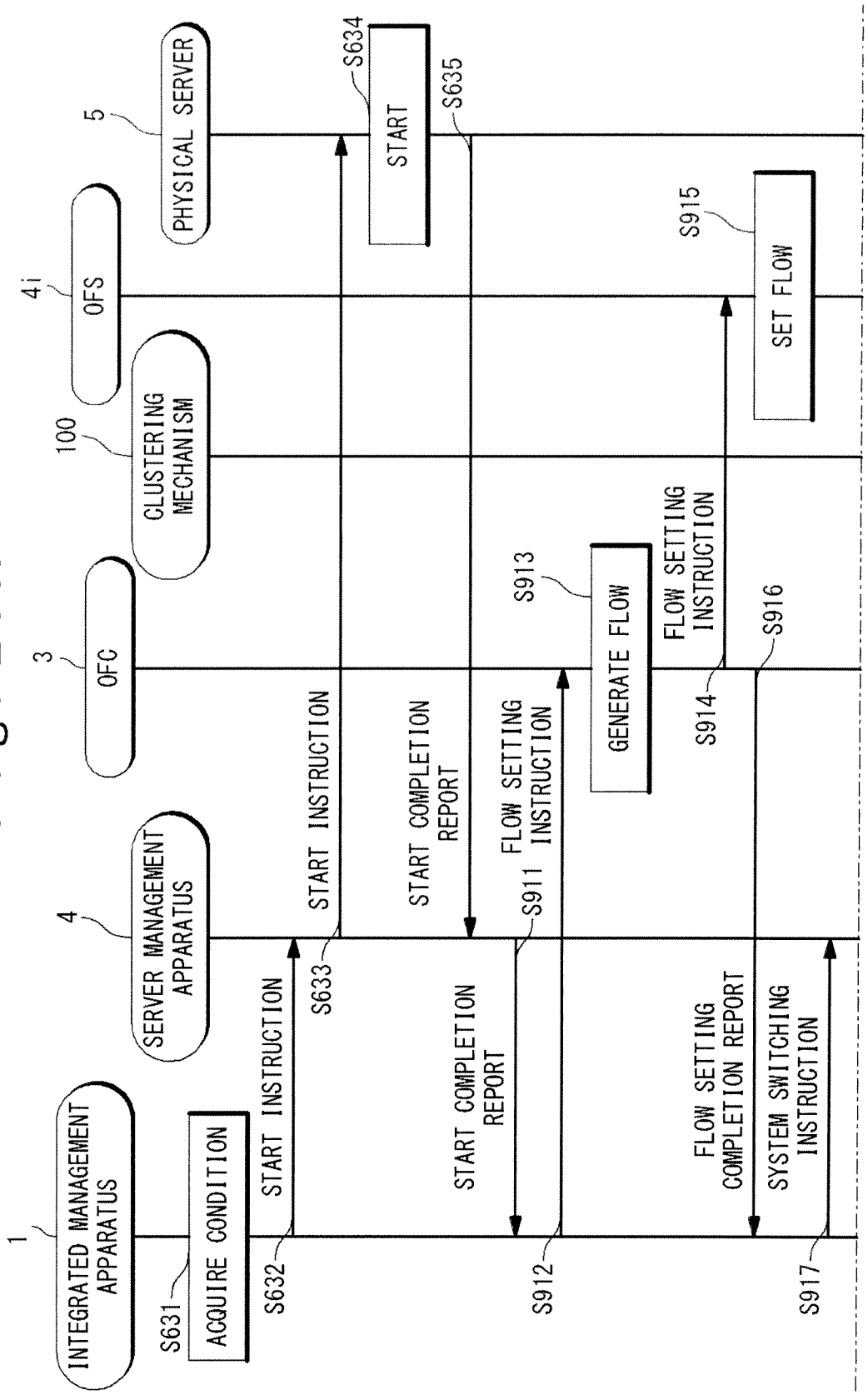

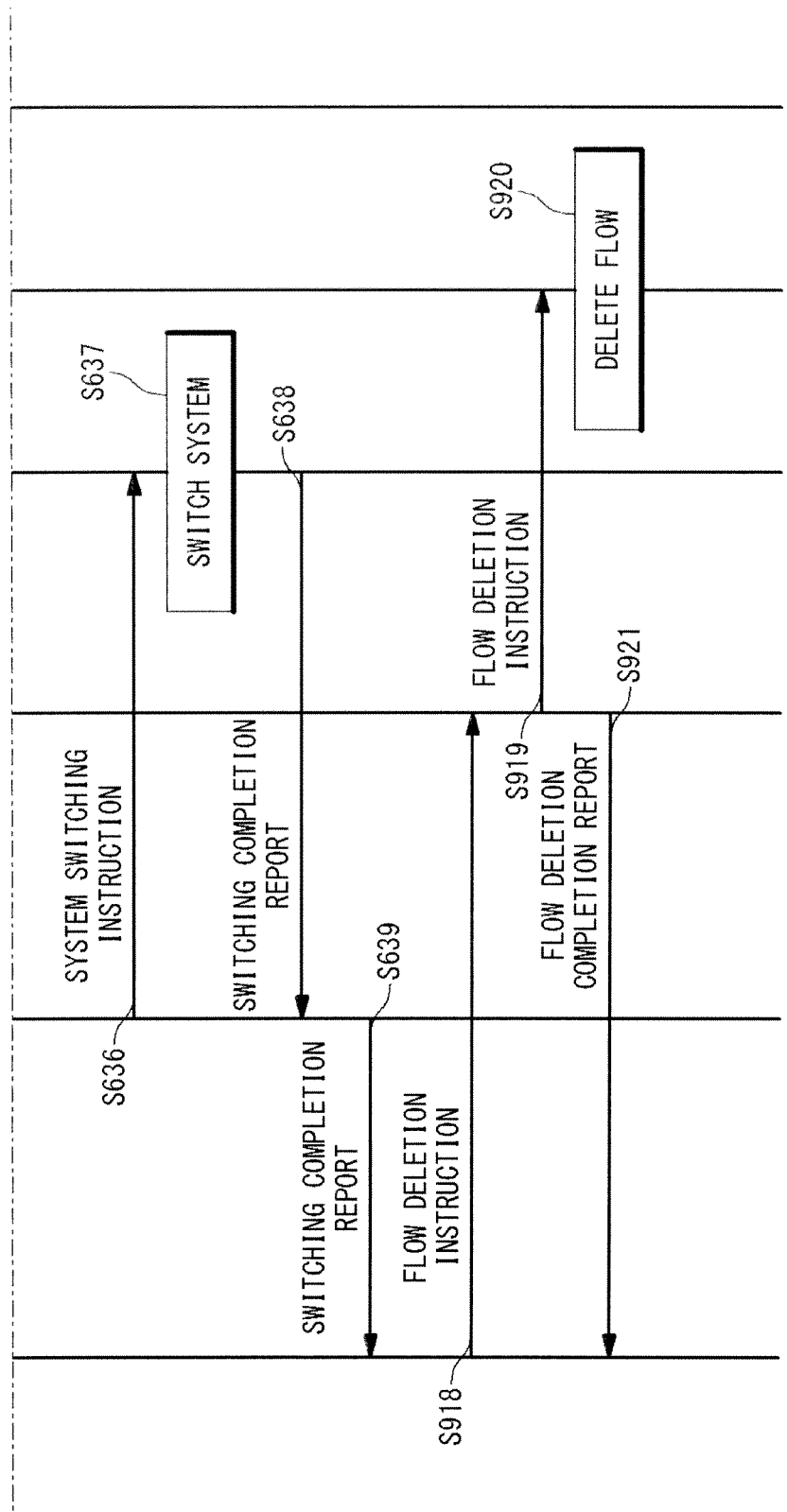

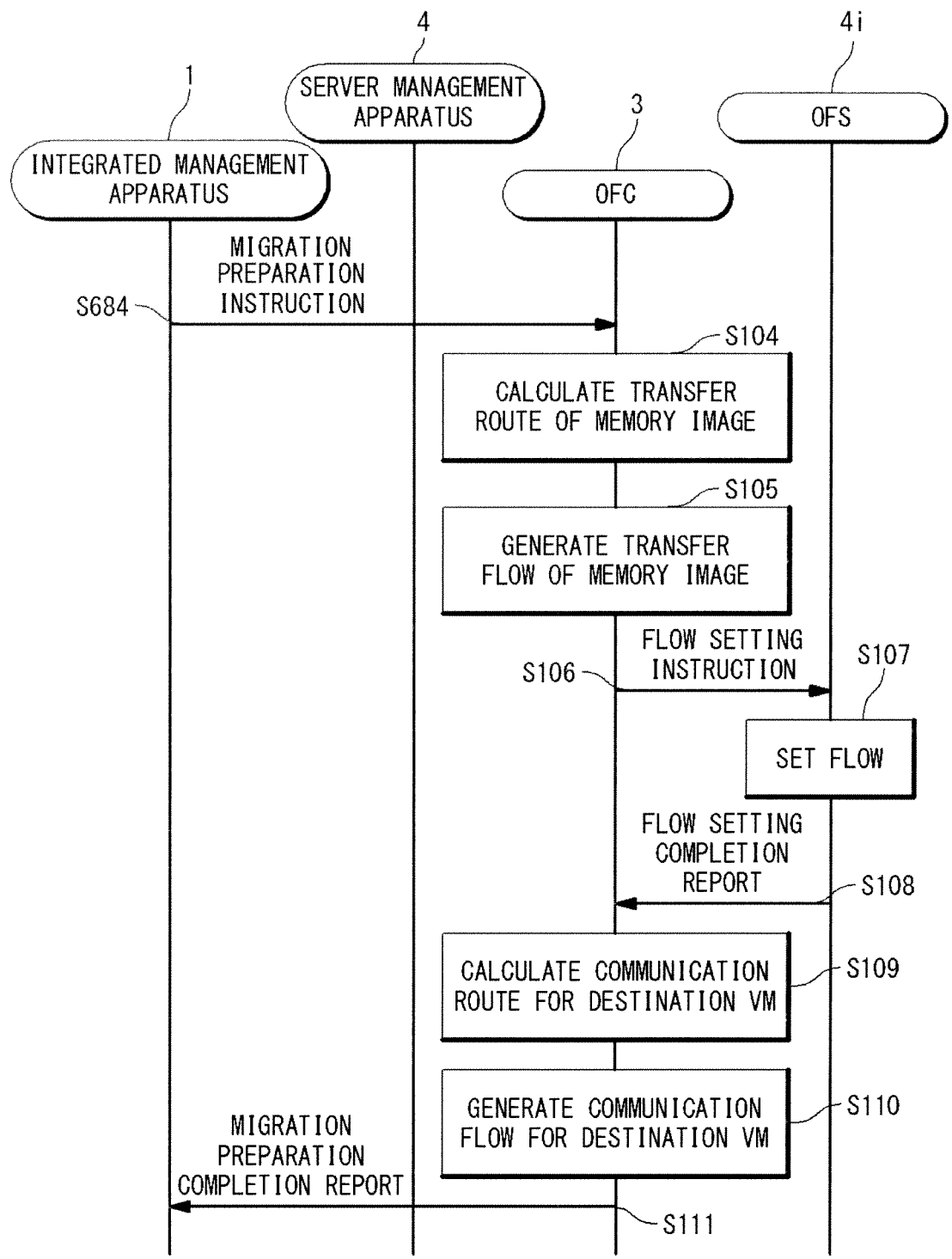

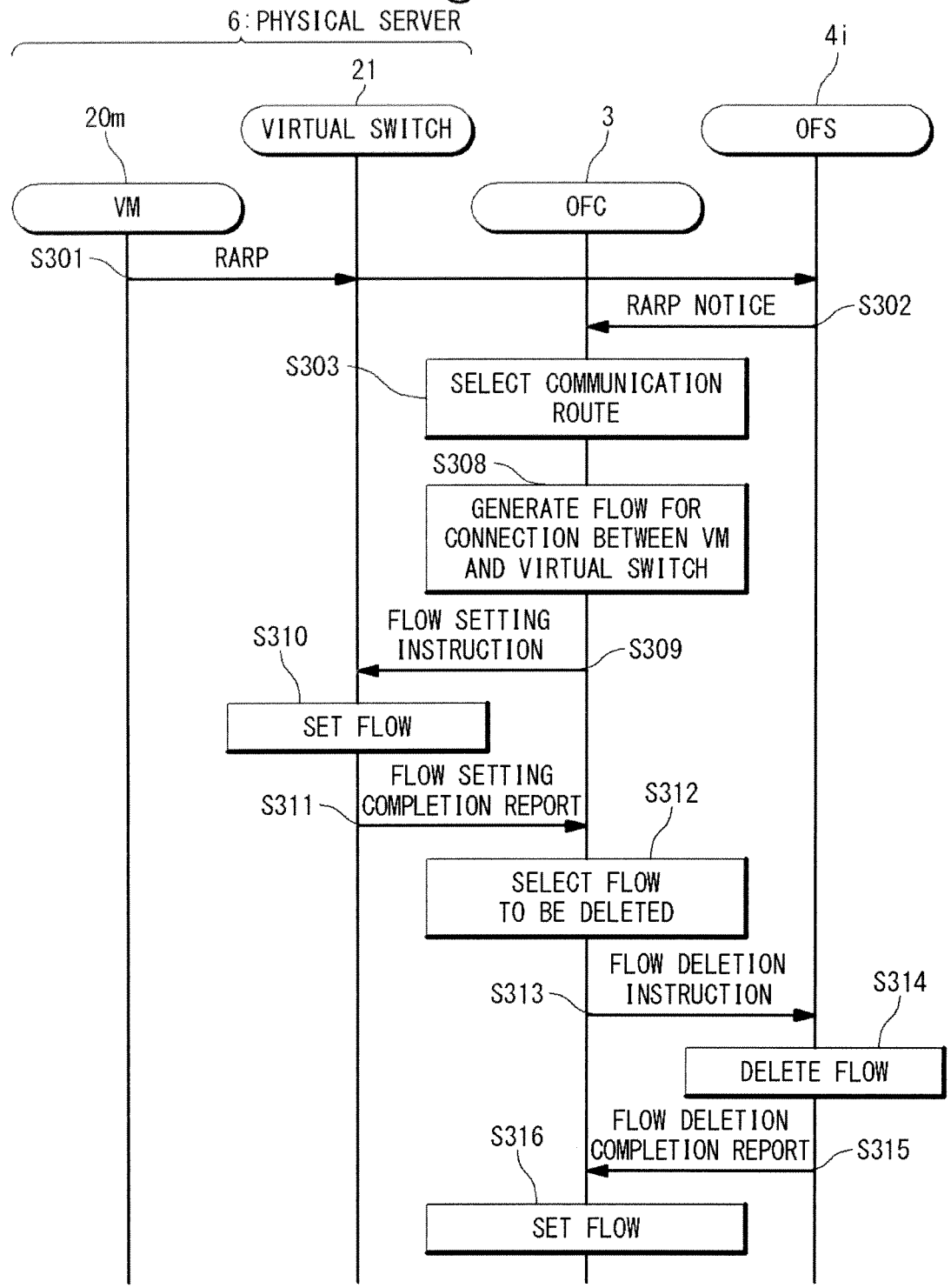

COMPUTER SYSTEM AND MAINTENANCE METHOD OF COMPUTER SYSTEM

TECHNICAL FIELD

The present invention is related to a computer system and a maintenance method of a computer system, and more particularly, to a computer system which it is possible to carry out maintain processing without stopping the operation of the system and a maintenance method.

BACKGROUND TECHNIQUE

In case to carry out maintenance processing to the components of a computer system, only a unit apparatus as a maintenance object must be separated from the system in order to prevent the stop of the function or the operation of the system. For example, by migrating the function of a server as the maintenance object to another server (e.g. the standby system server), the maintenance (for example, the update and repair of a file) of the server becomes possible without stopping a function.

In case of carrying out the maintenance of a unit, a method of separating the maintenance object from the system and a method of restoring the unit separated after the maintenance to the system are disclosed in JP 2007-304845 (Patent Literature 1), JP 2009-146106A (Patent Literature 2), JP 2006-285597A (Patent Literature 3), and JP 2008-118236A (Patent Literature 4).

Patent Literature 1 discloses a computer system which updates software on a standby system virtual hardware and after that, and reduces a service stopping time in the update of the software by taking over the processing of the operating system to the standby system.

Patent Literature 2 discloses a storage system which switches a physical port which is an addition destination of a virtual port to another physical port, updates a routing table of a switch unit based on identifier data of the physical port of the addition destination, and changes an access path to an identical storage unit. Thus, the change of an access path becomes possible without stopping a computer.

Patent Literature 3 discloses a storage system which sets an address to a storage which is added or exchanged based on address conversion data set in advance, to a switch.

Patent Literature 4 discloses a maintenance method which switches a reception destination of a packet for a virtual address to the software of a new version from the software of an old version by switching the address corresponding to the virtual address.

Citation List

[Patent Literature 1] JP 2007-304845A
[Patent Literature 2] JP 2009-146106A
[Patent Literature 3] JP 2006-285597A
[Patent Literature 4] JP 2008-118236A

SUMMARY OF THE INVENTION

In the computer system described in Patent Literatures, management is separate carried out on the side of a network and the side of IT. Therefore, when maintaining a component (server and switch) in the system, the separation and restoration of a maintenance object unit and the setting for the maintenance are individually carried out on the side of the network and the side of the IT. However, because these processing has an influence on the operation of the system, it is desirable to integratedly manage both on the side of the network and the side of the IT to carry out the maintenance.

From the above, an object of the present invention is to provide a computer system which controls the side of network and the side of computer integratedly to make the maintenance possible without the stop of a function.

In order to solve the above-mentioned problem(s), the present invention uses the configuration described below.

A computer system of the present invention is provided with the switch to transfer a received packet data to a destination according to a flow set to itself, an integrated management apparatus which specifies a maintenance object unit and a controller. The controller separates the maintenance object unit from the computer system by controlling the setting or deletion of the flow to the switch.

The maintenance method of the present invention is executed by a computer system which is provided with a physical server connected through a switch which transfers the received packet data to the destination according to the flow set to itself. In the maintenance method of the present invention, an integrated management apparatus specifies a maintenance object unit and a controller separates the maintenance object unit from the computer system by controlling the setting or deletion of the flow to the switch.

According to the present invention, by controlling the side of the network and the side of the computer integratedly, the maintenance of the computer system can be executed without stopping the function.

BRIEF DESCRIPTION OF THE DRAWINGS

The object, effect, feature of the above invention and would become clearer from description of the following exemplary embodiments in cooperate with the attached drawing:

FIG. 9 is a diagram to showing the open flow control according to the present invention;

FIG. 16 is a sequence diagram showing the start processing operation after the maintenance processing by the load distribution system server according to the present invention;

FIG. 17 is a sequence diagram showing shutdown processing operation to an independent server (no VMM operation) of the first exemplary embodiment;

FIG. 18A is a sequence diagram showing the preparation processing operation of the maintenance processing to the independent server (VMM operation) of the first exemplary embodiment;

FIG. 23B is a sequence diagram showing the maintenance processing operation to the switch in the third exemplary embodiment;

FIG. 24B is a flow chart showing the endpoint change processing operation for the detour route generation in case of the maintenance processing to the switch;

FIG. 27A is a sequence diagram showing the start processing operation after the maintenance processing by the server according to the fourth exemplary embodiment;

FIG. 27B is a sequence diagram showing the start processing operation after the maintenance processing by the server according to the fourth exemplary embodiment;

FIG. 28 is a sequence diagram showing the migration preparation processing operation in the first exemplary embodiment in case of the migration processing by the virtual machine;

FIG. 32 is a sequence diagram showing the access destination switching processing in the second implementation example in case of migration processing by the virtual machine.

DESCRIPTION OF EXEMPLARY EMBODIMENTS

Figure 1:
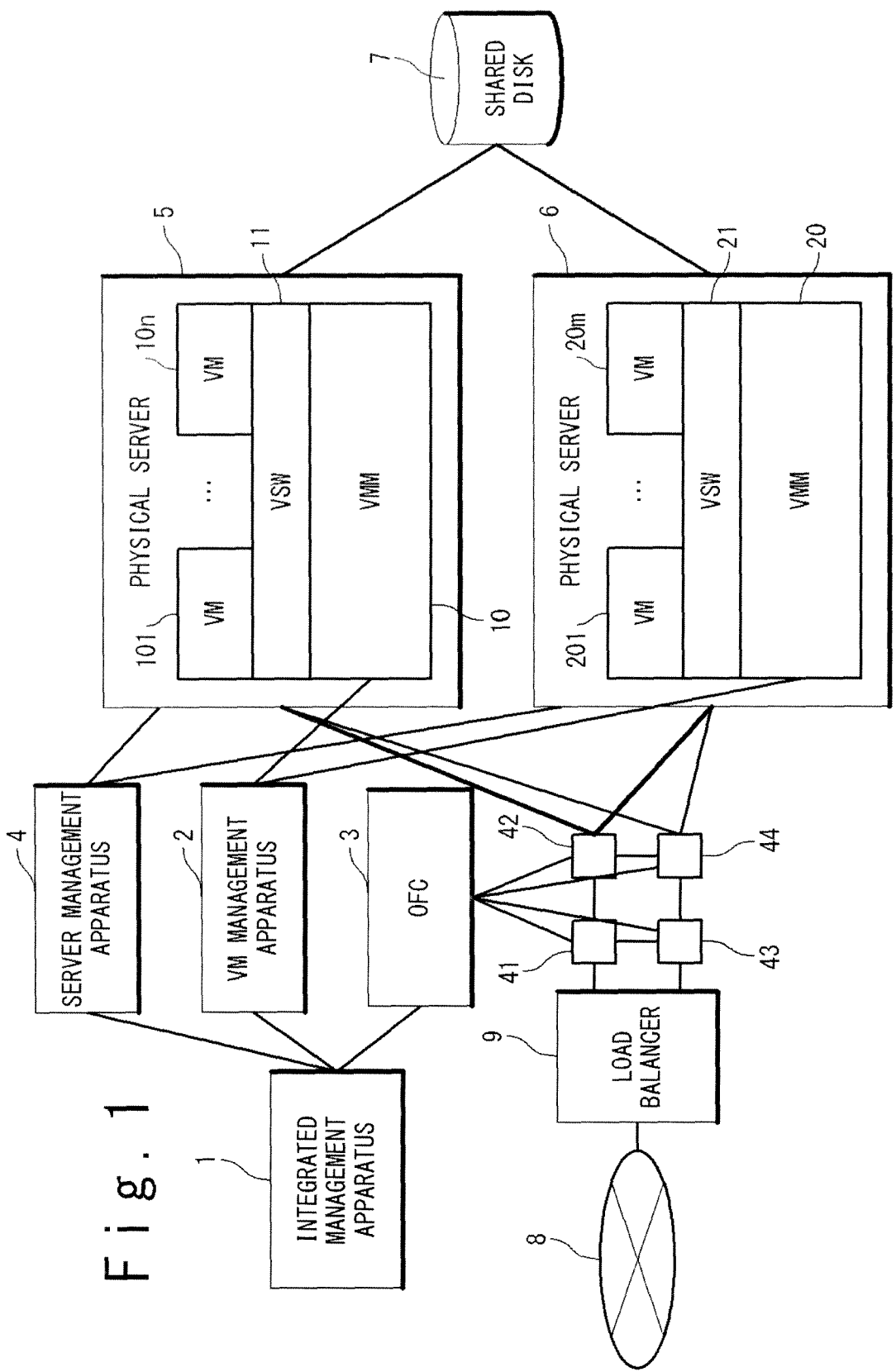
FIG. 1 is a diagram showing a configuration of a computer system according to exemplary embodiments of the present invention.

Hereinafter, exemplary embodiments of the present invention will be described with reference to the attached drawings. In the drawings, same reference numerals are assigned to same components.

(Configuration of the Computer System)

Referring to FIG. 1 to FIG. 9, the configuration of a computer system of the present invention will be described. FIG. 1 is a diagram showing a configuration of the computer system of the present invention. The computer system of the present invention is provided with an integrated management apparatus 1, a virtual machine management apparatus 2 (hereinafter, to be referred to as a VM management apparatus 2), an open flow controller 3 (hereinafter, to be referred to as an OFC 3), a server management apparatus 4, switches 41 to 44 (hereinafter, to be referred to as open flow switches (OFSs) 41 to 44), physical servers 5 and 6, and a storage unit 7 (ex. shared disk). Also, the computer system of the present invention may be provided with a load balancer 9. The number of OFSs 41 to 44 is not limited to four in case of FIG. 1. When the OFSs 41 to 44 are distinguished from each other, the OFSs 41 to 44 are totally referred to as an OFS 4*i*.

The physical servers 5 and 6 are mutually connected through the OFS 4*i*. Also, the physical servers 5 and 6 are connected with an external network 8 exemplified by the Internet through the OFS 4*i*. It should be noted that in the present exemplary embodiment, the two physical servers 5 and 6 are exemplified but the number of physical servers is not limited to this.

Each of the physical servers 5 and 6 is a computer unit which is provided with a CPU and a RAM. By executing a program which is stored commonly or separately in the storage unit 7, at least one virtual machine is realized. In detail, the physical server 5 is provided with virtual machines 101 to 10*n* (n is a natural number) which are realized by dividing a use region of a CPU (not shown) and the storage unit 7 in a logic division or physical division. Or, the virtual machines 101 to 10*n* may be realized in a guest operating system (GOS) which is emulated on a host operating system (HOS) or in a software program which operates on the GOS. The virtual machines 101 to 10*n* are managed by the virtual machine monitor 10 (hereinafter, to be referred to as a VMM 10) which is realized by executing a program stored in the storage unit 7 by the CPU (not shown). At least one of the virtual machines 201 to 20m (m is a natural number) is implemented on the physical server 6, and managed by a VMM 20, like the physical server 5.

It is desirable that disk images (memory images) which are used by the virtual machines 101 to 10n and 201 to 20m are stored in a shared disk. For example, the shared disk is exemplified by a disk array which is connected by FC (Fiber Channel) or Ether (registered trademark), and so on, NAS (Network Attached storage), a database server and so on.

A method of managing the virtual machines 101 to 10n by the VMM 10 and a method of managing the virtual machines 201 to 20m by the VMM 20 are same as in a conventional example. For example, the VMM 10 manages the memory images used by the virtual machines 101 to 10n, and the VMM 20 manages the memory images used by the virtual machines 201 to 20m.

The virtual machines 101 to 10n transmit and receive to and from another unit (for example, a computer unit on an external network 8 or a virtual machine in another physical server 6) through a virtual switch 11 and a physical NIC (not shown) which are managed by the VMM 10. In the present exemplary embodiment, the packet transmission based on TCP/IP (Transmission Control Protocol/Internet Protocol) is carried out as an example. In the same way, the virtual machines 201 to 20m transmit and receive to and from another unit through a virtual switch 21. Also, the communication between the virtual machines in the identical physical server is carried out through the virtual switch 11 or 21.

It is supposed that in the virtual machines 101 to 10n and 201 to 20m according to the present invention, a MAC address does not change even if the virtual machine itself migrates to a VMM other than the VMM to which the virtual machine belongs or a physical server. Also, the virtual switches 11 and 21 may be controlled based on an open flow technique to be described later, and may carry out a switching operation as in the conventional layer 2 switch (L2 switch). However, the virtual switches 11 and 21 in the exemplary embodiments to be described below will be described as ones corresponding to the open flow. Moreover, a bridge connection is attained between the virtual machines 101 to 10n and 201 to 20m and the physical servers. That is, it is possible to carry out a direct communication from the outside by use of the MAC addresses and IP addresses of the virtual machines 101 to 10n and 201 to 20m.

It is desirable that a clustering mechanism 100 (not shown in FIG. 1) is installed into one of the physical servers 5 and 6. The clustering mechanism 100 may operate as a common virtual machine on the physical servers 5 and 6. The clustering mechanism 100 sets a cluster (use condition) of each of the physical servers 5 and 6 provided for the computer system to either of a HA (High Availability) cluster, a load distribution cluster, or an independent server. Also, the physical server set as the HA cluster is set to one of the operating system and the standby system. The physical server set as the HA cluster (operating system) functions as a physical server which operates in the computer system, and the physical server set as the HA cluster (standby system) becomes a standby state. Also, when being set as the load distribution cluster, a load is distributed to the physical servers by the load balancer 9.

Figure 2:
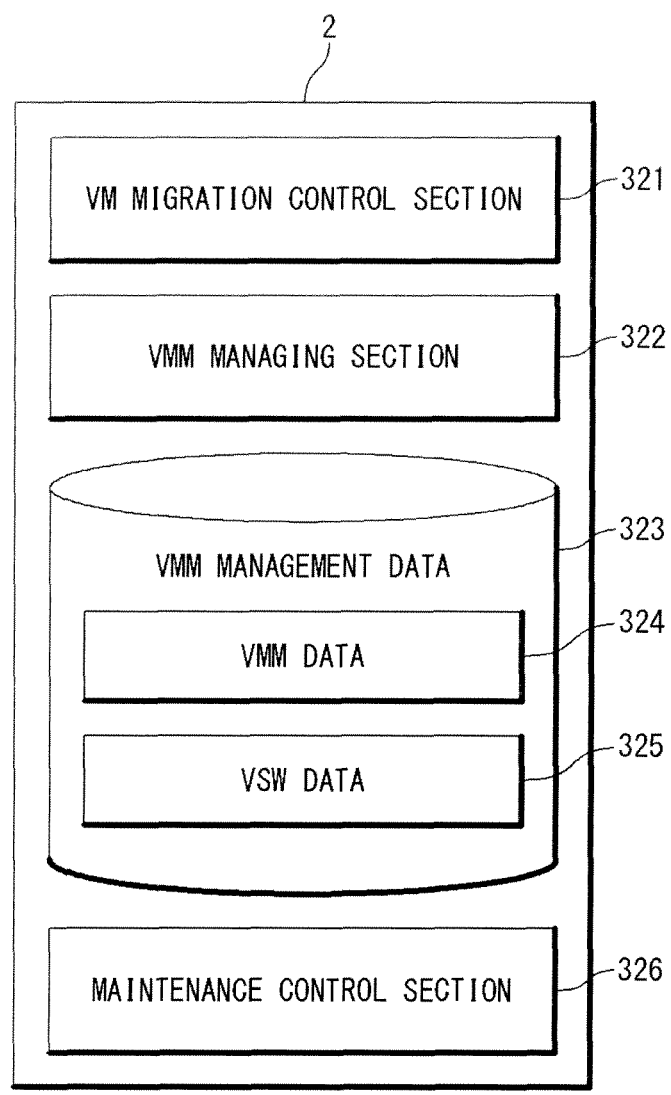
FIG. 2 is a diagram showing a configuration of a VM management equipment of the present invention.

The VM management apparatus 2 manages the virtual machines 101 to 10n and 201 to 20m which operate on the physical servers 5 and 6. FIG. 2 is a diagram showing the configuration of the VM management apparatus 2 of the present invention. It is desirable that the VM management apparatus 2 is realized by a computer which is provided with a CPU and a storage unit. In the VM management apparatus 2, by executing a program stored in the storage unit by the CPU (not shown), functions of a VM migration control section 321, a VMM managing section 322, and a maintenance control unit 326 shown in FIG. 2 are realized.

The VM migration control section 321 controls the migration of a virtual machine. In detail, the VM migration control section 321 specifies a migration object virtual machine and a migration destination virtual machine monitor based on VMM management data 323 which is stored in the storage unit, and instructs the virtual machine monitors of a migration source and a migration destination to carry out the migration of the virtual machine. Thus, the migration of the virtual machine is executed between the instructed virtual machine monitors.

The VMM managing section 322 manages data (VMM management data 323) of the virtual machine monitor and the virtual switch under the management. The VMM management data 323 is provided with data (VMM data 324) of the virtual machines managed by the virtual machine monitor and an identifier of the virtual machine monitor, and data (VSW data 325) of an identifier of the virtual switch, and virtual machines connected with the virtual switch. It is desirable that the VMM data 324 and the VSW data 325 can be related and stored every virtual machine monitor which manages the virtual switches.

The VMM management data 323 may be stored in the storage unit in advance and may be acquired at an optional time or periodically from the VMMs 10 and 20. When acquiring the VMM management data 323 from the VMM 10 or 20, it is desirable that the VMM management data 323 is acquired from the VMM 10 or 20 in response to an instruction from the VMM managing section 322, and the VMM management data 323 in the storage unit is updated based on the acquired data. Thus, it becomes possible to monitor the migration destination of the virtual machine and the connection destination of the virtual switch which are changed after the migration of the virtual machine.

The maintenance control section 326 controls maintenance processing to the physical servers 5 and 6 in response to a maintenance instruction from the server management apparatus 4. In detail, the maintenance control section 326 controls the start and stop (shutdown) of the physical servers 5 and 6 in response to the maintenance instruction from the server management apparatus 4, and transfers an update file and a patch of software (e.g. a guest OS) and OS transmitted from the server management apparatus 4 to the physical server of the maintenance object. The physical servers 5 and 6 update (version up and repair) the virtual machine (guest OS) and a host OS based on the update file transmitted from the maintenance control section 326.

The OFC 3 controls communication in the system by the open flow technique. The open flow technique is a technique that a controller (OFC 3 in this example) sets route data in units of flows and data of multi-layer to the switches based on routing policy (flow: rule+action) and carries out a routing control and a node control. Thus, a routing control function is separated from routers and the switches, and the selection of optimal routing and the traffic management become possible through the centralized control by the controller. The switches (OFS 4i) to which the open flow technique is applied handle a communication not in units of packets or frames but as a flow of END2END, unlike the conventional router and switch.

In detail, the OFC 3 controls the operations (for example, a relay operation of packet data) of the switch or node by setting a flow (rule+action) every switch or node. In this case, the switch which is controlled by the OFC 3 is exemplified by the OFS 4i, the virtual switches 11 and 21 and so on. The node which is controlled by the OFC 3 is exemplified by the virtual machines 101 to 10n and 201 to 20m, the VMMs 10 and 20, the physical servers 5 and 6, the storage unit 7 and so on.

Figure 3:
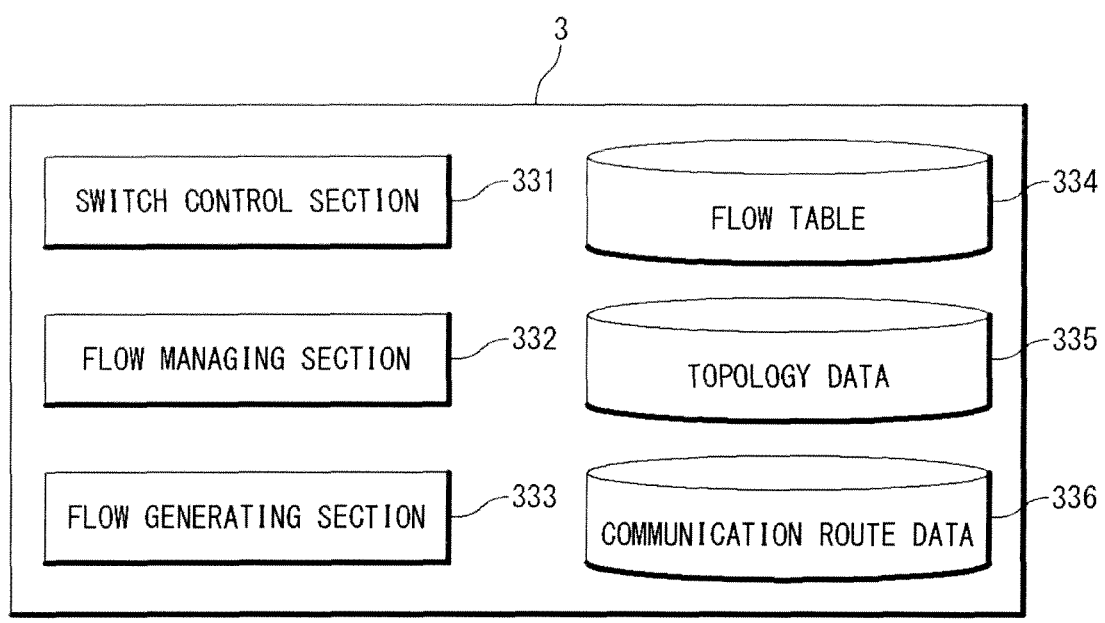
FIG. 3 is a diagram showing a configuration of an open flow controller of the present invention.

FIG. 3 is a diagram showing the configuration of the OFC 3 of the present invention. It is desirable that the OFC 3 is realized by a computer which is provided with a CPU and a storage unit. By executing the program stored in the storage unit by the CPU (not shown) in the OFC 3, each function of a switch control section 331, a flow managing section 332, a flow generating section 333 which are shown in FIG. 3 is realized.

Therefore, the switch control section 331 carries out the setting or deletion of a flow (rule+action) every switch and node according to a flow table 334. The switch and the node according to the present invention refer to the set flow and execute an action (for example, relay or discard of packet data) corresponding to a rule according to header data of a reception packet. The rule and the action will be described in detail later.

Figure 4:
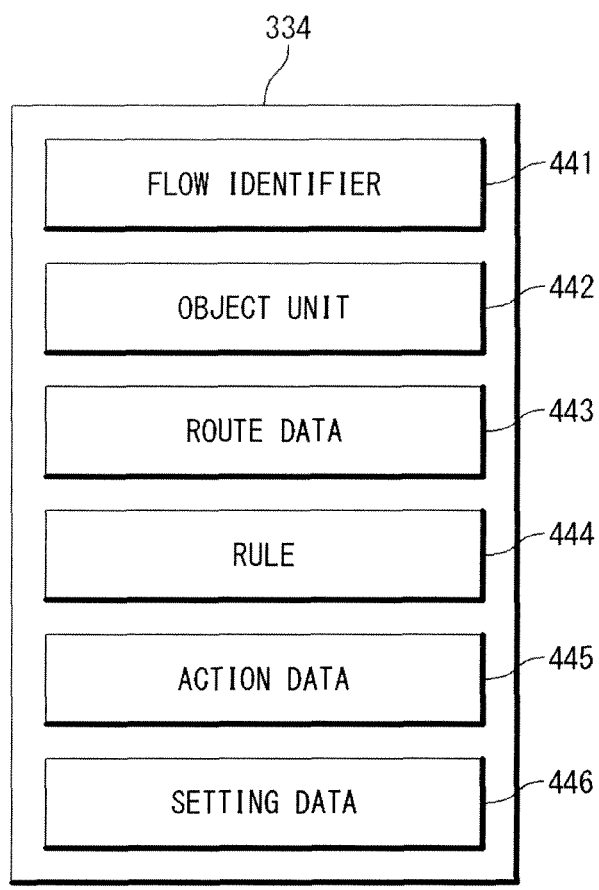
FIG. 4 is a diagram showing an example of a configuration of a flow table retained by the open flow controller of the present invention.
Figure 5:
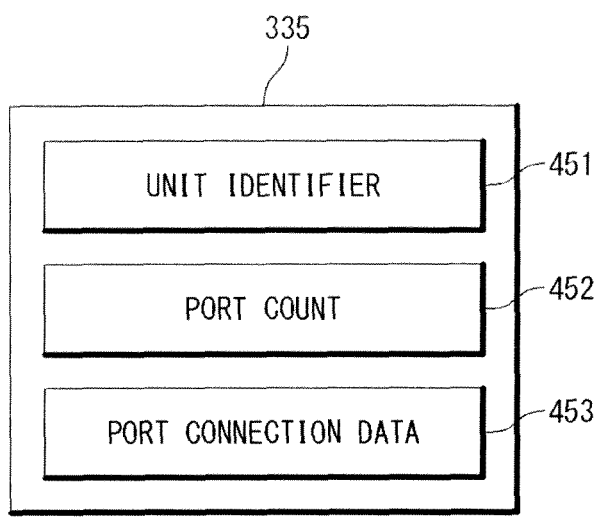
FIG. 5 is a diagram showing an example of topology data retained by the open flow controller of the present invention.
Figure 6:
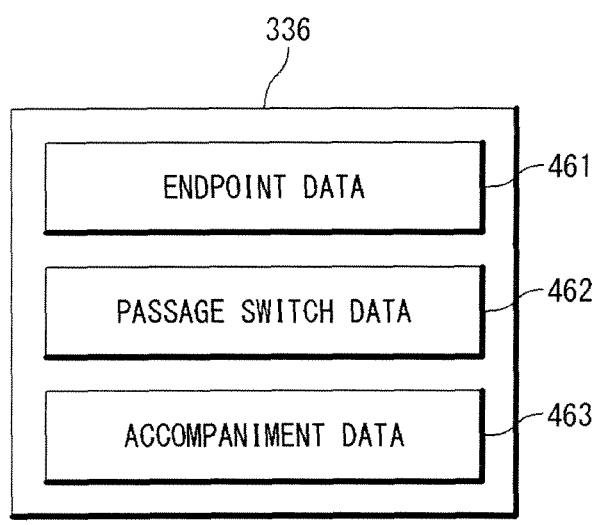
FIG. 6 is a diagram showing an example of communication route data retained by the open flow controller of the present invention.

FIG. 4 is a diagram showing an example of the configuration of the flow table 334 retained by the OFC 3 of the present invention. Referring to FIG. 4, a flow identifier 441 for specifying a flow, an identifier (object unit 442), route data 443, a rule 444, action data 445, and setting data 446 for identifying the set object (switch and node) of the flow are related to each other and set in the flow table 334. A flow (rule 444+action data 445) to all the switches and nodes which become the control objects of the OFC 3 is set to the flow table 334. The method of handling communication such as QoS every flow and the data of the coding may be defined by the flow table 334.

In the rule 444, for example, a combination of an address for the layer 1 to layer 4 and an identifier in the OSI (Open Systems Interconnection) reference model which are contained in the header data of the packet data of TCP/IP are prescribed. For example, a combination of a physical port of the layer 1 shown in FIG. 9, a MAC address of layer 2, an IP address of layer 3, a port number of layer 4, a VLAN tag is set as the rule 444. A predetermined range of the identifiers and addresses such as the port number set to the rule 444 may be set. Also, it is desirable to distinguish the addresses of the destination and source and to be set as the rule 444. For example, a range of the MAC destination address, a range of an address port number which specifies an application of a connection destination, a range of a source port number which specifies an application of a connection source are set as the rule 444. Moreover, an identifier which specifies a data transfer protocol may be set as the rule 444.

For example, a method of processing packet data of TCP/IP is prescribed in the action data 445. For example, the data showing whether or not to relay reception packet data, and a transmission destination when to be relayed, are set. Also, a replica of the packet data and data which instructs to discard may be set to the action data 445.

The route data 443 is data which specifies a route which applies a flow (rule 444+action data 445). This is an identifier which is related to communication route data 336 to be described later.

The setting data 446 is data showing whether or not a flow (rule 444+action data 445) has been set currently. Because the setting data 446 is related to the object unit 442 and the route data 443, it is possible to confirm whether or not a flow has been set to the communication route, and it is possible to confirm whether a flow has been set every switch and node on the communication route. Also, the setting data 446 contains data showing whether a generated flow is in a usable (valid) condition or in non-usable (invalid) condition. The OFC 3 refers to the setting data 446, sets only a valid flow to the OFS and does not set an invalid flow.

The flow managing section 332 refers to the flow table 334 to extract a flow (rule 444+action data 445) corresponding to the header data of the first packet notified from the switch and node, and notifies to the switch control section 331. Also, the flow managing section 332 adds a flow identifier 441 to the flow (rule 444+action data 445) which is generated by the flow generating section 333 and stores in the storage unit. At this time, an identifier (route data 443) of a communication route to which a flow is applied, and an identifier (object unit 442) of the switch and node to which a flow is applied are assigned and added to the flow (rule 444+action data 445) and are stored.

The flow generating section 333 calculates a communication route by using the topology data 335, stores the calculation result as the communication route data 336 in the storage unit. Here, nodes as endpoints of a communication route (transmission source and destination of a packet), and switches and nodes on the communication route are set. For example, the flow generating section 333 specifies the nodes as the endpoints in the topology, extracts the shortest route between the endpoints by the Dijkstra method and outputs it as a communication route. Also, the flow generating section 333 sets a flow (rule 444+action data 445) to set to the switches and the nodes on the communication route based on the communication route data 336.

The topology data 335 contains data of a connection situation of the switch (for example, OFS 4i, virtual switches 11 and 21, and so on), the node (for example, virtual machines 101 to 10n and 201 to 20m, VMMs 10 and 20, physical servers 5 and 6, storage unit 7, and so on), and an external network 8 (e.g. the Internet). Specifically, a port count 452 of a unit and port connection data 453 are related to a unit identifier 451 which specifies a switch and a node (unit) and are stored in the storage unit as the topology data 335. The port connection data 453 contains a connection type which specifies a connection end (switch, node/external network) and data which specifies a connection destination (a switch ID in case of the switch, MAC address in case of the node, an external network ID in case of the external network).

The communication route data 336 is data for specifying a communication route. In detail, as the communication route data 336, a node group (e.g. the virtual machines 101 to 10n, and 201 to 20m, the VMMs 10 and 20, the physical servers 5 and 6, the storage unit 7 and so on), endpoint data 461 which specifies an external network interface as an endpoint, passage switch data 462 which specifies a pair group of a passage switch (for example, the OFS 4i, the virtual switches 11 and 21 and so on) and the port, and accompaniment data 463 are related to each other and stored in the storage unit. For example, when the communication route is a route connecting an external network and a node, an external network ID and a MAC address of the node are stored as endpoint data 461. Or, when the communication route is a route connecting between nodes, a pair of MAC addresses of the nodes as both endpoints is stored as the endpoint data 461. The passage switch data 462 contains an identifier of a switch (open flow switch and the virtual switch) which is provided on the communication route between the endpoints shown by the endpoint data 461. Also, the passage switch data 462 may contain data for relating a flow (rule 444+action data 445) set to a switch and the switch. The accompaniment data 463 contains data of a switch (passage switch) on the route after the endpoint is changed.

The flow managing section 332 of the present invention controls the flow generating section 333 in response to a migration instruction (migration preparation instruction) of the virtual machine to generate a flow ( ) for transferring the memory images and controls the switch control section 331 to set the memory image transfer flow to OFSs and nodes on a memory image transfer route. Also, the flow managing section 332 of the present invention controls the flow generating section 333 in response to the migration instruction (migration preparation instruction) of the virtual machines to generate an access flow (communication flow for migration destination VM) to a virtual machine after the migration, and controls the switch control section 331 to set the communication flow for the migration destination VM to the OFSs and the nodes on the communication route for the migration destination VM.

Figure 7:
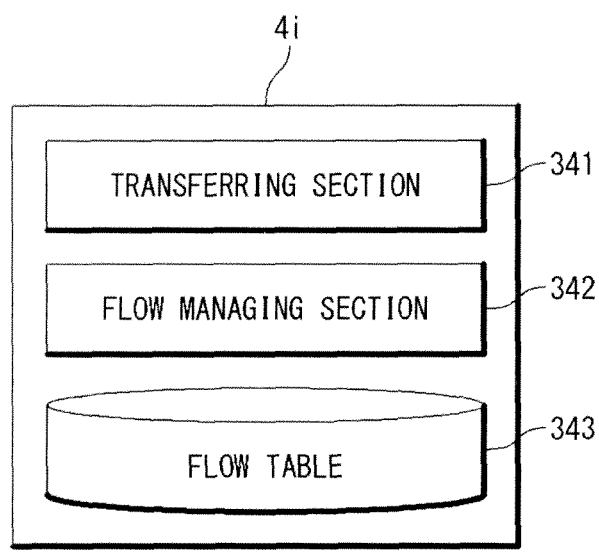
FIG. 7 is a diagram showing a configuration of an open flow switch according to the present invention.

FIG. 7 is a diagram showing a configuration of the OFS 4*i* according to the present invention. The OFS 4*i* determines a method (action) of processing a reception packet according to the flow table 343 set by the OFC 3. The OFS 4*i* is provided with a transferring section 341 and a flow managing section 342. The transferring section 341 and the flow managing section 342 may be configured in hardware and may be realized in software which is executed by a CPU.

Figure 8:
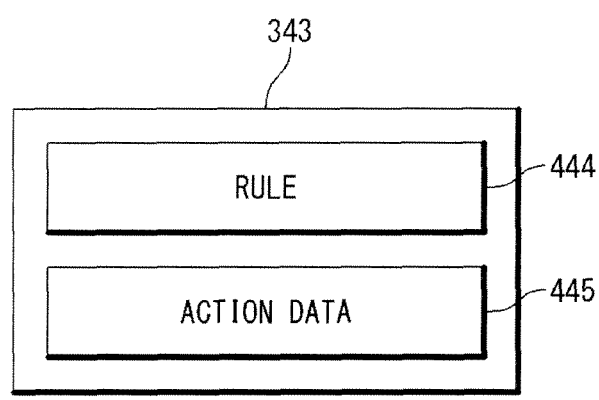
FIG. 8 is a diagram showing an example of a flow table retained by a switch of the present invention.

The flow table 343 as shown in FIG. 8 is set in a storage unit of the OFS 4*i*. The flow managing section 342 sets a flow (rule 444+action data 445) which is acquired from the OFC 3, to the flow table 343. Also, when the header data of a reception packet received by transferring section 341 matches (coincides) with the rule 444 which is stored in the flow table 343, the flow managing section 342 notifies the action data 445 corresponding to the rule 444 to the transferring section 341. On the other hand, when the header data of the reception packet which is received by the transferring section 341 does not match (coincide) with the rule 444 which is stored in the flow table 343, the flow managing section 342 notifies the reception of the first packet to the OFC 3 and transmits the header data to the OFC 3.

The transferring section 341 carries out transfer processing according to the header data of the reception packet. In detail, the transferring section 341 extracts header data from the reception packet data and notifies to the flow managing section 342. When receiving the action data 445 from the flow managing section 342, the transferring section 341 carries out processing according to the action data 445. For example, the transferring section 341 transfers the reception packet data to a destination node shown in the action data 445. Also, when packet data which does not match the rule 444 which is prescribed in the flow table 343 is received, the transferring section 341 retains the packet data for a predetermined period and waits until a flow is set (flow table 343 is updated) from the OFC 3.

Specifically, n operation of the OFS 4*i* to which a flow is set in which the rule 444: a MAC source address (L2) is "A1 to A3", IP destination address (L3) is "B1 to B3", protocol is "TCP", and destination port number (L4) is "C1 to C3", and the action data 445: "relay to the virtual machine 101 of the physical server 5" are related to each other will be described. When receiving the packet data of the MAC source address (L2) of "A1", the IP destination address (L3) of "B2", the protocol of "TCP", and the destination port number (L4) of "C3", the OFS 4*i* determines that the header data matches to the rule 444, and transfers the reception packet data to the virtual machine 101. On the other hand, when receiving the packet data of the MAC source address (L2) of "A5", the IP destination address (L3) of "B2", the protocol of "TCP", and the destination port number (L4) of "C4", the OFS 4*i* determines that the header data does not matches to the rule 444, notifies reception of the first packet to the OFC 3, and transmits the header data to the OFC 3. The OFC 3 extracts the flow (rule 444+action data 445) corresponding to the received header data from the flow table 334 and transmits it to the OFS 4*i*. It should be noted that when there is not an appropriate flow in the flow table 334, the flow may be generated newly. The OFS 4*i* sets the transmitted flow to its own flow table 343 and carries out relay processing of the reception packet according to this.

Generally, the OFS 4*i* using the open flow technique issues a flow setting request to the OFC 3 when receiving the packet data (first packet) which does not correspond to the rule 444 set to its own flow table 343. The OFC 3 sets a new flow to the OFS 4*i* in response to this. When receiving the packet data according to the rule 444, the OFS 4*i* carries out the processing according to the set flow.

As described above, the open flow technique (also called programmable flow technique) is applied to a computer system of the present invention. It should be noted that in addition to the OFS 4*i*, the virtual switches 11 and 21, may be provided with the flow table in which a flow is set by the OFC 3 like the OFS 4*i*. In this case, the OFC 3 can control the operations of the virtual switches 11 and 21, like the OFS 4*i*.

The server management apparatus 4 controls the clustering of the physical servers 5 and 6 by controlling the clustering mechanism 100. It is desirable that the server management apparatus 4 is realized by a computer which is provided with a CPU and a storage unit. The server management apparatus 4 has a function of carrying out the maintenance processing to the physical servers 5 and 6. In detail, the server management apparatus 4 has a function of controlling the start and shutdown of the physical servers 5 and 6 and has the update file and a patch of an OS and software operating on the physical servers 5 and 6. The physical servers 5 and 6 update (version up and repair) the OS and software by the update file transmitted from the server management apparatus 4.

The load balancer 9 is provided between the external network 8 and the OFS 4*i* and carries out load distribution to the VMs 101 to 10*n* and 201 to 20*m*, and the physical servers 5 and 6. Also, the load balancer 9 carries out the load distribution to the physical server (host OS) set to each virtual machine (guest OS) or the load distribution cluster in response to the instruction from the server management apparatus 4. At this time, the assignment of processing (load) is carried out to each of physical servers and so on.

The computer system of the present invention is provided with the integrated management apparatus 1 which integratedly controls the VM management apparatus 2, the OFC 3, and the server management apparatus 4. It is desirable that the integrated management apparatus 1 is realized by a computer system which is provided with a CPU and a storage unit. It is desirable that the integrated management apparatus 1 is provided with an input unit (e.g. a keyboard, a mouse), and a display (e.g. a monitor, a printer) which visibly displays various kinds of data transmitted from the VM management apparatus 2, the OFC 3 or the server management apparatus 4. The user (manager) controls the VM management apparatus 2, the OFC 3 and the server management apparatus 4 by using the integrated management apparatus 1, and executes the maintenance processing of the computer system.

The integrated management apparatus 1, the VM management apparatus 2, the OFC 3 and the server management apparatus 4 may be configured from a same computer system or different computer systems.

Hereinafter, the details of the operation of the maintenance processing which is executed by the above computer system will be described. The maintenance processing to the physical server or the virtual server in the first exemplary embodiment and the maintenance processing to switch (OFS) in the second to fourth exemplary embodiments will be described. Also, as the maintenance processing, the update of the file and an operation stop (maintenance processing such as the hardware exchange after shutdown) will be described as an example.

First Exemplary Embodiment

Referring to FIG. 10 to FIG. 19, the maintenance processing operation to the physical server or the virtual server of the present invention will be described. In the present invention, after isolating (separating) the server and the virtual machine as the maintenance object from the system, the maintenance processing is carried out to the server. At this time, a method of isolating from the system according to whether the cluster and the maintenance object set to the server is the physical server or the virtual server, and a method of restoring after the maintenance processing are different. The maintenance processing will be described in the following four cases: when the maintenance object server is (1) HA cluster (operating system), (2) HA cluster (standby system), (3) a part of a load distribution cluster, and (4) an independent server. It should be noted that because a method of carrying out the maintenance processing to the virtual server (guest OS) is same as in (4) the independent server, the detailed description is omitted.
(1) Maintenance Processing to Server of HA Cluster (Operating System)

Referring to FIG. 10 to FIG. 13, the maintenance processing to the server set to the HA cluster (operating system) will be described. A case where the physical server 5 as the maintenance object is set to be the HA cluster (operating system) will be described.

Figure 10:
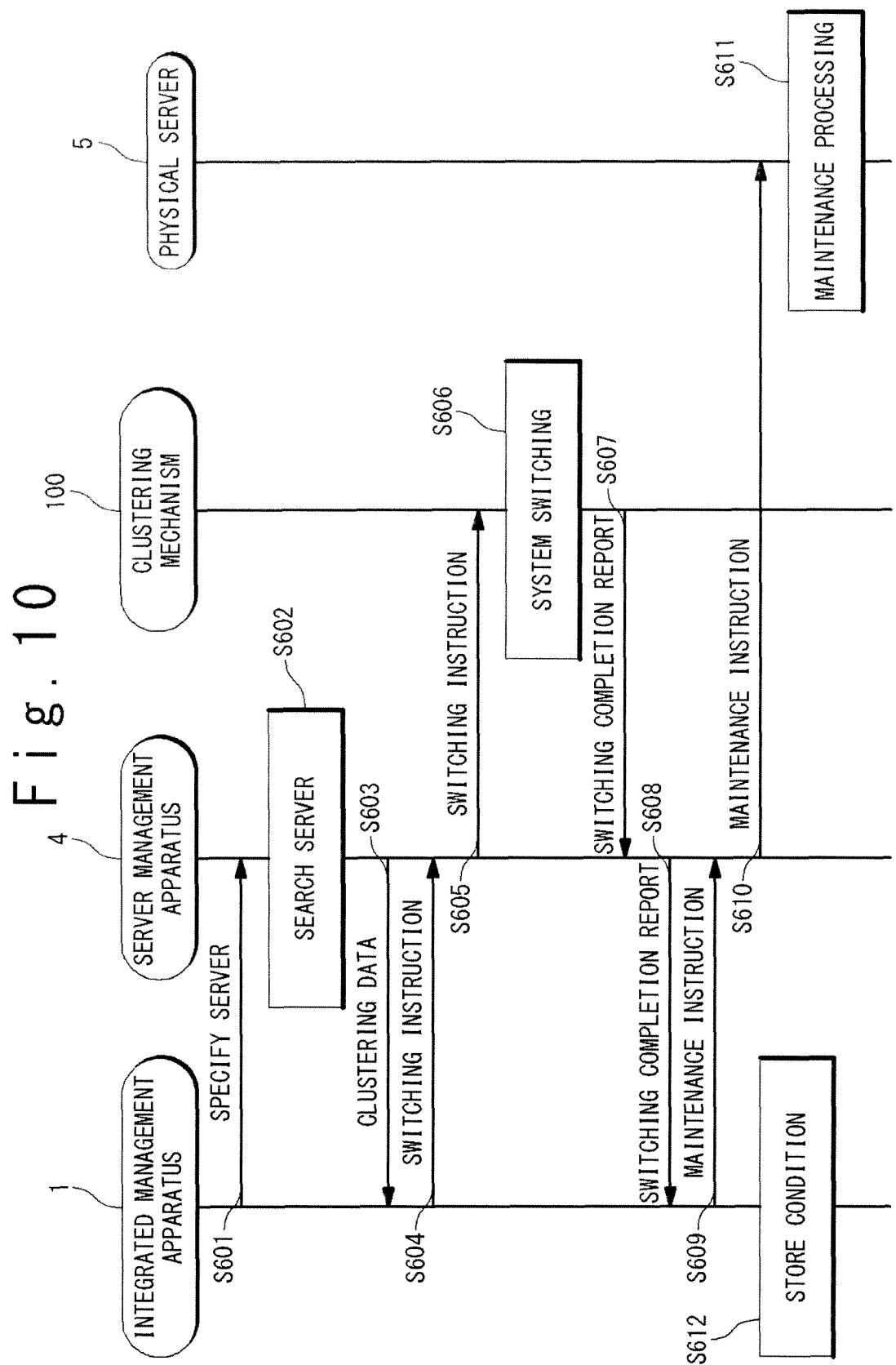
FIG. 10 is a sequence diagram showing maintenance processing operation (maintenance to an operating system server) in a first exemplary embodiment.

FIG. 10 is a sequence diagram showing the maintenance processing (maintenance processing to the operating system server) of the first exemplary embodiment. Referring to FIG. 10, the update (e.g. upgrade of OS) of a file to the physical server 5 of the HA cluster (operating system) will be described. First, the manager operates the integrated management apparatus 1, specifies the server as a maintenance object (file updating object in this example) and instructs the separation of the maintenance object server. The integrated management apparatus 1 specifies the server as the maintenance object, and requests situation data (cluster configuration) of the server which is specified by the manager, to the server management apparatus 4 (Step S601). Here, the physical server 5 is supposed to be specified as the maintenance object. Hereinafter, the specified server is referred to as a maintenance object server 5.

The server management apparatus 4 searches configuration data (not shown) which contains the clustering and the operation situation of the server and which is retained by itself, extracts data (clustering data) which specifies the cluster which has been set to the maintenance object server 5, and transmits the extracted data to the integrated management apparatus 1 (Steps S602 and S603). Here, the clustering data showing that the maintenance object server 5 has been set to the HA cluster (operating system) is transmitted.

When detecting that the maintenance object server 5 is the HA cluster (operating system), the integrated management apparatus 1 shifts to system switching processing. In detail, when detecting that the maintenance object server 5 is the HA cluster (operating system), the integrated management apparatus 1 instructs the server management apparatus 4 to switch the system of the HA cluster (Step S604). The server management apparatus 4 instructs the switching of the operating system to the clustering mechanism 100 of the maintenance object server 5 (Step S605). The clustering mechanism 100 of the maintenance object server 5 upgrades the server of the standby system to the operating system and the server of the operating system (maintenance object server 5 in this example) is downgraded to the standby system (Step S606). The clustering mechanism 100 transmits a system switching completion report to the integrated management apparatus 1 through the server management apparatus 4 (Steps S607 and S608).

When the system switching is completed, the control procedure shifts to the maintenance processing (file update in this example). The integrated management apparatus 1 specifies the physical server 5 as the maintenance object server and instructs the server management apparatus 4 to carry out the maintenance processing (file update in this example) (Step S609). The server management apparatus 4 transmits the update file to the maintenance object server 5 and issues a file update instruction (Step S610). The physical server 5 updates its own software based on the update file which is received in response to the file update instruction (Step S611). The server management apparatus 4 transmits the software update completion report of the physical server 5 to the integrated management apparatus 1 when confirming the file update completion in the physical server 5. The integrated management apparatus 1 displays the file update completion to the maintenance object server 5. Thus, the manager can confirm a normal end of the file update to the specified server. It should be noted that the system switched at the step S606 may be automatically returned to the original condition (clustering configuration) after the file update processing is completed at the step S611.

The integrated management apparatus 1 stores the maintenance condition every physical server when receiving a maintenance completion report from the server management apparatus 4 or after a maintenance processing instruction is issued (Step S612). Here, as the maintenance condition, the data showing that the physical server 5 is during the file update, and data (for example, the version data of the software and OS) of the file update completion and the updated file are stored. It should be noted that when the maintenance processing is the file update, the processing of the step S612 may be omitted.

Figure 11:
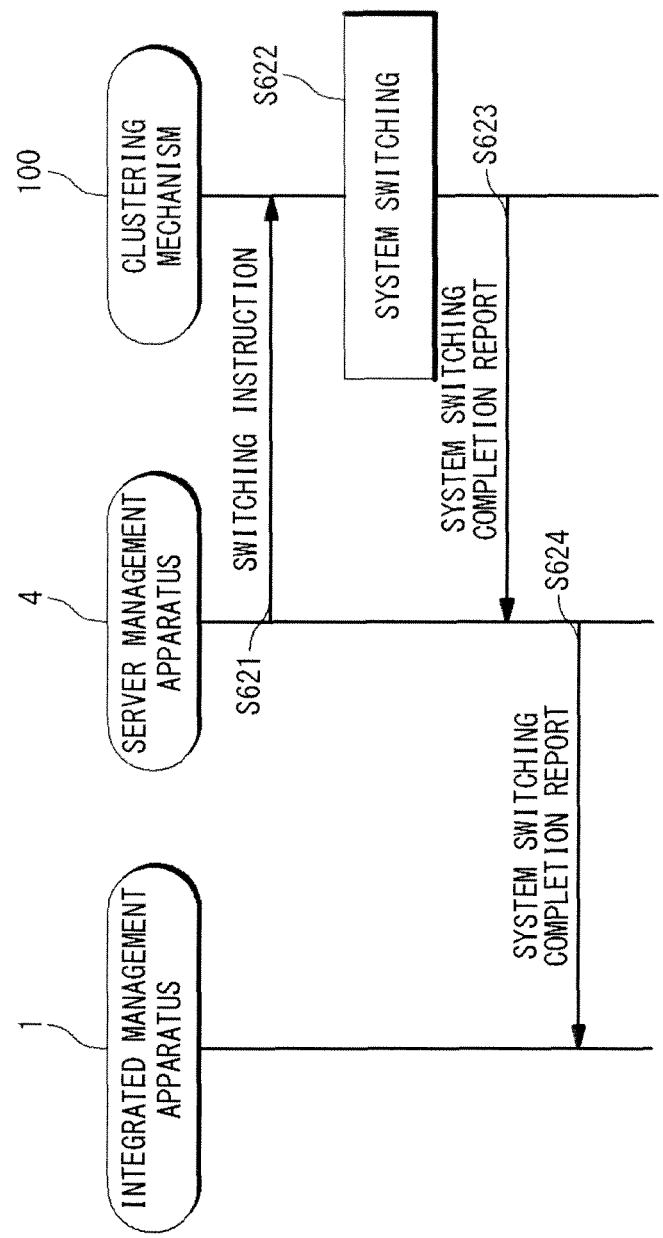
FIG. 11 is a sequence diagram showing the maintenance processing operation (system switching after the maintenance to the operating system server) of the first exemplary embodiment.

FIG. 11 is a sequence diagram showing the operation of the maintenance processing (system switching after the maintenance processing to the operating system server) in the first exemplary embodiment. Referring to FIG. 11, when confirming the file update of the physical server 5, the server management apparatus 4 instructs the switching of the operating system to the clustering mechanism 100 of the maintenance object server 5 (Step S621). The clustering mechanism 100 of the maintenance object server 5 upgrades the standby system server (maintenance object server 5 in this example) to the operating system and the operating system server is downgraded to the standby system (Step S622). The clustering mechanism 100 notifies the system switching completion to the integrated management apparatus 1 through the server management apparatus 4 (Steps S623 and S624).

Next, referring to FIG. 10, the shutdown processing of the physical server 5 which is carried out to maintain the hardware or software of the physical server 5 of the HA cluster (operating system) will be described. Because the maintenance object server 5 is the HA cluster (operating system), the processing of the steps S601 to S608 shown in FIG. 10 is carried out and the switching between the operating system and the standby system is carried out, like the above-mentioned file update processing.

When the system switching is completed, the control flow shifts to the maintenance processing (operation shutdown processing in this example). The integrated management apparatus 1 specifies the physical server 5 as the maintenance object server and instructs the maintenance processing (operation shutdown processing in this example) (Step S609). The server management apparatus 4 issues an operation shutdown instruction to the maintenance object server (Step S610). The physical server 5 stops the operation (carries out the operation shutdown) in response to the operation shutdown instruction (Step S611). The server management apparatus 4 transmits the operation shutdown completion report to the integrated management apparatus 1 when confirming the operation shutdown of the physical server 5. The integrated management apparatus 1 displays that the maintenance object server 5 carried out the operation shutdown. Thus, the manager can confirm the operation shutdown of the specified server.

After issuing the maintenance processing instruction or when receiving a maintenance processing completion report from the server management apparatus 4, the integrated management apparatus 1 stores the condition every physical server (Step S612). In this case, it is desirable that the data showing the operation condition of the maintenance object server 5 (e.g. operation shutdown), the data showing whether or not the maintenance object server 5 is during the maintenance processing, and the data of the clustering set to the maintenance object server 5 are stored. For example, to be the HA cluster (standby system) which the physical server 5 maintains (operation shutdown) is stored. Also, the data of the clustering may contain the data showing the current condition (standby system) after being switched at the step S606 and the condition (operating system) before the switching.

A serviceman carries out the maintenance processing (ex. exchange and addition of the hardware, replacement of software, and so on,) of the physical server 5 which carried out the operation shutdown. When the maintenance processing to the physical server 5 is completed, the manager inputs a maintenance completion instruction to the integrated management apparatus 1. At this time, the server that maintenance processing is completed is specified by the integrated management apparatus 1. The integrated management apparatus 1 starts the physical server 5 which carried out the operation shutdown for the maintenance processing in response to the maintenance completion instruction.

Figure 12:
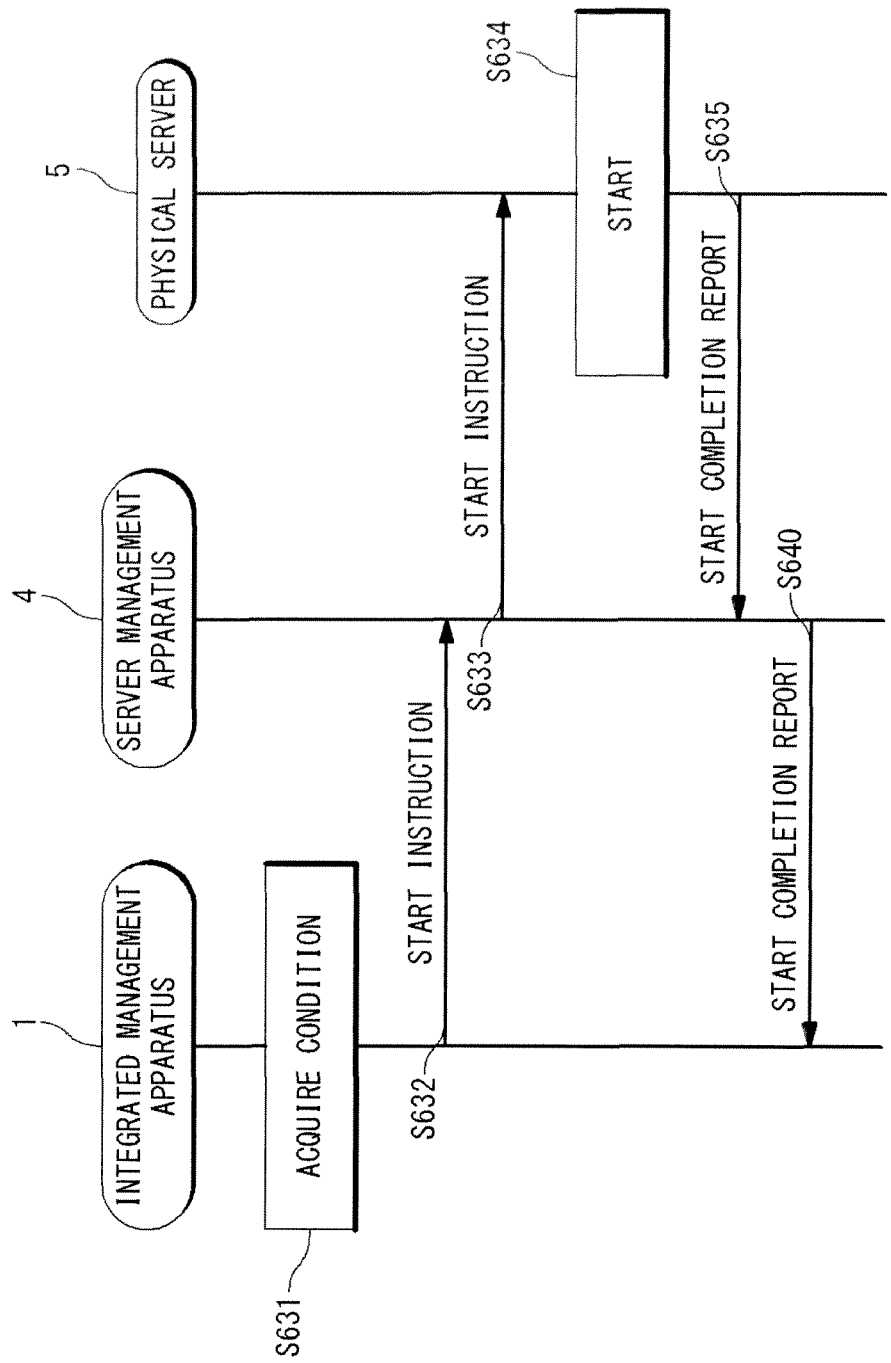
FIG. 12 is a sequence diagram showing start processing operation (system switching) after the maintenance processing by a server according to the present invention.

FIG. 12 is a sequence diagram showing the operation of the start processing (system switching) after the maintenance processing of the server according to the present invention. Referring to FIG. 12, the details of the start processing of the server after the maintenance processing will be described. In response to the maintenance completion instruction (server specification) by the manager, the integrated management apparatus 1 acquires the condition of the server which is specified by the manager from a list of maintaining servers (Step S631). Here, the condition showing that the physical server 5 is the HA cluster (standby system) during operation shutdown (maintaining) is acquired. The integrated management apparatus 1 instructs the start of the specified server (physical server 5 in which maintenance processing is completed) (Step S632). The server management apparatus 4 starts the specified physical server 5 (Steps S633 and S634). For example, here, the start of the server is carried out by using IPMI (Intelligent Platform Management Interface) and so on. The physical server 5 which completed the start processing transmits a start completion report to the integrated management apparatus 1 through the server management apparatus 4 (Steps S635 and S636). The integrated management apparatus 1 stores the data showing that the maintenance processing of the physical server 5 is completed and the server 5 is started. This data can be displayed visibly to the manager.

Figure 13:
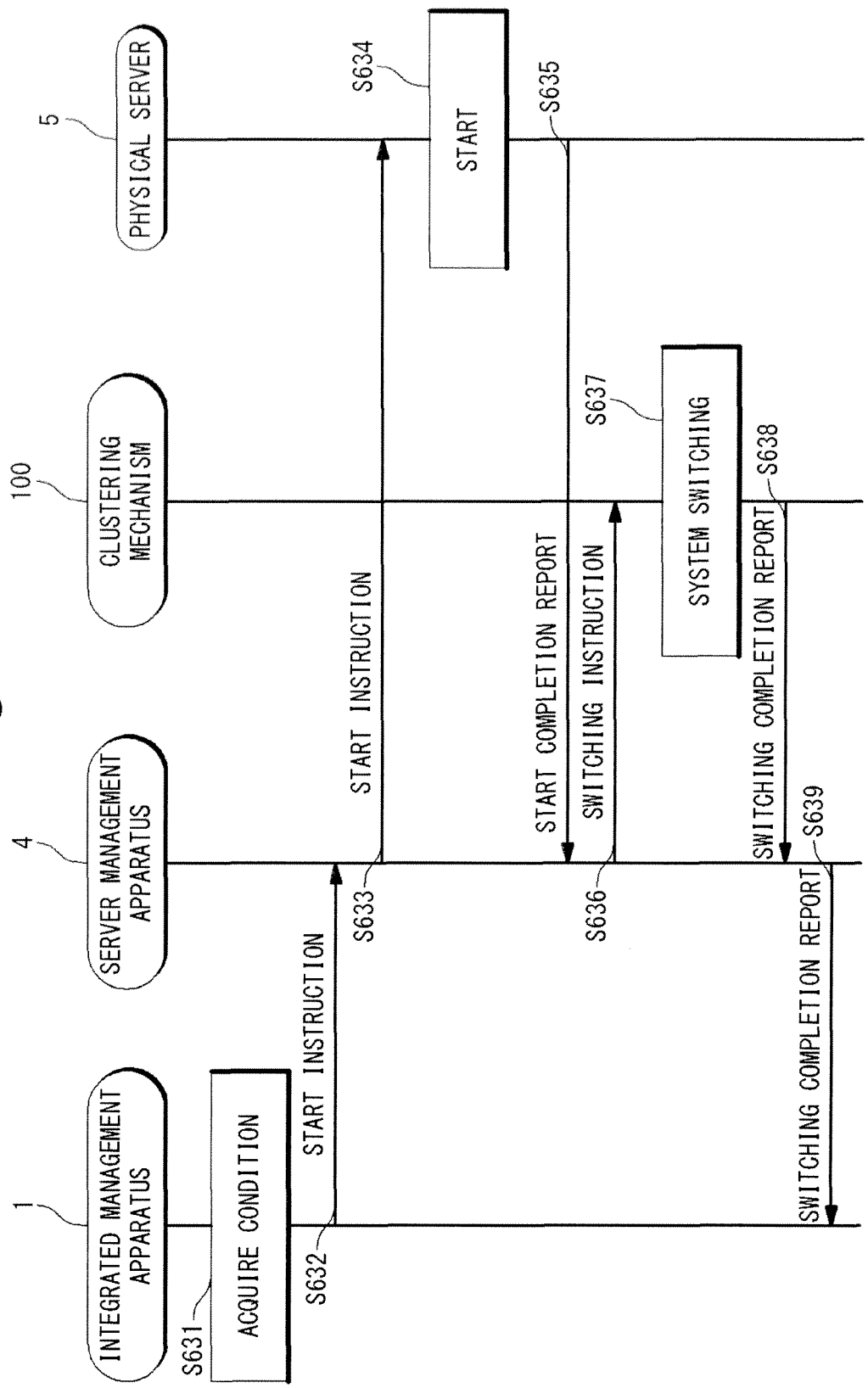
FIG. 13 is a sequence diagram showing the start processing operation (system switched) after the maintenance processing by the server according to the present invention.

When starting a server, the condition of the server may be returned to the condition (HA cluster (operating system)) before the maintenance processing. FIG. 13 is a sequence diagram showing the operation of the start processing (system switched) after the maintenance processing by the server according to the present invention. Referring to FIG. 13, the integrated management apparatus 1 controls the specified physical server 5 to start through the processing of the steps S631 to S634 as mentioned above. However, in case of a start instruction at the step S632, the integrated management apparatus 1 issues a system switching instruction. The server management apparatus 4 instructs switching of the operating system to the clustering mechanism 100 of the physical server 5 when detecting the start completion from the physical server 5 (Step S636). The clustering mechanism 100 of the maintenance object server 5 upgrades the server (physical server 5 that maintenance processing is completed in this example) of the standby system to the operating system and downgrades the server of the operating system to the standby system (Step S637). The clustering mechanism 100 notifies the system switching completion to the integrated management apparatus 1 through the server management apparatus 4 (Steps S638 and S639).

As above mentioned, by the integrated control of the integrated management apparatus 1, the server of the HA cluster (operating system) is separated, and the maintenance processing (file update, the operation shutdown, and start processing) to the server is carried out. The original condition can be recovered through the system switching.

(2) Maintenance Processing to Server of HA Cluster (Standby System)

Figure 14:
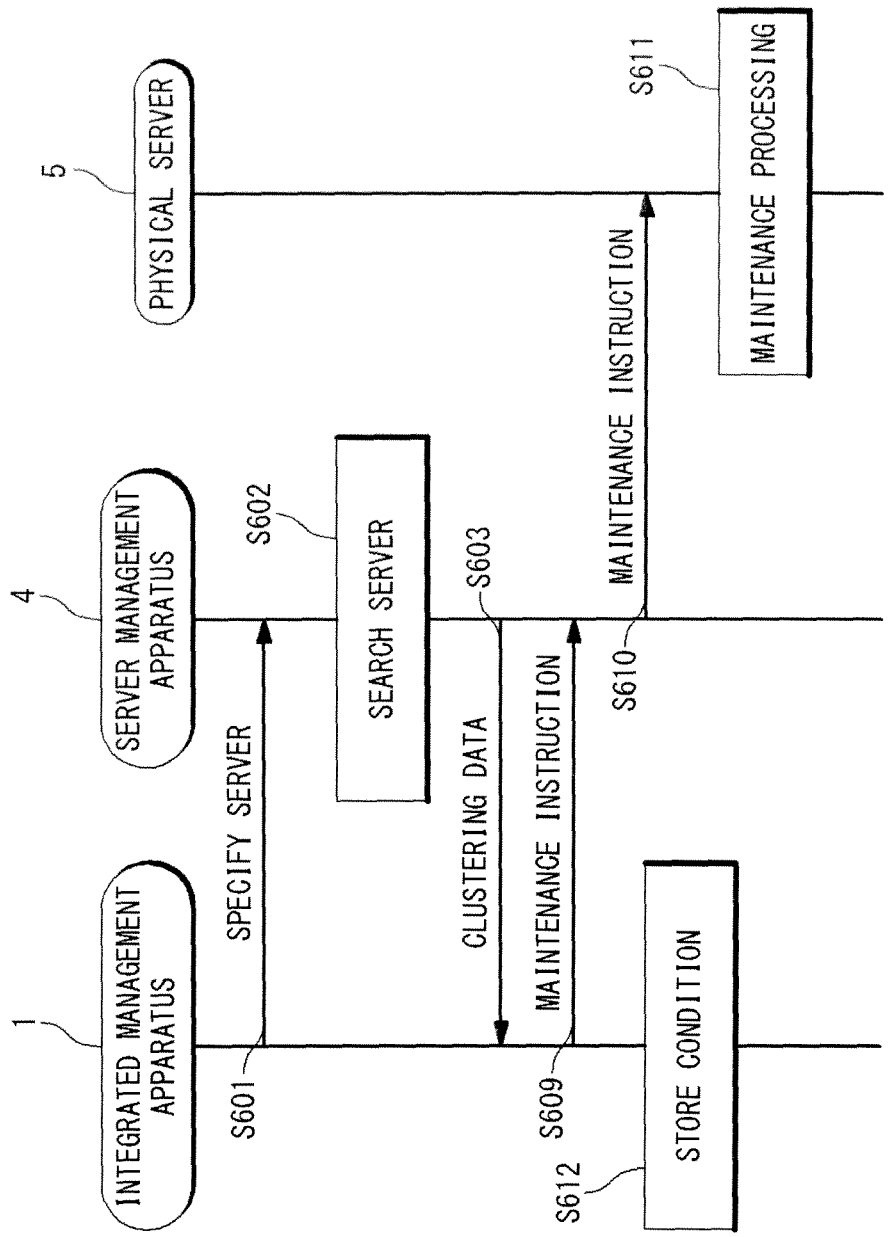
FIG. 14 is a sequence diagram showing the maintenance processing operation (maintenance to a standby system server) of the first exemplary embodiment.

Referring to FIG. 12 and FIG. 14, the maintenance processing to the server set as the HA cluster (standby system) will be described. The description will be made, supposing that the physical server 5 as the maintenance object is set to the HA cluster (standby system).

FIG. 14 is a sequence diagram showing the operation of the maintenance processing (maintenance processing to the standby system server) in the first exemplary embodiment. Referring to FIG. 14, the file update (e.g. the upgrade of the OS) to the physical server 5 of the HA cluster (standby system) will be described. Like the maintenance processing to the server of the HA cluster (operating system), through the processing of the steps S601 to S603, the integrated management apparatus 1 detects that the maintenance object server 5 is the HA cluster (standby system).

When detecting that the maintenance object server 5 is the HA cluster (standby system), the integrated management apparatus 1 does not carry out the system switching and carries out the maintenance processing (file update in this example). The integrated management apparatus 1 specifies the physical server 5 as the maintenance object server and instructs the server management apparatus 4 to carry out the maintenance processing (file update in this example) (Step S609). The server management apparatus 4 transmits the update file to the maintenance object server 5 and issues the file update instruction (Step S610). The physical server 5 updates its own software with the received update file in response to the file update instruction (Step S611). The server management apparatus 4 transmits the software update completion report of the physical server 5 to the integrated management apparatus 1 when confirming the file update completion to the physical server 5. The integrated management apparatus 1 displays the file update completion in the maintenance object server 5. Thus, the manager can confirm the normal end of the file update of the specified server.

The integrated management apparatus 1 stores the maintenance condition every physical server when receiving the maintenance completion report from the server management apparatus 4 or after the maintenance processing instruction (Step S612). Here, the data showing that the physical server 5 is during file update, as the maintenance condition and data (for example, the version data of the software and OS) of the file update completion and the update file are stored. It should be noted that when the maintenance processing is the file update, the processing of the step S612 may be omitted.

Next, referring to FIG. 14, the processing which stops the operation (carries out the operation shutdown) of the physical server 5, in order to maintain the hardware or software of the physical server 5 of the HA cluster (standby system) will be described. When detecting that the maintenance object server 5 is the HA cluster (standby system), the integrated management apparatus 1 does not carry out the system switching and carries out the maintenance processing (operation stop in this example).

In detail, the integrated management apparatus 1 specifies the physical server 5 as the maintenance object server and instructs maintenance processing (operation shutdown processing in this example) (Step S609). The server management apparatus 4 issues an operation shutdown instruction to the maintenance object server 5 (Step S610). The physical server 5 stops the operation (carries out the operation shutdown) in response to the operation shutdown instruction (Step S611). The server management apparatus 4 transmits the operation shutdown completion report to the integrated management apparatus 1 when confirming the operation shutdown of the physical server 5. The integrated management apparatus 1 displays that the maintenance object server 5 carries out the operation shutdown. Thus, the serviceman can confirm the operation shutdown of the specified server.

When receiving a maintenance completion report from the server management apparatus 4 or after the maintenance processing instruction, the integrated management apparatus 1 stores the condition every physical server (Step S612). In this case, it is desirable that the data showing the operation condition of the maintenance object server 5 (e.g. operation shutdown), the data showing whether or not the maintenance object server 5 is during the maintenance processing, and the data of the clustering set to the maintenance object server 5 are stored. For example, is stored that the physical server is the HA cluster (standby system) during the maintenance processing (operation shutdown). Also, the data of the clustering may contain data showing the current condition (standby system) after being switched at the step S606 and the condition (operating system) before the switching.

The serviceman carries out the maintenance processing (e.g. the exchange and addition of the hardware, the replacement of the software, and so on,) of the physical server 5 in which the operation shutdown is carried out. When the maintenance processing to the physical server 5 is completed, the manager inputs the maintenance completion instruction to the integrated management apparatus 1. At this time, the server that the maintenance processing is completed is specified by the integrated management apparatus 1. The integrated management apparatus 1 starts the physical server 5, which carries out the operation shutdown for the maintenance processing, in response to the maintenance completion instruction. Because a method of start is same as the method shown in FIG. 12, the description is omitted.

As above mentioned, after separating the server of the HA cluster (standby system) through the integrated control by the integrated management apparatus 1, the maintenance processing (file update, the operation shutdown and the start processing) to the server can be executed.

(3) Maintenance Processing to Server Set as Part of Load Distribution Cluster

Referring FIG. 15 to FIG. 16, the maintenance processing to a server (hereinafter, to be referred to as the load distribution system server) set as a part of the load distribution cluster will be described. A case where the physical server 5 as the maintenance object is set to the part of the load distribution cluster will be described.

Figure 15:
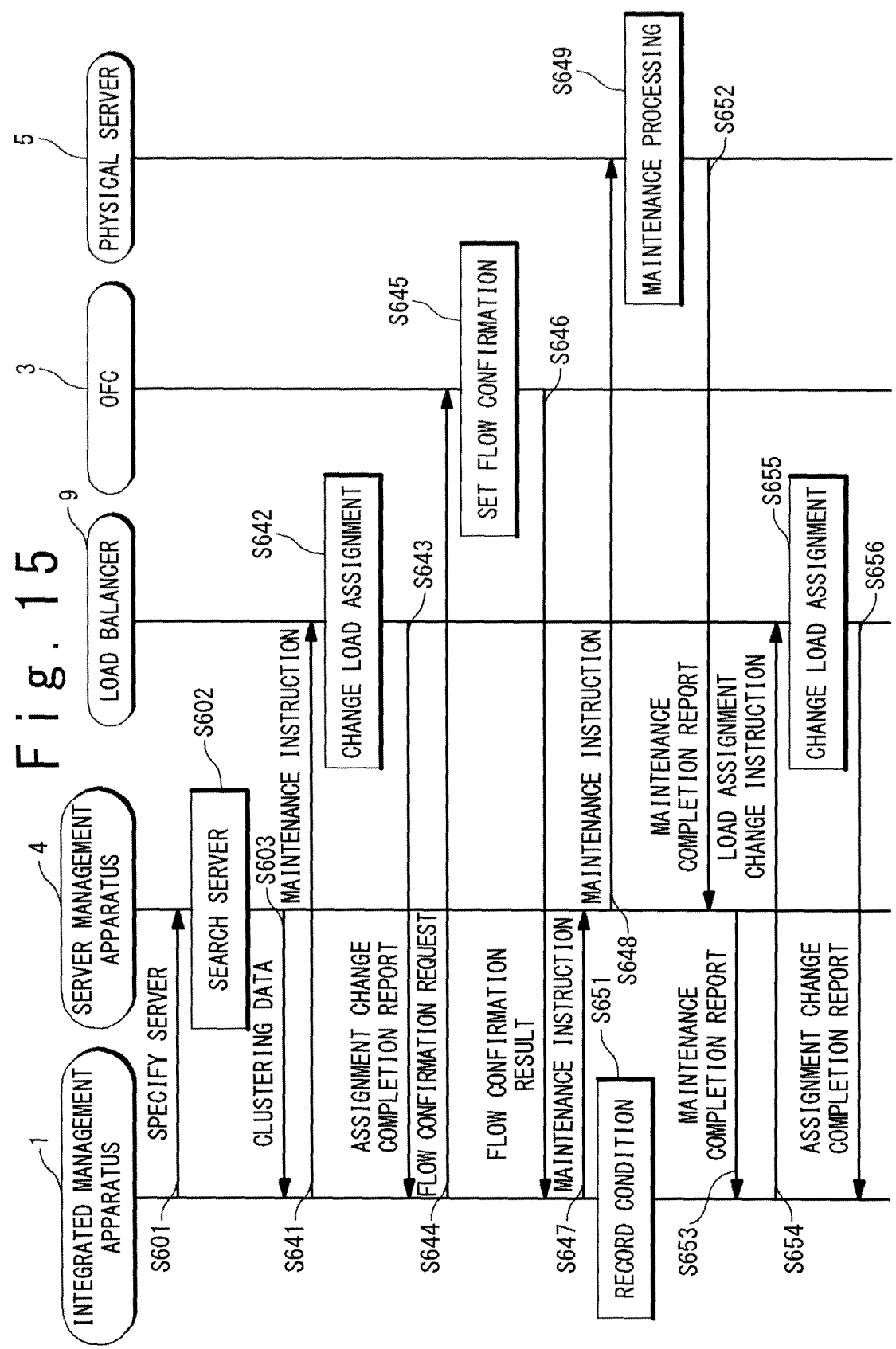
FIG. 15 is a sequence diagram showing the maintenance processing operation (maintenance to a load distribution system server) of the first exemplary embodiment.

FIG. 15 is a sequence diagram showing the operation of the maintenance processing (maintenance processing to the load distribution system server) of the first exemplary embodiment. Referring to FIG. 15, the update (e.g. the upgrade of the OS) of the file to the physical server 5 set to the part of the load distribution cluster will be described. Like the maintenance processing to the server of the HA cluster (operating system), through the processing of the steps S601 to S603, the integrated management apparatus 1 detects that the maintenance object server 5 is set to the part of the load distribution cluster. The clustering data which is transmitted from the server management apparatus 4 at the step S603 contains data which specifies the load balancer 9 along with data showing that the maintenance object server 5 is the load distribution system server.

When detecting that the maintenance object server 5 is the load distribution system server, the integrated management apparatus 1 issues a change instruction of the assignment of load (processing) to the maintenance object server 5 to the specified load balancer 9 (Step S641). The load balancer 9 stops the assignment of the processing to the maintenance object server 5 which is specified by the integrated management apparatus 1 in response to the load assignment change instruction (Step S642). The load balancer 9 which changed the assignment of the processing assigns a load and transmits a change completion report to the integrated management apparatus 1 (Step S643).

Also, the integrated management apparatus 1 waits until a flow according to the data transfer to the maintenance object server 5 becomes a non-set condition (non-set condition to all the OFS), and instructs the maintenance processing after confirming the non-set condition. In detail, when detecting that the maintenance object server 5 is the load distribution system server, the integrated management apparatus 1 specifies the MAC address of the maintenance object server 5, and issues a confirmation request of whether or not the flow according to the data transfer to the maintenance object server 5 is set, to the OFC 3 (Step S644). At this time, the MAC address of the physical server 5 is specified for the purpose to specify the maintenance object server. The OFC 3 specifies a flow as the confirmation object based on the specified MAC address, and refers to the setting data 446 of the flow table 334 to confirm whether or not a flow according to the data transfer to the physical server 5 is set to the switch (OFS) on a communication route to the physical server 5 (Step S645). When the flow has been set, the OFC 3 waits for a predetermined time and confirms once again. In this case, the flow set to the OFS 4*i* is set to be deleted when the predetermined time lapses (time until deletion is set to the OFS together with the flow by the OFC 3). Therefore, when the predetermined time passes, the flow of the confirmation object becomes the non-set condition. In the OFS 4*i*, it is desirable to delete the flow in the period when there is not reception of the packet which controls processing by using the flow. Generally, the time until the flow is deleted is set as a sufficiently long time until the communication according to the flow is not carried out.

The OFC 3 repeats the confirmation processing and the wait processing at the step S645 until the flow according to the data transfer to the physical server 5 becomes a non-set condition to all the OFSs, and transmits the confirmation result data showing the non-set condition to the integrated management apparatus 1 when confirming the non-set condition (Step S646). It should be noted that an order of the load assignment change processing and the confirmation processing of a flow set may be the order and an opposite order shown in FIG. 15 and these may be carried out in parallel.

The integrated management apparatus 1 can confirm the stop of the data transfer to the maintenance object server 5 by confirming that a flow to the maintenance object server 5 is not set.

The control procedure shifts to the maintenance processing (file update in this example) when the non-set of the flow to the maintenance object server 5 is confirmed. The integrated management apparatus 1 specifies the physical server 5 as the maintenance object server and instructs the server management apparatus 4 to carry out maintenance processing (file update in this example) (Step S647). The server management apparatus 4 transmits the update file to the maintenance object server 5 and issues the file update instruction (Step S648). The physical server 5 updates its own software with the update file which is received in response to the file update instruction (Step S649). The server management apparatus 4 transmits the software update completion report of the physical server 5 to the integrated management apparatus 1 when confirming the file update completion of the physical server 5 (Steps S652 and S653). The integrated management apparatus 1 displays the completion of the file update in the maintenance object server 5. Thus, the manager can confirm the normal end of the file update of the specified server.

When receiving the maintenance completion report from the server management apparatus 4 or after the maintenance processing instruction, the integrated management apparatus 1 stores the maintenance condition every physical server (Step S651). In this case, as the maintenance condition, data showing that the physical server 5 is during file update, and data of the file update completion and the update file (for example, the version data of the software and OS) are stored. It should be noted that when the maintenance processing is the file update, the processing of the step S651 may be omitted.

When completing the maintenance processing (file update), the assignment of the load (processing) changed at the step S642 is returned to the original condition. In detail, when confirming the file update of the physical server 5, the integrated management apparatus 1 issues the change instruction of the assignment of the load (processing) to the maintenance object server 5, to the load balancer 9 (Step S654). The load balancer 9 starts the assignment of the processing to the maintenance object server 5 specified by the integrated management apparatus 1 in response to the change instruction (Step S655). Which having changed the assignment of the processing, the load balancer 9 transmits a load assignment change completion report to the integrated management apparatus 1 (Step S656). The integrated management apparatus 1 displays the load assignment change completion. Thus, the manager can confirm the normal end of the whole of processing according to the file update of the specified server.

Next, referring to FIG. 15, the processing which stops the operation (carries out the operation shutdown) of the physical server 5, in order to maintain the hardware or software of the load distribution system server (physical server 5 in this example) will be described. Because the maintenance object server 5 is the load distribution system server, the processing of the steps S601 to 3646 shown in FIG. 15 is carried out like the above-mentioned file update processing, and the assignment of the processing to the maintenance object server 5 is stopped and it is confirmed that the flow according to the data transfer to the maintenance object server 5 is not set.

When completing the change of the load assignment and the non-set flow confirmation, the control procedure shifts to the maintenance processing (operation shutdown processing in this example). The integrated management apparatus 1 specifies the physical server 5 as the maintenance object server and instructs the maintenance processing (operation shutdown processing in this example) (Step S647). The server management apparatus 4 issues the operation shutdown instruction to the maintenance object server 5 (Step S648). The physical server 5 stops the operation (carries out the operation shutdown) in response to the operation shutdown instruction (Step S649). The server management apparatus 4 transmits the operation shutdown completion report to the integrated management apparatus 1 when confirming the operation shutdown of the physical server 5 (Steps S652 and S653). The integrated management apparatus 1 displays that the maintenance object server 5 carried out the operation shutdown. Thus, the manager can confirm the operation shutdown of the specified server.

When receiving the maintenance completion report from the server management apparatus 4 or after the maintenance processing instruction, the integrated management apparatus 1 stores the condition every physical server (Step S612). In this case, it is desirable that the data showing the operation condition of the maintenance object server 5 (e.g. operation shutdown), the data showing whether or not the maintenance object server 5 is in the maintenance processing, and the data of the clustering set to the maintenance object server 5 are stored. For example, it is stored that the physical server 5 is the load distribution system server which in the maintenance processing (operation shutdown).

The serviceman carries out the maintenance processing (e.g. the exchange and addition of the hardware, the replacement of software, and so on,) of the physical server 5 which carried out the operation shutdown. When the maintenance processing to the physical server 5 is completed, the manager inputs the maintenance completion instruction to the integrated management apparatus 1. At this time, the server in which maintenance processing is completed is specified by the integrated management apparatus 1. The integrated management apparatus 1 starts the physical server 5, in which the operation shutdown is carried out for the maintenance processing, in response to the maintenance completion instruction.

FIG. 16 is a sequence diagram showing a start processing operation after the maintenance processing by the load distribution system server according to the present invention. Referring to FIG. 16, the details of the start processing operation of the server after the maintenance processing to the load distribution system server will be described. In response to the maintenance completion instruction (server specification) from the serviceman, the integrated management apparatus 1 acquires the condition of the server which is specified by the serviceman, from a list of servers in the maintenance processing (Step S631). Here, the condition showing that the physical server 5 is the load distribution system server in the operation shutdown (maintenance processing) is acquired. The integrated management apparatus 1 instructs the start of the specified server (physical server 5 that maintenance processing is completed) (Step S632). The server management apparatus 4 start the specified physical server 5 (Steps S633 and S634). For example, here, the start of the server is carried out by using IPMI and so on.

The physical server 5 which has been started transmits the start completion report to the integrated management apparatus 1 through the server management apparatus 4 (Steps S635 and S636). When the start of the maintenance object server 5 is completed, the assignment of the load (processing) changed at the step S642 is returned to the original condition. In detail, when confirming the file update of the physical server 5, the integrated management apparatus 1 issues the change instruction of the assignment of the load (processing) to the maintenance object server 5, to the load balancer 9 (Step S661). The load balancer 9 starts the assignment of the processing to the maintenance object server 5 specified by the integrated management apparatus 1 in response to the change instruction (Step S662). When changing the assignment of the processing, the load balancer 9 assigns a load and transmits the change completion report to the integrated management apparatus 1 (Step S663). The integrated management apparatus 1 displays the load assignment change completion. Thus, the manager can confirm the normal end of the whole processing according to the file update of the specified server.

As above mentioned, through the integrated control by the integrated management apparatus 1, the load assignment is controlled to separate the load distribution system server and the maintenance processing (file update, the operation shutdown and the start processing) to the load distribution system server can be carried out. At this time, by the flow monitoring function by the OFC 3, it is possible to wait the maintenance processing until a flow of the transfer data to the maintenance object server becomes non-set.

(4) Maintenance Processing to Independent Server

Figure 18B:
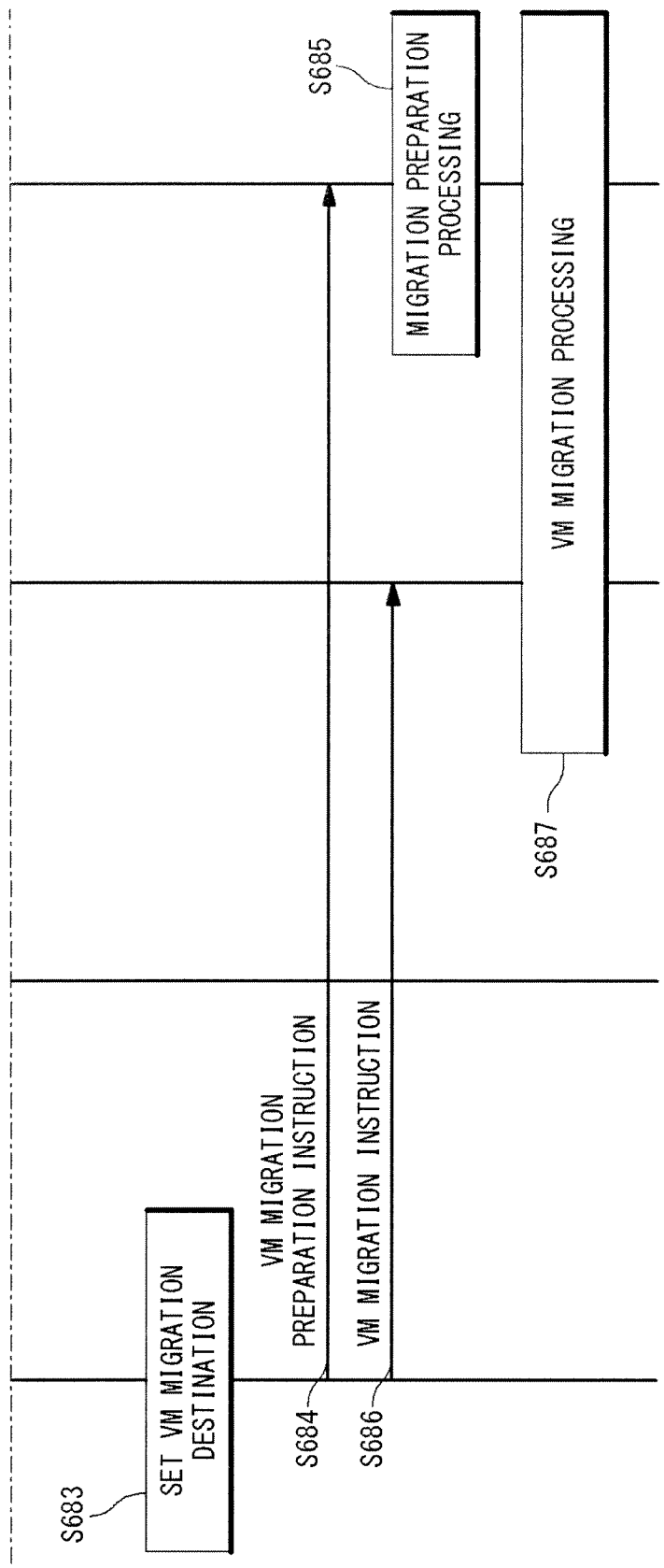
FIG. 18B is a sequence diagram showing the preparation processing operation of the maintenance processing to the independent server (VMM operation) of the first exemplary embodiment.
Figure 19:
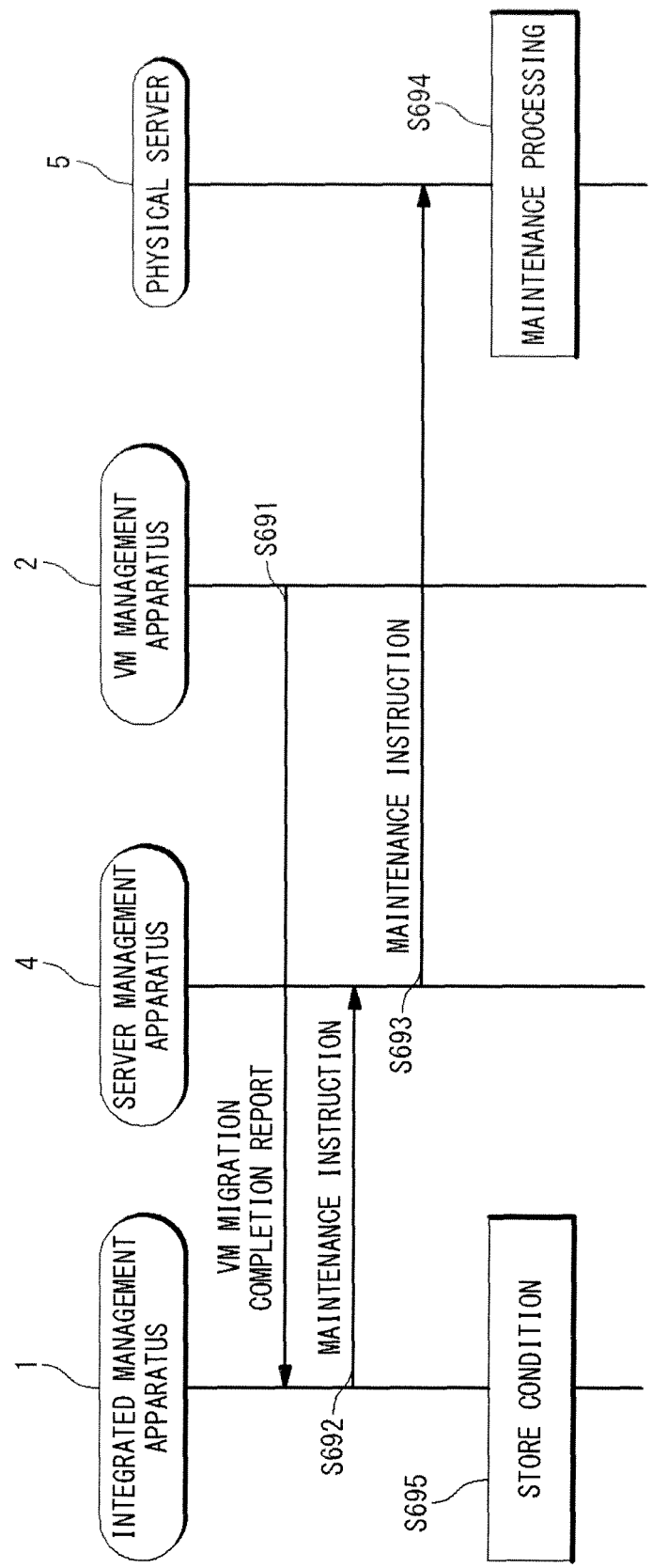
FIG. 19 is a sequence diagram showing the maintenance processing operation after migration of a virtual machine in the first exemplary embodiment.

Referring to FIG. 17 to FIG. 19, the maintenance processing to the independently operated server (hereinafter, to be referred to as an independent server) will be described. The description will be made, supposing that the physical server 5 as the maintenance object is the independent server.

When maintaining the independent server, a method of processing is different depending on whether or not the VMM (virtual machine monitor) is operating on the server. The update and exchange of the hardware or software is carried out after stopping the operation. FIG. 17 is a sequence diagram showing the shutdown operation to the independent server (the VMM does not operate) of the first exemplary embodiment. Referring to FIG. 17, like the maintenance processing to the server of the HA cluster (operating system), through the processing of the steps S601 to S603, the integrated management apparatus 1 detects that the maintenance object server 5 is the independent server.

When detecting that the maintenance object server 5 is the independent server, the integrated management apparatus 1 specifies the maintenance object server to the VM management apparatus 2 and issues an operation confirmation request of the VMM (Step S671). The VM management apparatus 2 transmits operation situation data showing whether or not the VMM is operating on the physical server 5 which is specified as the maintenance object server, to the integrated management apparatus 1 (Step S672). The integrated management apparatus 1 displays the operation situation of the VMM in the maintenance object server 5 (Step S673). The serviceman can set whether or not the maintenance object server 5 should be stopped by confirming the operation situation. Generally, when the VMM is not operating on the maintenance object server 5, the serviceman issues an instruction to stop the maintenance object server 5 by using the integrated management apparatus 1.

The integrated management apparatus 1 specifies the physical server 5 as the maintenance object server and instructs operation shutdown processing (Step S674). The server management apparatus 4 issues the operation shutdown instruction to the maintenance object server 5 (Step S675). The physical server 5 carries out the operation shutdown in response to the operation shutdown instruction (Step S676). The server management apparatus 4 waits for a predetermined time, and transmits the operation shutdown completion report to the integrated management apparatus 1 when confirming that the operation shutdown of the physical server 5 (Steps S677 and S678). The integrated management apparatus 1 displays that the maintenance object server 5 stopped in the operation. Thus, the serviceman can confirm the operation shutdown of the specified server.

On the other hand, when the VMM is operating on the maintenance object server 5, the migration processing of the virtual machine (VM) is carried out by the operation shown in FIG. 18A and FIG. 18B. For example, when the maintenance object unit is the host OS of the physical server 5 and hardware, the VM 101 to the VM 10*n* are migrated to the other physical server.

FIG. 18A and FIG. 18B are a sequence diagram showing the operation of the preparation processing of the maintenance processing to the independent server (the VMM operates) in the first exemplary embodiment. Referring to FIG. 18A, like the maintenance processing to the server of the HA cluster (operating system), the integrated management apparatus 1 detects that the maintenance object server 5 is the independent server, through the processing of the steps S601 to S603.

When detecting that the maintenance object server 5 is the independent server, the integrated management apparatus 1 specifies the maintenance object server to the VM management apparatus 2 and issues the operation confirmation request of the VMM (Step S671). The VM management apparatus 2 transmits operation situation data showing whether or not the VMM is operating on the physical server 5 which is specified as the maintenance object server, to the integrated management apparatus 1 (Step S672). The integrated management apparatus 1 displays the operation situation of the VMM at the maintenance object server 5 (Step S673). The serviceman can set whether or not the maintenance object server 5 is stopped, by confirming an operation situation. Here, the VMM is operating is shown.

When detecting the operation of the VMM, the integrated management apparatus 1 specifies the VMM and requires data (VMM data 324) of the VM which is operating on the maintenance object server 5 for the VM management apparatus 2 (Step S681). The VM management apparatus 2 transmits a list (VMM data 324) of the VMs which are operating on the specified VMM to the integrated management apparatus 1 (Step S682). The integrated management apparatus 1 sets a migration destination of each VM shown in the acquired VMM data 324 (Step S683).

It is desirable that the migration destination of the VM is the VMM which is accessible to the same storage unit as a migration object VM. This is because the processing which access limitation to the storage unit is changed is sometimes added at the time of the migration of the virtual machine. Also, when the virtual switch is not a switch controlled by a flow set by the OFC 3 (in case of the layer 2 switch to which the open flow technique is not applied), a migration destination of the VM is necessary to belong to a subnet which is identical to that before the migration. When the virtual switch functions as the OFS, the VMM which belongs to a different subnet may be set as the migration destination of the VM.

Also, when there are a plurality of VMMs which meet the above-mentioned condition, it is desirable that the VMM which meets the following conditions (a) to (c) is primarily set as the migration destination. That is, it is desirable to primarily set:

(a) a VMM that itself is directly connected to the last stage switch (OFS 4*i*) which is directly connected to a migration source VMM, (b) a VMM that the number of the OFS 4*i* is less which is used for communication with the migration source VMM in the transfer of memory images which accompanies the migration, and (c) a VMM which is connected with the OFS on the communication route used by the migration source VMM.

By primarily setting the VMM which meets the above condition (a) as the migration destination, a switch which resetting a flow with route change becomes only the last stage switch. Also, the switch which undergoes influence of the transfer of the memory image which accompanies the migration of the VM becomes only the last stage switch.

By primarily setting the VMM which meets the above condition (b) as a migration destination, the number of the switches which undergo influence of the transfer of the memory image which accompanies the migration of the VM can be minimized. Also, the VMM can be selected in which the used resource and load minimum.

By primarily setting the VMM which meets the above condition (c) as a migration destination, the number of the switches in which a flow is reset with route change can be made little.

Moreover, it is desirable that the VMM is determined which becomes the migration destination according to a lower rule (e.g. selected based on the random number), when there are a plurality of VMMs which meet either of the above conditions (a) to (c).

When the migration destination of the VM is determined, the control procedure shifts to the migration processing of the VM. First, the integrated management apparatus 1 issues the VM migration preparation instruction to the OFC 3 (Step S684). The OFC 3 executes the preparation processing of the VM migration in response to the migration preparation instruction (Step S685). The VM migration preparation processing will be described later in detail. However, the OFC 3 calculates a data transfer route to the migration destination VM and the setting of the transfer route of the memory image for the VM migration and carries out the generation and setting of a flow using the route. When the VM migration preparation processing is completed, the OFC 3 notifies the migration destination set every VM to the VM management apparatus 2, and the integrated management apparatus 1 instructs the migration of the VM (Step S686). The integrated management apparatus 1 waits for completion of the migration of all the instructed VMs.

The VM management apparatus 2 executes the migration processing of the VM which operates on the maintenance object server 5 in response to the migration instruction from the integrated management apparatus 1 (Step S687). The migration processing of the VM can be realized by flow setting to the OFS 4*i* and the virtual switches 11 and 21. The details of the migration processing of the VM will be described later.

Referring to FIG. 19, when receiving a VM migration completion report from the VM management apparatus 2, the integrated management apparatus 1 specifies the physical server 5 as the maintenance object server and instructs the server management apparatus 4 to carry out the maintenance processing (file update in this example) (Steps S691 and S692). The server management apparatus 4 transmits the update file to the maintenance object server 5 and issues the file update instruction (Step S693). The physical server 5 updates its own software (e.g. host OS) with the update file which is received in response to the file update instruction (Step S694). The server management apparatus 4 transmits the software update completion report of the physical server 5 to the integrated management apparatus 1, when confirming the file update completion in the physical server 5. The integrated management apparatus 1 displays the file update completion in the maintenance object server 5. Thus, the manager can confirm the normal end of the file update of the specified server.

When receiving the maintenance completion report from the server management apparatus 4 or after the maintenance processing instruction, the integrated management apparatus 1 stores the maintenance condition every physical server (Step S695). In this case, as the maintenance condition, the data showing that the physical server 5 is in the file update state, and the data of the file update completion and update file (for example, the version data of the software and OS) are stored. It should be noted that when the maintenance processing is the file update, the processing of the step S695 may be omitted.

When maintaining the hardware or software of the maintenance object server which is the independent server, the operation shutdown processing of the maintenance object server is carried out as the maintenance processing shown in FIG. 19. In detail, referring to FIG. 19, after the VM completes the migration, the physical server 5 is specified as the maintenance object server and maintenance processing (operation shutdown processing in this example) is instructed (Step S692). The server management apparatus 4 issues the operation shutdown instruction to the maintenance object server 5 (Step S693). The physical server 5 carries out the operation shutdown in response to the operation shutdown instruction (Step S694). The server management apparatus 4 transmits the operation shutdown completion report to the integrated management apparatus 1, when confirming the operation shutdown of the physical server 5. The integrated management apparatus 1 displays that the maintenance object server 5 carries out the operation shutdown. Thus, the manager can confirm the operation shutdown of the specified server.

When receiving the maintenance completion report from the server management apparatus 4 or after the maintenance processing instruction, the integrated management apparatus 1 stores the condition every physical server (Step S695). In this case, it is desirable that the data showing the operation condition of the maintenance object server 5 (e.g. operation shutdown), the data showing whether or not the maintenance object server 5 is in the maintenance state, and the data of the clustering set to the maintenance object server 5 are stored. For example, it is stored that the physical server 5 is the independent server in the maintenance state (operation shutdown).

The serviceman carries out the maintenance processing (e.g. the exchange and addition of the hardware, the replacement of the software, and so on,) of the physical server 5 which carried out the operation shutdown. When the maintenance processing to the physical server 5 is completed, the manager inputs the maintenance completion instruction to the integrated management apparatus 1. At this time, the server in which maintenance processing is completed is specified by the integrated management apparatus 1. The integrated management apparatus 1 starts the physical server 5, which carried out the operation shutdown for the maintenance processing, in response to the maintenance completion instruction. Because a method of starting is same as the method shown in FIG. 12, the description is omitted.

As mentioned above, through the integrated control by the integrated management apparatus 1, the independent server on which the VMM operates is separated from the system and the maintenance processing (file update, the operation shutdown and the start processing) to the server is executed. According to the present invention, when carrying out the maintenance processing to the server on which the VMM is operating, through the set change of the flow by the OFC 3, the VM which operates on the maintenance object server is migrated to another server (VMM). Thus, without stopping the operation of the VM, the maintenance processing of the hardware of the physical server and the host OS (e.g. update and exchange of a file, and repair) can be carried out. Also, because the VM can be migrated only by the setting of the flow to the OFS 4i, the setting on the side of IT becomes unnecessary.

Second Exemplary Embodiment

Referring to FIG. 20 to FIG. 25B, the maintenance processing to switch (OFS 4i) of the present invention will be described. In the present invention, after separating the OFS 4i as the maintenance object by the setting change of the flow by the OFC 3 from the system (communication route), the maintenance processing to the OFS 4i is carried out.

Figure 20:
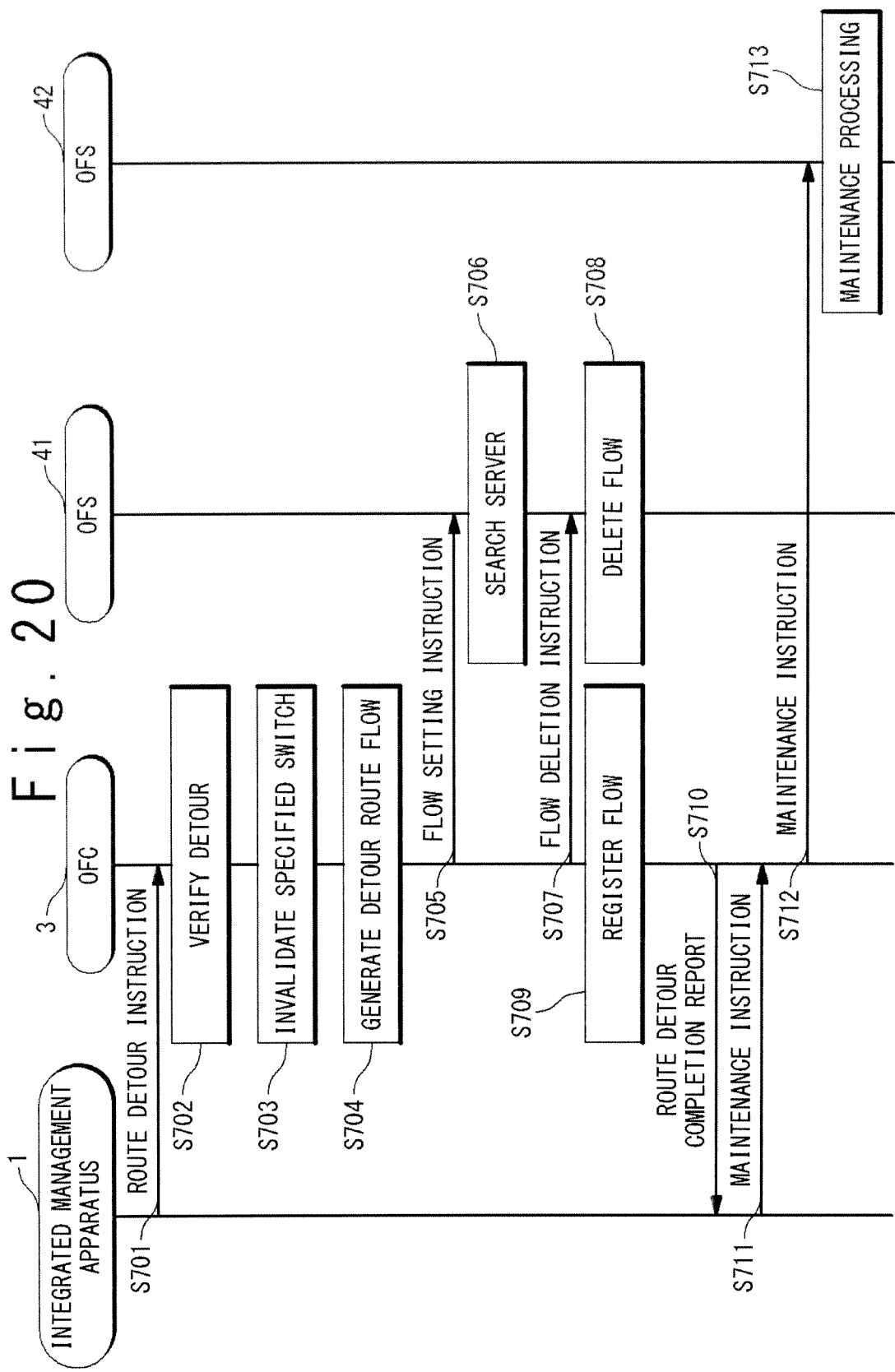
FIG. 20 is a sequence diagram showing the maintenance processing operation to the switch of a second exemplary embodiment.

FIG. 20 is a sequence diagram showing the operation of the maintenance processing to the switch in the second exemplary embodiment. First, referring to FIG. 20 and FIG. 21, the file update processing to the OFS 4i will be described. The manager operates the integrated management apparatus 1 and specifies the OFS 4i as the maintenance object (file update object in this example) and instructs the file update. The integrated management apparatus 1 specifies the OFS 4i as the maintenance object to the OFC 3 and instructs a route detour (Step S701). Here, the OFS 42 is supposed to be specified as the maintenance object, and to be referred to as the maintenance object switch 42.

Figure 21:
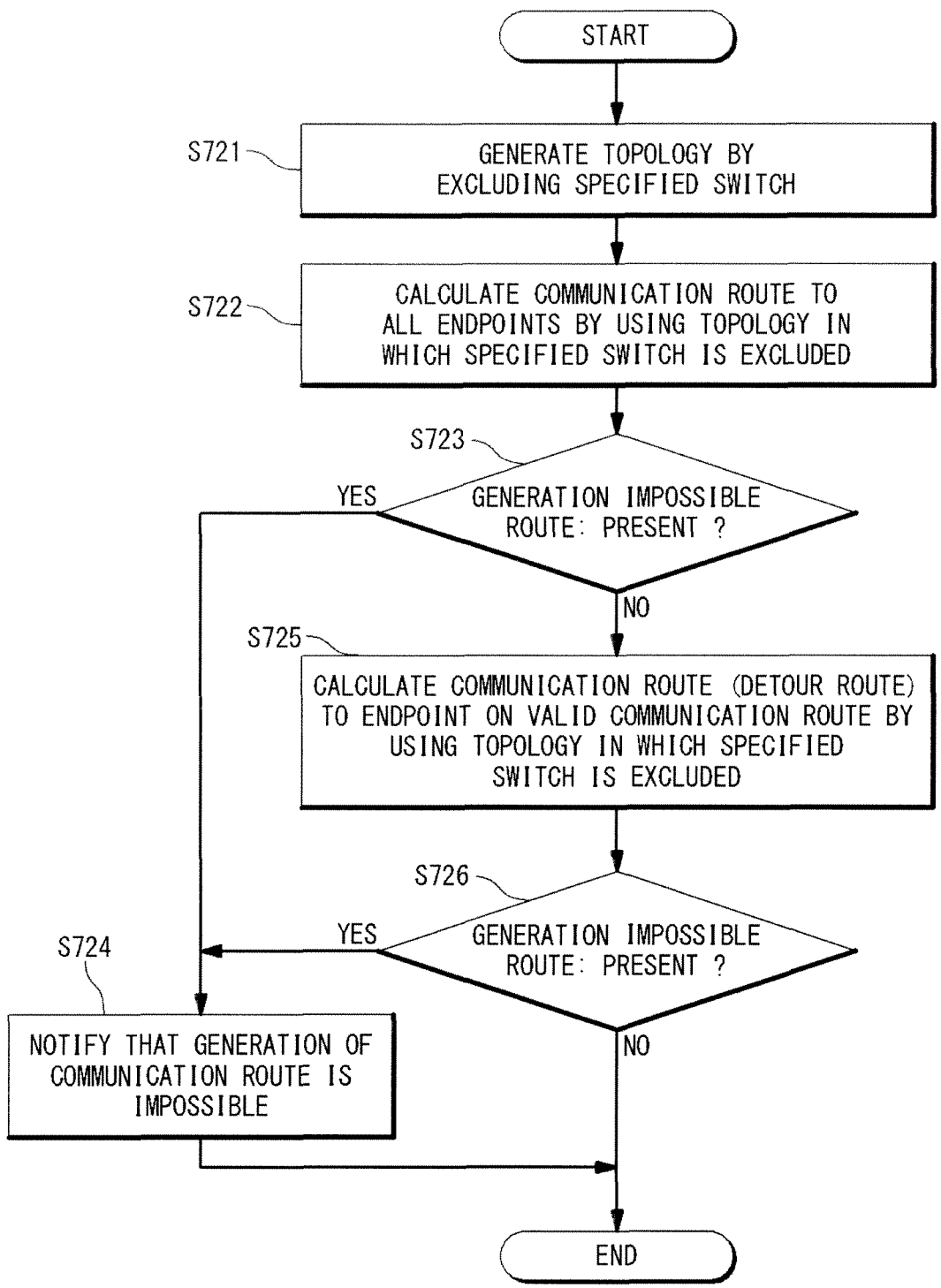
FIG. 21 is a flow chart showing detour verification processing operation in case of the maintenance processing in the second exemplary embodiment.

The OFC 3 verifies whether or not the detour is possible by using the specified switch, in response to the route detour instruction from the statistic management apparatus 1 (Step S702). FIG. 21 is a flow chart showing the details of the detour verification processing at the step S702. Referring to FIG. 21, the OFC 3 generates the topology where the maintenance object switch 42 which is specified in case of the route detour instruction does not exist (Step S721). Next, the OFC 3 verifies whether or not the communication routes to all the endpoints can calculate from the topology generated at the step S721. In detail, the communication route is calculated from the topology generated at the step S721 to all the combination of the endpoints as the external network 8 and the nodes (physical servers 5 and 6) (Step S722).

When the communication route can be calculated from the topology generated at the step S721 to all the combinations of the endpoints, the OFC 3 verifies whether or not alternate route has an influence on the valid communication route. In detail, the OFC 3 calculates the communication route from the topology generated at the step S721 by using each endpoint of the valid communication route (Steps S723 No and S725). At this time, the communication route between the endpoints which do not have an influence on the valid communication route can be calculated by using, for example, the Dijkstra method. Here, the valid communication route is a communication route corresponding to a flow possible to set to the OFS 4i of the flows set to the flow table 334 and shows a usable communication route at present. When there is not a combination of the endpoints which can not be calculate the communication route at the step S725, the control procedure shifts to the invalidation processing (Step S703) of the maintenance object switch 42 shown in FIG. 20.

On the other hand, when the combinations of the endpoints exists in which the communication route can not be calculated at the step S722 and the step S725, the OFC 3 notifies the combinations (sets) of the endpoints in which the communication route can not be calculated, to the integrated management apparatus (Steps S723 Yes and S726 Yes and S724). In this case, the integrated management apparatus 1 displays that the endpoints exist in which the communication route can not exist, and the sets of such endpoints. When there are the combinations of the endpoints in which the communication route can not be calculated at the step S725, the OFC 3 notifies to the integrated management apparatus 1, that a current session can not be sustained by setting a detour. Thus, the integrated management apparatus 1 displays that there is the session which can not be sustained for communication by setting the detour, and the endpoint of the session.

The manager confirms an influence on the current communication due to the detour setting which is displayed in the integrated management apparatus 1 and permission or non-permission of the detour setting, and determines a method for the maintenance processing to the OFS 42. The method for the maintenance processing when the detour route can not be set will be described later.

Referring to FIG. 20, in the detour verification processing at the step S702, the detour route of the maintenance object switch 42 can be calculated. When determining that there is not the influence on the current communication route due to the detour route, the OFC 3 deletes or invalidates the maintenance object switch 42 in the topology data 335 (Step S703). A switch invalidated in the topology data 335 is not used for the calculation of the communication route since then.

The OFC 3 generates a flow corresponding to a new the communication route (detour route) which detours the maintenance object switch (Step S704). In detail, the OFC 3 calculates the communication route (hereinafter, to be referred to as a detour route) from the topology data generated at the step S702 by using the endpoints of a valid communication route (hereinafter, to be referred to as a route before detour). Next, the OFC 3 generates a flow set to each snitch on the calculated detour route. The detour route is calculated to the combinations of the endpoints of all the routes before detour, and the flow set to each switch on each detour route is generated. These flows are all set as the flows (valid flows), which can be set to the switch. According to the flows which are generated here, the OFS 4i is controlled to transfer a reception packet through the detour route.

The OFC 3 sets the flow generated at the step S704 to each of the OFSs on the detour route (Steps S705 and S706). Also, the OFC 3 deletes the flow corresponding to the route before the detour from each OFS on the route before detour (Steps S707 and S708). In an example shown in FIG. 20, the setting and deletion processing of a flow is shown to the OFS 41 which is on both of the communication routes and the route before detour.

The OFC 3 deletes (or invalidates) the flow corresponding to the route before detour set to the flow table 334, and registers (validates) the flow group generated at the step S704 as the usable flows (Step S709). As mentioned above, through the setting of the flow corresponding to the detour route, the communication route is changed, and the communication route which goes around the maintenance object switch 42 is established. When the flow registration is completed, the OFC 3 transmits the detour completion report to the integrated management apparatus 1 (Step S710).

When the detour processing of the communication route is completed, the control procedure shifts to the maintenance processing (file update in this example). The integrated management apparatus 1 specifies the OFS 42 as the maintenance object switch and instructs the OFC 3 to carry out the maintenance processing (file update in this example) (Step S711). The OFC 3 transmits the update file to the maintenance object switch 42 and issues the file update instruction (Step S712). The OFS 42 updates its own software with the update file which is received in response to the file update instruction (Step S713). The OFC 3 transmits the software update completion report of the maintenance object switch 42 to the integrated management apparatus 1 when confirming the file update completion in the OFS 42. The OFC 3 validates or adds the maintenance object switch which completed the file update in the topology data 335 after the file update instruction or after receiving file update completion. The integrated management apparatus 1 displays the file update completion in the maintenance object switch 42. Thus, the manager can confirm the normal end of the file update of the specified server.

In this case, after the file update of the maintenance object switch 42, the changed communication route may be returned to the original condition by the setting of the flow. However, it is desirable not to carry out the re-change of the communication route by considering the processing load necessary for the resetting of the flow and an influence on another communication due to the resetting.

Next, referring to FIG. 20, the processing which stops the operation (carries out the operation shutdown) of the OFS in order to maintain the hardware or software of switch (OFS) will be described. Because the maintenance object switch 42 is bypassed or detoured, the processing at the steps S701 to S710 shown in FIG. 20 is carried out like the above-mentioned file update processing and the change of the communication route to the detour route is carried out.

When the setting of the detour route of the communication route is completed, the control procedure shifts to the maintenance processing (operation shutdown processing in this example). The integrated management apparatus 1 specifies the OFS 42 as the maintenance object switch and instructs the maintenance processing (operation shutdown processing in this example) (Step S711). The OFC 3 issues the operation shutdown instruction to the maintenance object switch 42 (Step S712). The OFS 42 carries out the operation shutdown processing in response to the operation shutdown instruction (Step S713). The OFC 3 transmits the operation shutdown completion report to the integrated management apparatus 1 when confirming the operation shutdown of the OFS 42. The integrated management apparatus 1 displays that the maintenance object switch 42 stopped in the operation. Thus, the manager can confirm the operation shutdown of the specified switch.

The serviceman carries out the maintenance processing (e.g. the exchange and addition of the hardware, the replacement of the software, and so on,) of the OFS 42 which stopped the operation. When the maintenance processing to the OFS 42 is completed, the manager inputs the maintenance completion instruction to the integrated management apparatus 1. At this time, the switch that the maintenance processing is completed is specified by the integrated management apparatus 1. The integrated management apparatus 1 starts the switch, which stopped the operation for the maintenance processing, in response to the maintenance completion instruction.

Figure 22:
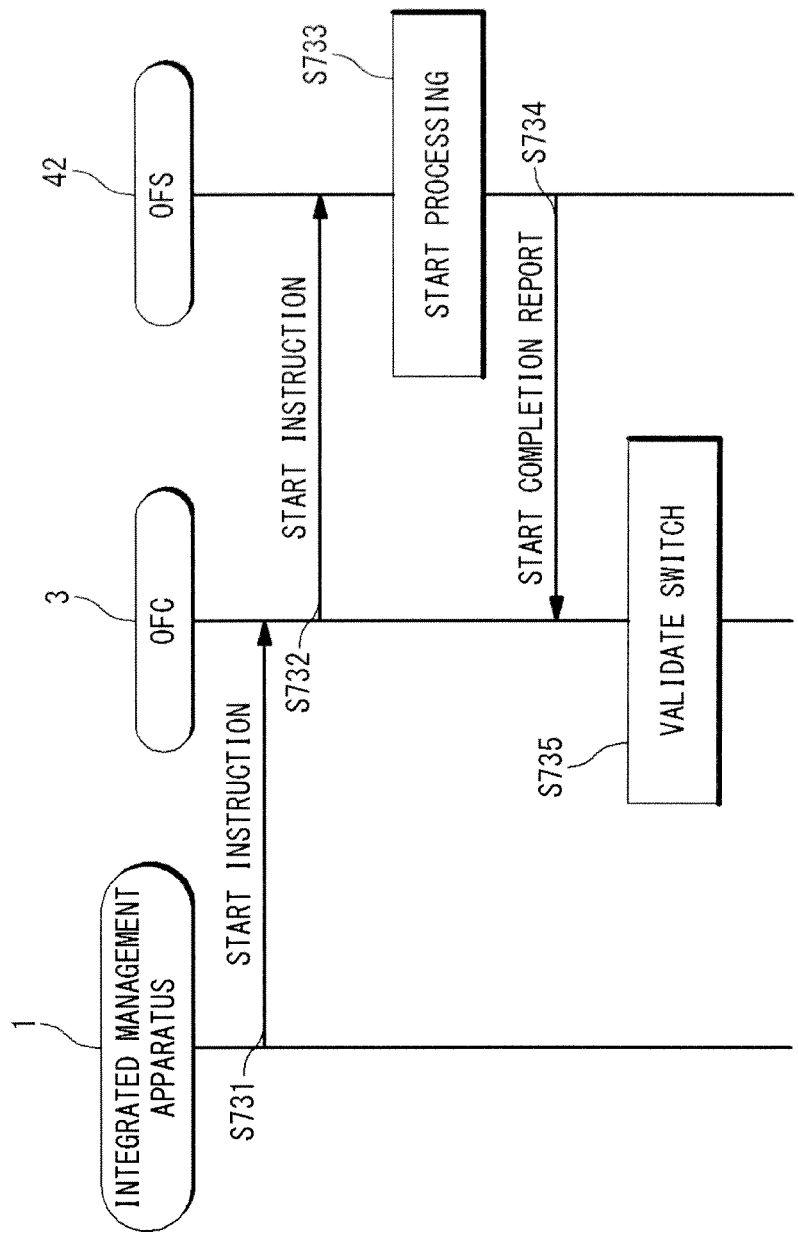
FIG. 22 is a sequence diagram showing the start processing operation of a switch in case of the maintenance processing in the second exempla embodiment.

FIG. 22 is a sequence diagram showing the start processing operation of a switch after the maintenance processing of the server according to the present invention. Referring to FIG. 22, the details of the start processing operation of the switch after the maintenance processing will be described. In response to the maintenance completion instruction (switch specification) by the manager, the integrated management apparatus 1 instructs the OFC 3 to start the specified switch (OFS 42 in which the maintenance processing is completed) (Step S731). The OFC 3 starts the specified OFS 42 (Steps S732 and S733). The OFS 42 which completed the start processing transmits a start completion report to the OFC 3 (Step S734). When confirming that the OFS 42 is started, the OFC 3 carries out the validation or addition of the maintenance object switch (OFS 42 in this example) in the topology data 335 (Step S735). Thus, the communication route which passes the OFS 42 can be generated in case of the communication route generation processing since then. Although not shown, the OFC 3 may transmit the start completion report of the OFS 42 to the integrated management apparatus 1. In this case, it is desirable that the integrated management apparatus 1 stores the data showing that the OFS 42 is started after the maintenance processing. This data can be displayed visibly to the manager.

As mentioned above, through the integrated control by the integrated management apparatus 1, a switch is separated from the system and the maintenance processing (file update and the operation shutdown and the start processing) is executed to the switch. Also, the restoration processing to the original condition due to the system switching can be controlled integratedly by the integrated management apparatus 1.

When carrying out the operation shutdown processing as at the time of the file update of the server, the changed communication route may be returned to the original condition by the setting of the flow after the maintenance object switch 42 re-starts. However, it is desirable not to carry out the re-change of the communication route by considering the processing load necessary for the resetting of the flow and the influence on another communication due to the resetting.

Third Exemplary Embodiment

Modification of Second Exemplary Embodiment

When the communication route is changed in the maintenance processing of the switch, it is required to reduce a packet loss. In the maintenance processing of the third exemplary embodiment, a data transfer is carried out during a predetermined period before the change of the communication route, by using both of the detour route and a route before detour. Thus, the packet loss which accompanies the flow change can be made little. Hereinafter, referring to FIG. 23A and FIG. 23B, the details of the maintenance processing operation in the third exemplary embodiment will be described. The description will be made supposing that the maintenance object switch is the OFS 42, a switch different from the endpoint on the detour route is the OFS 41, and the switch of the endpoint is the OFS 43.

Figure 23A:
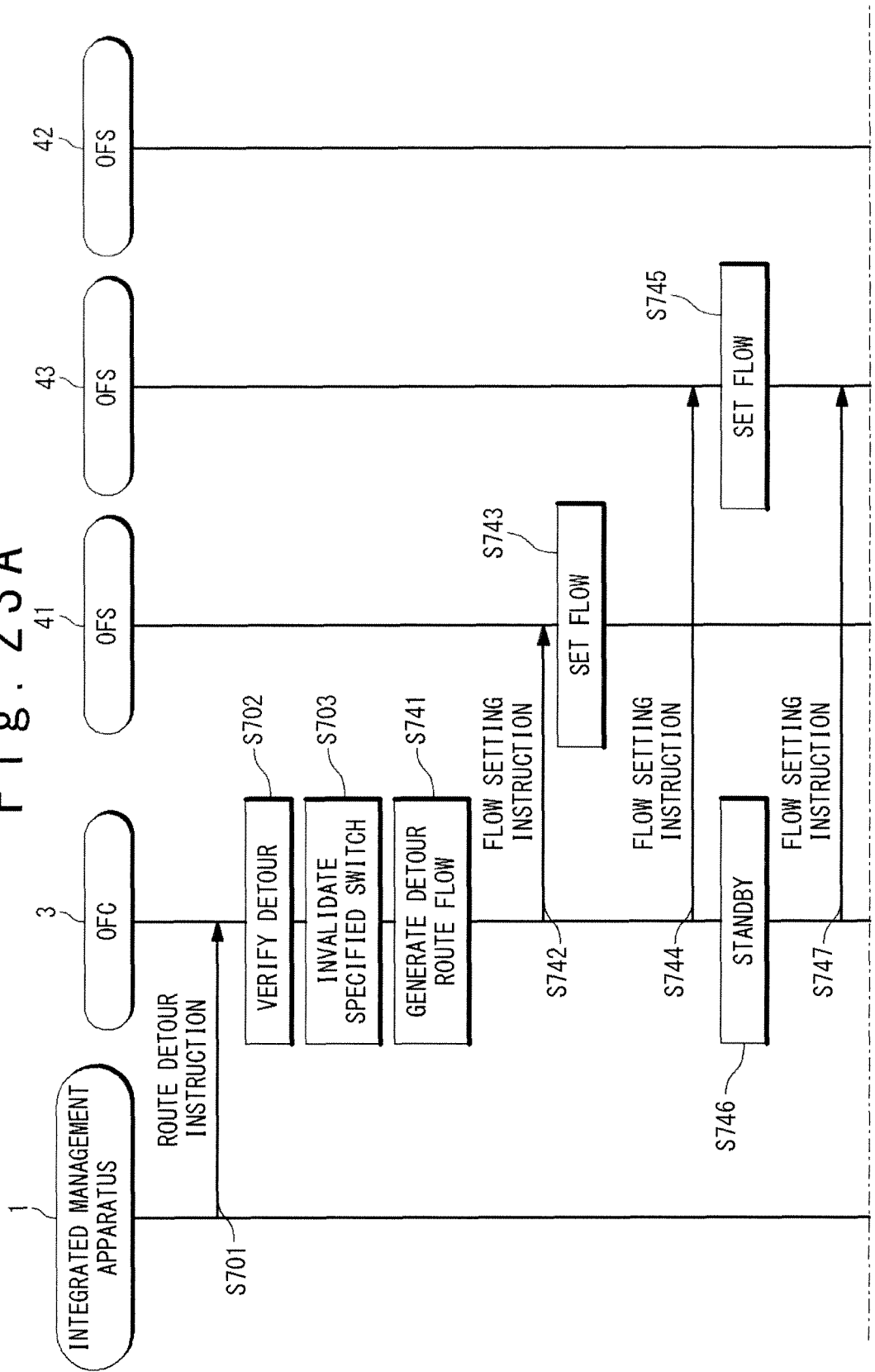
FIG. 23A is a sequence diagram showing the maintenance processing operation to the switch in a third exemplary embodiment.

FIGS. 23A and 23B are a sequence diagram showing the maintenance processing operation to the switch in the third exemplary embodiment. Referring to FIG. 23A, by the method of maintenance processing in the third exemplary embodiment, the detour verification and the invalidation of the maintenance object switch 42 in the topology data 335 are carried out though the processing at the steps S701 to S703, like the second exemplary embodiment.

The OFC 3 generates the flow corresponding to a new communication route (detour route) which goes around the maintenance object switch (Step S741). At this time, the OFC 3 generates a flow to transfer data only to the detour route, like the second exemplary embodiment, and also generates a flow to transmit packet data to both of the detour route and the route before detour by copying the packet data.

The OFC 3 sets the flow for transferring data only through the detour route, of the flows generated at the step S741, to a corresponding OFS (OFS 41) other than the endpoints on the detour route (Steps S742 and S743). Next, the OFC 3 sets the flow for copying the packet data and for transmitting it to both of the detour route and the route before detour, to the switch (OFS 43) of the endpoint on the detour route (Steps S744 and S745). After waiting for a predetermined tie, the OFC 3 which set the flow to the OFS on the detour route instructs the switch (OFS 43) of the endpoint on the detour route to change the flow set at the step S745 into the flow for transferring data only to the detour route generated at the step S741 (Steps S746 and S747). Subsequently, the OFC 3 deletes the flow corresponding to the route before detour from each OFS on the route before detour (Steps S748 and S749).

Since then, like the second exemplary embodiment, the registration (validation) processing of the flow into the OFC 3 and the maintenance processing (update of the file or the operation shutdown processing) are carried out through the processing of the steps S709 to S713.

According to the maintenance method in the present exemplary embodiment, because the data transfer is carried out through two routes of the detour route and the route before detour by the switch (OFS 4i) of the endpoint for a predetermined time, the packet loss in change of the communication route can be decreased.

In the second or third exemplary embodiment, when there is a set of the endpoints to which the detour route can not be calculated, the calculation of the detour route can be made possible by changing a condition (system configuration) of the endpoint (server) by the control by the integrated management apparatus 1. A method of changing an endpoint (server) is different according to the endpoint being either of the HA cluster (operating system) server, the HA cluster (standby system) server, the load distribution system server, and the single server on which the VMM operates.

Figure 24A:
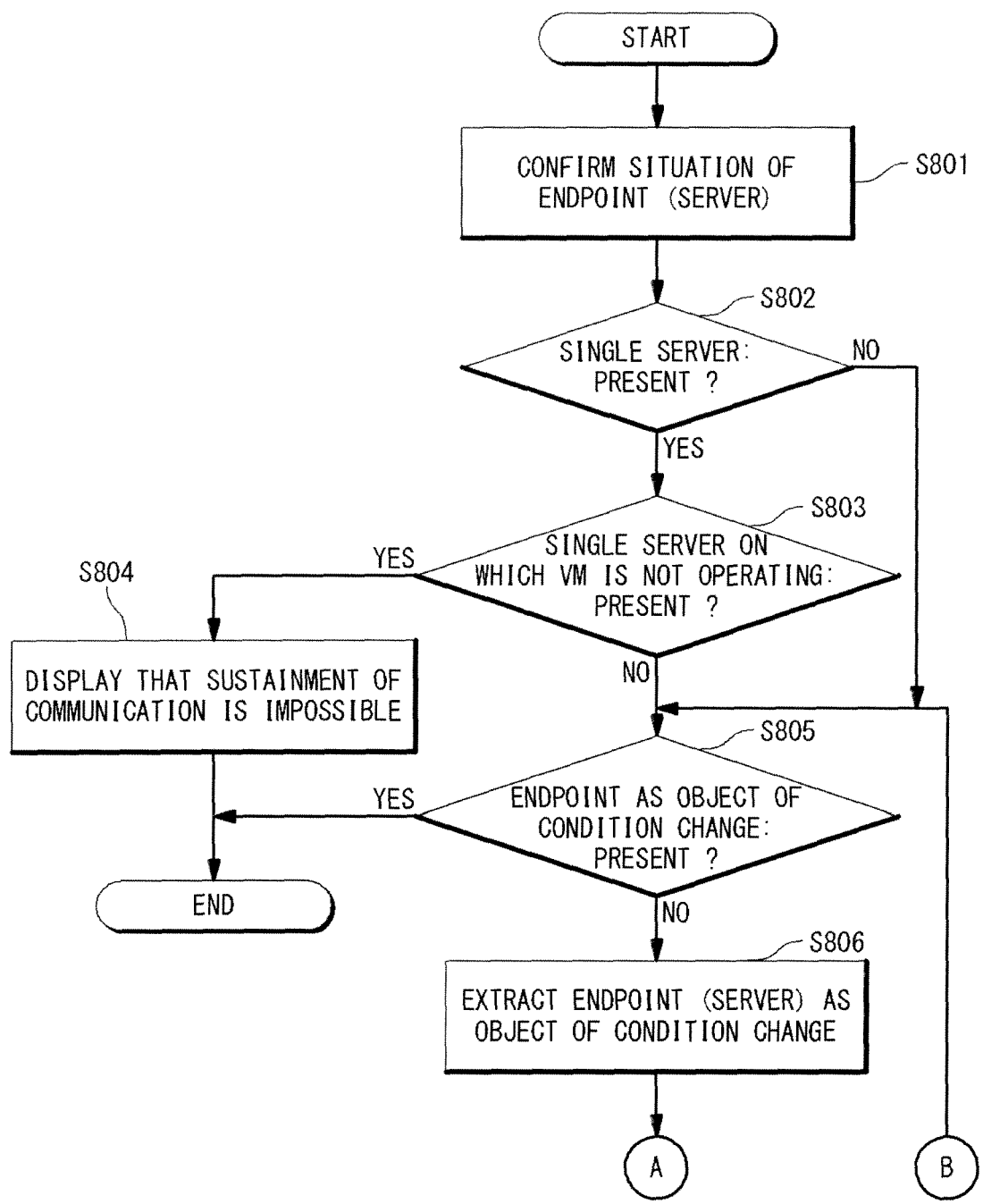
FIG. 24A are a flow chart showing endpoint change processing operation for the detour route generation in case of the maintenance processing to the switch.

FIG. 24A and FIG. 24B are a flow chart showing the endpoint change processing operation for the detour route generation in case of the maintenance processing to the switch. Referring to FIG. 24A, in case of the maintenance processing to the switch, the details of the endpoint change processing when the detour route can not be calculated will be described. When the endpoint exists to which the detour route can not be calculated in case of detour route verification processing at the above-mentioned step S702 (Step S726), the OFC 3 notifies the setting of the endpoint to which the communication route can not be calculated, to the integrated management apparatus 1. The integrated management apparatus 1 confirms a situation (cluster configuration) of the endpoint (server) other than the external network 8 being notified from the OFC 3 (Step S801). In detail, like the above-mentioned steps S601 to 603, the integrated management apparatus 1 specifies the endpoint (server) which is notified from the OFC 3 and acquires each clustering data from the server management apparatus 4. The acquired clustering data is stored in the storage unit.

When there is a single server in the endpoint (server) which is notified from the OFC 3, the integrated management apparatus 1 confirms whether or not the VMM is operating on the single server, to the VM management apparatus 2, like the above-mentioned steps S671 to S672 (Steps S802 and S803). At this time, when the single server on which the VMM is not operating is contained in the notified endpoint (server), the integrated management apparatus 1 displays a session in which communication can not be sustained and a set which contains the endpoint (single server) of the session, and ends the detour route generation processing (Steps S803 Yes and S804).

On the other hand, when the single server not contained in the endpoint which is notified from the OFC 3 (Step S802 No), or, when the single server on which the VMM is not operating is not contained (Step S803 No), the integrated management apparatus 1 carries out the endpoint change processing by a method according to the condition (clustering configuration) set to the endpoint (server).

First, the integrated management apparatus 1 extracts an endpoint (server) as a change object from the endpoint which is notified from the OFC 3 (Steps S805 and S806). When the extracted change object endpoint is the HA cluster (operating system) server, the integrated management apparatus 1 issues an instruction to the server management apparatus 4 so as to upgrade the server of the HA cluster (standby system) to the HA cluster (operating system) (Steps S807 Yes and S808). Next, the integrated management apparatus 1 issues a downgrade instruction to the server management apparatus 4 so as to downgrade the server of the HA cluster (operating system) to the HA cluster (standby system) (Step S809). Then, the integrated management apparatus 1 issues an instruction to the server management apparatus 4 so as to stop the downgraded server of the HA cluster (standby system) (Step S810). The server management apparatus 4 carries out the switching processing between the operating system and the standby system and the operation shutdown processing of the HA cluster (standby system) in response to each instruction from the integrated management apparatus 1. When the switching processing between the operating system and the standby system and the operation shutdown of the endpoint (server) are completed, the control procedure shifts to the step S805.

When the change object endpoint extracted at the step S806 is the HA cluster (standby system) server, the integrated management apparatus 1 issues an instruction to the server management apparatus 4 so as to stop the endpoint (HA cluster (standby system) server) (Steps S811 Yes and S810). The server management apparatus 4 carries out the operation shutdown processing of the HA cluster (standby system) in response to the instruction from the integrated management apparatus 1. When the operation shutdown of the endpoint (server) is completed, the control procedure shifts to the step S805.

When the change object endpoint extracted at the step S806 is the load distribution system server, the integrated management apparatus 1 issues an instruction to the load balancer 9 so as to stop a load assignment to the endpoint (server) (Steps S812 Yes and S813). The load balancer 9 stops the load assignment to the change object endpoint (server) in response to the instruction from the integrated management apparatus 1, like the above-mentioned step S642. Next, the integrated management apparatus 1 issues a flow stop confirmation request to the change object endpoint to the OFC 3 (Step S814). The OFC 3 confirms that the flow for controlling the data transfer to the change object endpoint is deleted from each switch, like the above-mentioned step S645, and reports it to the integrated management apparatus 1. When confirming the stop of the data transfer to the change object endpoint, the integrated management apparatus 1 issues an instruction to the server management equipment so as to stop the endpoint (Step S815). The server management apparatus 4 carries out the operation shutdown processing of the endpoint (server) in response to the instruction from the integrated management apparatus 1. When the operation shutdown of the endpoint (server) is completed, the control procedure shifts to the step S805.

When the change object endpoint extracted at the step S806 is a single server, the integrated management apparatus 1 requests the data (VMM data 324) of the VM which is operating in the endpoint (VMM), to the VM management apparatus 2 (Steps S816 Yes and S817). The VM management apparatus 2 returns the list (VMM data 324) of the VMs of the specified endpoints (VMM), to the integrated management apparatus 1, like the above-mentioned step S681. Next, the integrated management apparatus 1 determines the migration destination of each VM shown in the VM list (VMM data 324) which is acquired like the above-mentioned step S683 and issues the migration instruction of the VM to the VM management apparatus 2 (Step S818). The VM management apparatus 2 migrates the VM by using the OFC 3, like the step S687. When confirming the VM migration, the integrated management apparatus 1 issues an instruction to the server management apparatus 4 so as to stop the endpoint (Step S819). The server management apparatus 4 carries out the operation shutdown processing of the endpoint (server) in response to the instruction from the integrated management apparatus 1. When the operation shutdown of the endpoint (server) is completed, the control procedure shifts to the step S805.

The processing of the above-mentioned steps S805 to S819 is repeated until it is carried out to all the endpoints notified from the OFC 3. When all the endpoints are changed, the control procedure shifts to the above-mentioned step S703, the invalidation of the maintenance object, the calculation of the detour route, the setting of the flow and the maintenance processing (the file update, exchange of hardware and so on) are carried out, as shown in the first and second exemplary embodiments. At this time, the maintenance object switch to be detoured may stop in the operation. Also, the condition (clustering configuration, the operation situation and so on) of the changed endpoint may be stored in the storage unit.

Figure 25A:
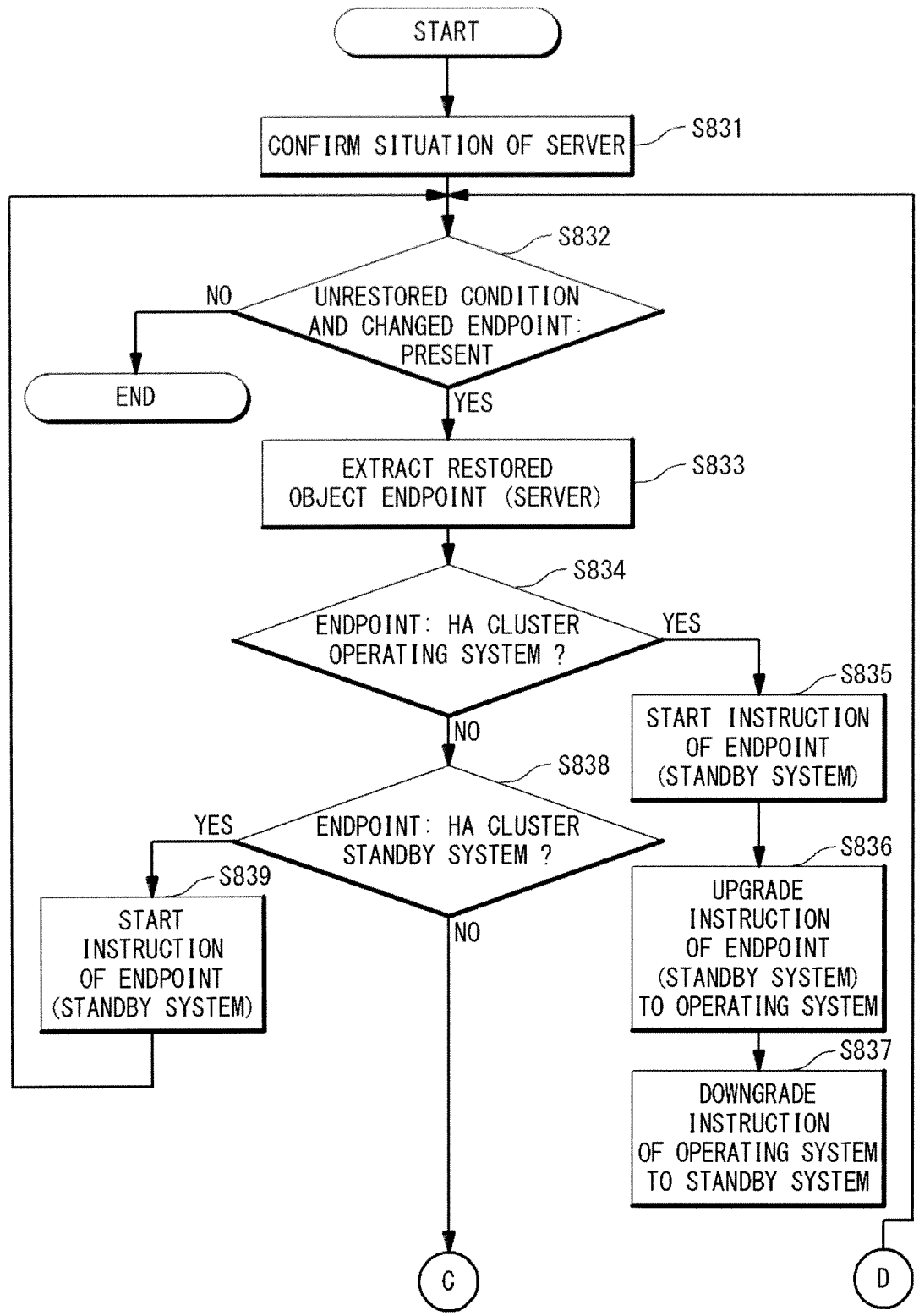
FIG. 25A is a flow chart showing the endpoint restoration processing operation after the maintenance processing to the switch.
Figure 25B:
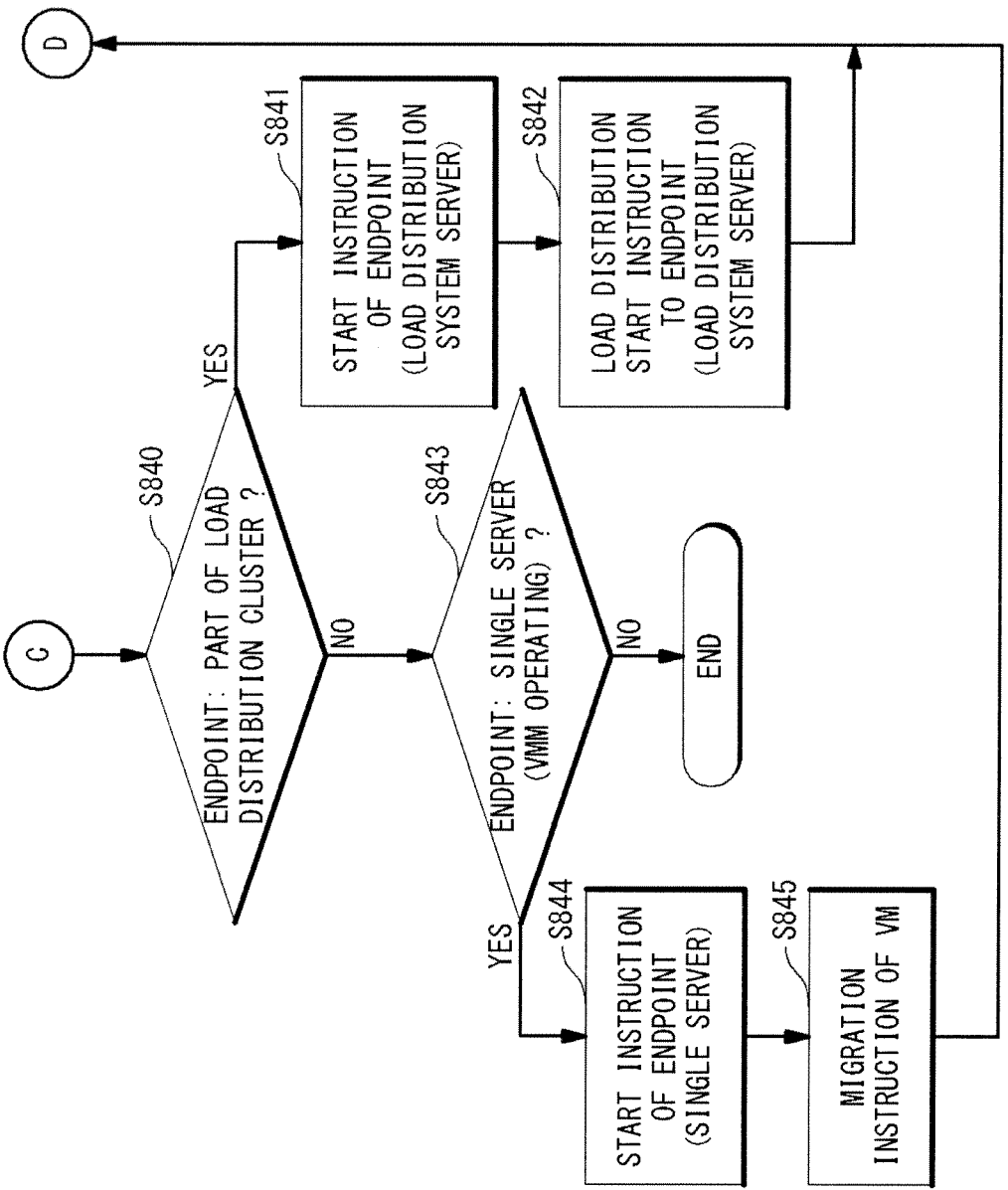
FIG. 25B is a flow chart showing the endpoint recovery processing operation after the maintenance processing to the switch.

Next, the operation after the maintenance processing will be described. When knowing the maintenance processing completion by the report from the OFC 3 or an input by the manager, the integrated management apparatus 1 restores a condition of the changed endpoint according to the condition of each endpoint (server) which is stored in the above-mentioned endpoint change processing (Step S801). FIG. 25A and FIG. 25B are a flow chart showing the endpoint recovery processing operation after the maintenance processing to the switch. In case of confirming a condition of the stored endpoint and existence of an un-restored endpoint (server), the integrated management apparatus 1 extracts a restoration object endpoint and carries out the restoration processing of the server condition (Steps S831 and S832 Yes and S833).

At first, when the extracted restoration object endpoint (server) is the HA cluster (operating system) server, the integrated management apparatus 1 instructs the start of the server of the HA cluster (standby system) to the server management apparatus 4 (Steps S834 Yes and S835). Next, the integrated management apparatus 1 issues an instruction to the server management apparatus 4 so as to upgrade the server of the HA cluster (standby system) to the HA cluster (operating system) (Step S836). Then, the integrated management apparatus 1 issues an instruction to the server management apparatus 4 so as to downgrade the server of the HA cluster (operating system) to the HA cluster (standby system) (Step S809). The server management apparatus 4 carries out the start processing of the HA cluster (standby system) and the switching processing between the operating system and the standby system in response to each instruction from the integrated management apparatus 1. When the start of the endpoint (server) and the restoration to the operating system are completed, the control procedure shifts to the step S832.

When the restoration object endpoint extracted at the step S833 is the HA cluster (standby system) server, the integrated management apparatus 1 issues the instruction to the server management apparatus 4 so as to start the endpoint (HA cluster (standby system) server) (Steps S838 Yes and S839). The server management apparatus 4 carries out the start processing of the HA cluster (standby system) in response to the instruction from the integrated management apparatus 1. When the start of the endpoint (server) is completed, the control procedure shifts to the step S832.

When the restoration object endpoint extracted at the step S833 is the load distribution system server, the integrated management apparatus 1 issues the start instruction of the restoration object endpoint to the server management apparatus 4 (Steps S840 Yes and S841). The server management apparatus 4 carries out the start processing to the endpoint (server) in response to the instruction from the integrated management apparatus 1. Next, the integrated management apparatus 1 issues an instruction to the load balancer 9 so as to stop the load assignment to the endpoint (server) (Step S842). The load balancer 9 resumes the load assignment to the change object endpoint (server) in response to the instruction from the integrated management apparatus 1, like the above-mentioned step S662. When the start of the endpoint (server) and the load assignment are resumed, the control procedure shifts to the step S832.

When the restoration object endpoint extracted at the step S833 is a single server, the integrated management apparatus 1 issues the start instruction of the restoration object endpoint to the server management apparatus 4 (Steps S843 Yes and S844). The server management apparatus 4 carries out the start processing of the endpoint (server) in response to the instruction from the integrated management apparatus 1. Next, the integrated management apparatus 1 issues the migration instruction (restoration instruction) of the VM to the VM management apparatus 2 (Step S845). When the start processing of the endpoint (server) and the migration processing of the VM are completed, the control procedure shifts to the step S832.

The processing of the above-mentioned steps S832 to S845 is repeated until it is carried out to all the stored restoration object endpoints. When all the endpoints are restored, the integrated management apparatus 1 displays the effect that the maintenance processing is completed.

As mentioned above, through the integrated control by the integrated management apparatus 1, the switch which does not have any detour route is separated from the system, and the maintenance processing (file update, operation shutdown processing and the start processing) is executed to the switch.

Fourth Exemplary Embodiment

Modification of First Exemplary Embodiment

In the fourth exemplary embodiment, when switched between the operating system and the standby system in case of the maintenance processing to the server of the HA cluster (operating system), the communication route is changed based on the open flow technique. Thus, the shortening of the setup time in case of the communication route when switched between the operating system and the standby system and the decrease of the packet loss an be made possible. Hereinafter, referring to FIG. 26A to FIG. 27B, the details of the maintenance processing to the HA cluster (operating system) server in the fourth exemplary embodiment will be described.

Figure 26A:
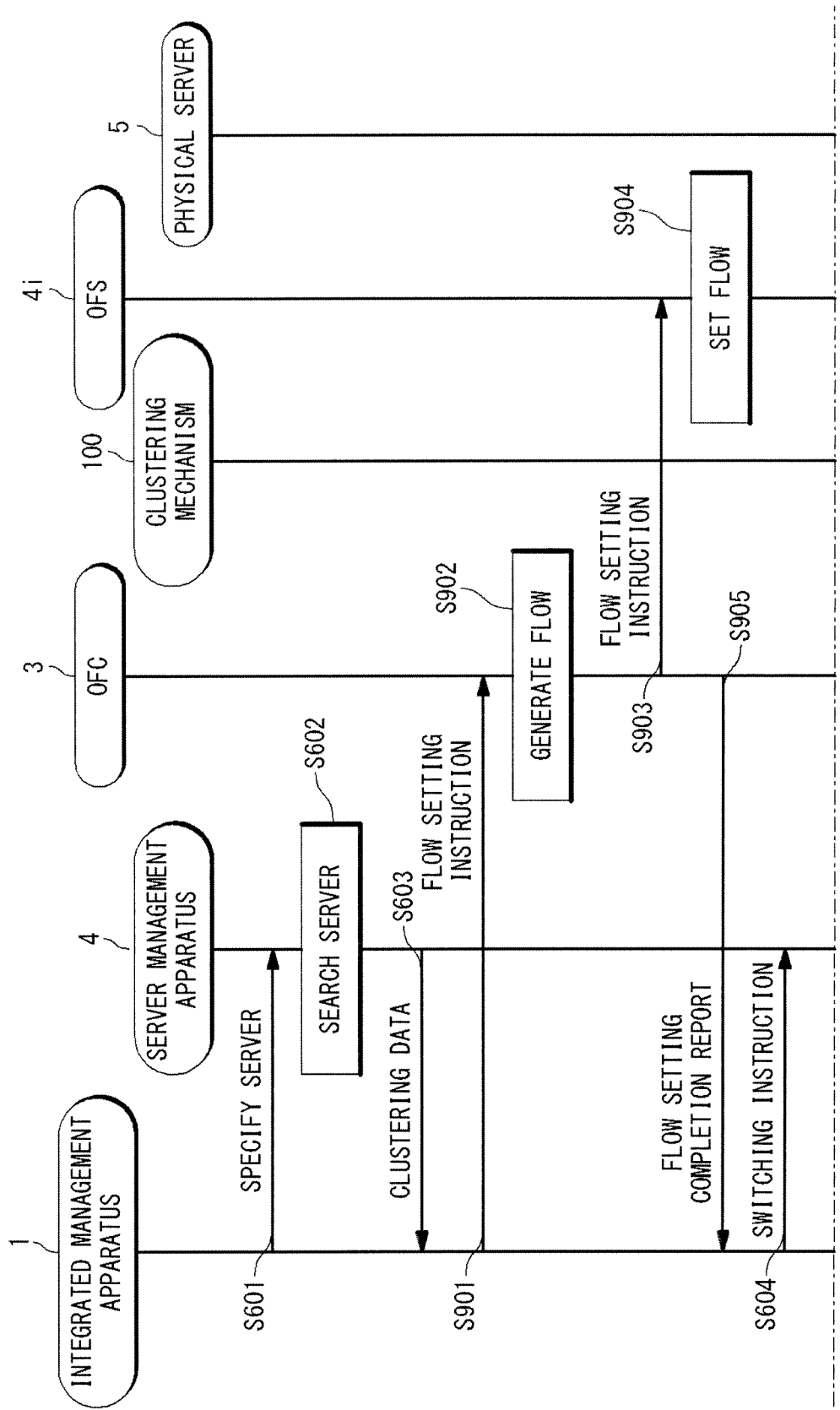
FIG. 26A is a sequence diagram showing the maintenance processing operation (maintenance to the operating system server) of a fourth exemplary embodiment.
Figure 26B:
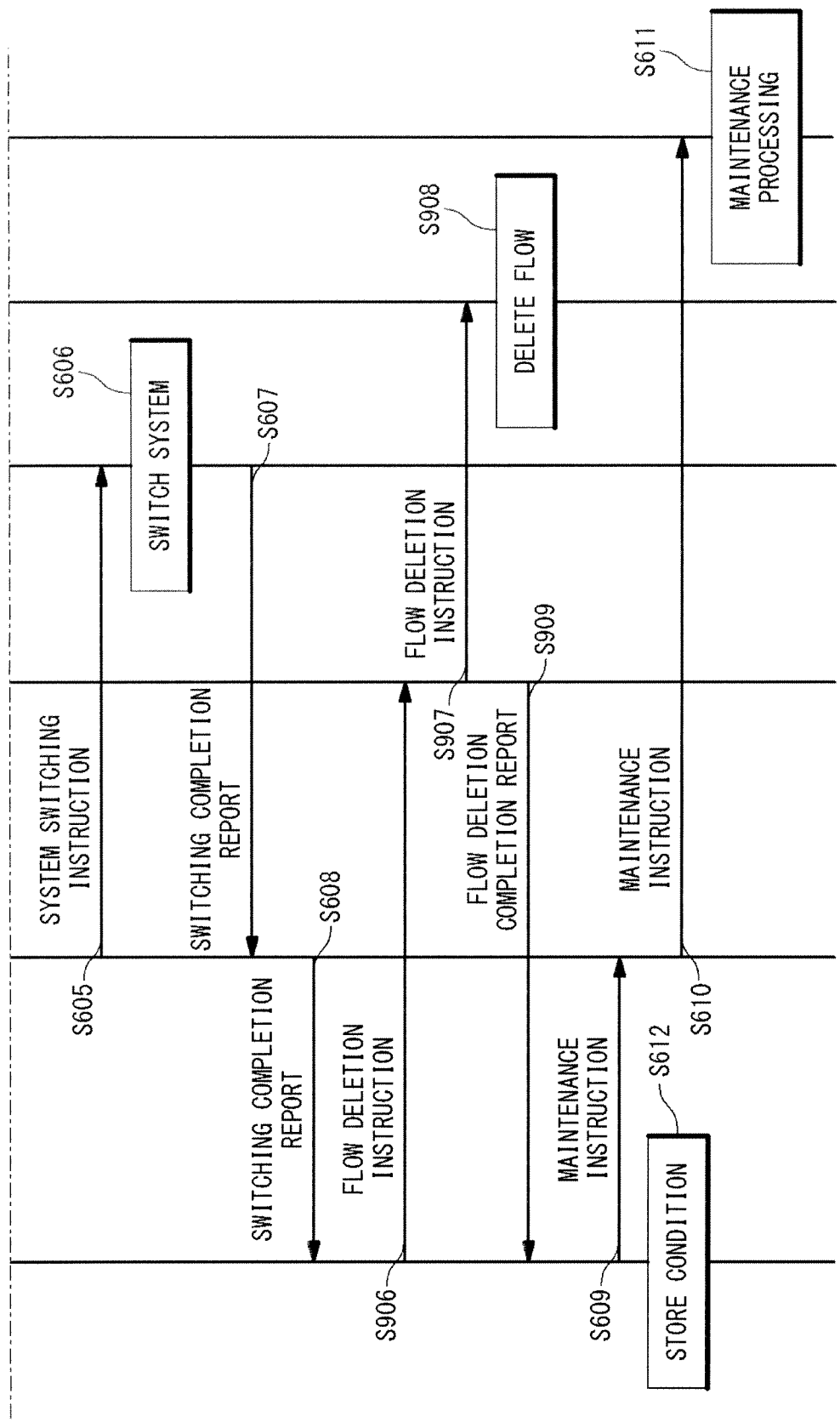
FIG. 26B is a sequence diagram showing the maintenance processing operation (maintenance to the operating system server) of the fourth exemplary embodiment.

FIG. 26A and FIG. 26B are a sequence diagram showing the maintenance processing (maintenance processing to the operating system server) operation in the fourth exemplary embodiment. In the present exemplary embodiment, the setting of the flow corresponding to the communication route used after the system switching is carried out before the switching (Step S604 to S608) between the operating system and the standby system in the first exemplary embodiment.

Hereinafter, the details of the setting processing of the flow will be described. Like the first exemplary embodiment, the integrated management apparatus 1 detects that the maintenance object server 5 is a cluster (operating system), through the processing of the steps S601 to S603, specifies the maintenance object server 5 to the OFC 3, and instructs the setting of the flow (Step S901). The OFC 3 generates the flow corresponding to the communication route which has the HA cluster (standby system) as the endpoint in response to the flow setting instruction (Step S902). In detail, the communication route having as the endpoints, another endpoint of the communication route having the maintenance object server 5 which is the HA cluster (operating system) as an endpoint and the server of the HA cluster (standby system) is calculated newly by using the topology data 335. The OFC 3 generates the flow set to the OFS 4*i* on the communication route. The OFC 3 sets the flow generated at the step S902 to each OFS 4*i* on the new communication route (Steps S903 and S904).

The OFS 4*i* to which the new flow is set carries out the transfer processing of packet data to both of the HA cluster (operating system) server and the HA cluster (standby system) server. Thus, the packet loss occurrence during the system switching processing to be described later can be prevented.

The OFC 3 issues a flow setting completion report to the integrated management apparatus 1 when setting the flow (Step S905). The integrated management apparatus 1 instructs the server management apparatus 4 to switch the system of the maintenance object server of the operating system and the server of the standby system according to this (Step 604). Like the first exemplary embodiment, the server management apparatus 4 controls the clustering mechanism 100 to downgrade the maintenance object server 5 of the operating system into the standby system, and upgrades the server of the specified standby system to the operating system (Steps S605 and S607).

When receiving the system switching completion report, the integrated management apparatus 1 issues the deletion instruction of the flow to the OFC 3 (Steps S608 and S906). The OFC 3 instructs the OFS 4*i* to delete the flow corresponding to the communication route having the maintenance object server 5 as the endpoint from the OFS 4*i* on the communication route (Step S907). When receiving the deletion instruction, the OFS 4*i* deletes the flow (Step S908). Thus, the packet data for the maintenance object server 5 is transferred to the server only by using the communication route having the server which is switched to the operating system at the step S606 as the endpoint.

When the deletion of the flow corresponding to the communication route to the maintenance object server 5 is completed, a flow deletion completion report is notified to the integrated management apparatus 1 from the server management apparatus 4. Thus, the integrated management apparatus 1 instructs the server management apparatus 4 to carry out the maintenance processing and shifts to the maintenance processing, like the first exemplary embodiment (Step S609 to S612).

As mentioned above, because the setting of the flow used after system switching is carried out before system switching, the change time of the communication route after the system switching is reduced.

FIG. 27A and FIG. 27B are a sequence diagram showing the start processing operation after the maintenance processing of the server in the fourth exemplary embodiment. In the fourth exemplary embodiment, when starting the physical server 5 which stopped operation for the maintenance processing, the system switching and the switching of the communication route are carried out. In the present exemplary embodiment, the setting of the flow corresponding to the communication route used after the system switching is carried out before the system switching (Steps S636 to S639) between the operating system and the standby system in the first exemplary embodiment.

In detail, like the first exemplary embodiment, the physical server 5 after the maintenance processing is started by the integrated management apparatus 1 (Step S631 to S635). When confirming the start completion of the physical server 5 based on the report from the server management apparatus 4, the integrated management apparatus 1 specifies the server to operate as the operating system and instructs the setting of the flow (Steps S911 and S912). Thus, the physical server 5 of the HA cluster (standby system) in which maintenance processing is completed is specified. The OFC 3 generates the flow corresponding to the communication route having the physical server 5 of the HA cluster (standby system) as the endpoint in response to the flow setting instruction (Step S913). In detail, the communication route having another endpoint of the communication route having the HA cluster (operating system) server as the endpoint and the endpoint as the physical server 5 of the HA cluster (standby system) is calculated by using the topology data 335. The OFC 3 generates the flow to be set to the OFS 4*i* on the communication route. The OFC 3 sets the flow which is generated at the step S913 to each OFS 4*i* on the new communication route (Steps S914 and S915). It should be noted that in the deletion processing of the flow shown in FIG. 26A and FIG. 26B, when the flow to the maintenance object server 5 is not deleted and is retained in the flow table 334 of the OFC 3, the flow generation processing at the step S913 is omitted.

The OFS 4*i* to which a new flow is set carries out the transfer processing of packet data to both of the HA cluster (operating system) server and the HA cluster (standby system) server. Thus, packet loss occurrence during the system switching processing to be described later can be prevented.

The OFC 3 issues the flow setting completion report to the integrated management apparatus 1 when setting a flow (Step S916). The integrated management apparatus 1 instructs the server management apparatus 4 to carry out the system switching of the maintenance object server of the operating system and the server of the standby system (Step S917). Like the first exemplary embodiment, the server management apparatus 4 controls the clustering mechanism 100 to downgrade the physical server of the operating system into the standby system, and upgrade the physical server 5 of the standby system in which the maintenance processing is completed to the operating system (Step S636 to S639).

When receiving the system switching completion report, the integrated management apparatus 1 issues the deletion instruction of the flow to the OFC 3 (Steps S939 and S918). The OFC 3 instructs the OFS 41 to delete the flow corresponding to the communication route having the server switched from the operating system to the standby system as the endpoint from the OFS 4i on the communication route, (Step S919). When receiving the deletion instructions, the OFS 4i deletes the flow (Step S920). Thus, the packet data for the maintenance object server 5 is transferred to the server by using only the communication route having the physical server 5 switched to the operating system at the step S606 as the endpoint.

As mentioned above, because the setting of the flow used after the system switching is carried out before the system switching in case of the start processing of the physical server after the maintenance processing, the change time of the communication route after the system switching is reduced. It should be noted that the system switching after the maintenance processing and the changing of the communication route can be omitted.

(Virtual Machine Migration Operation)

Next, the virtual machine migration operation at the steps S684 to S687 shown in FIG. 18B will be described.

(1) First Implementation Example

Figure 29:
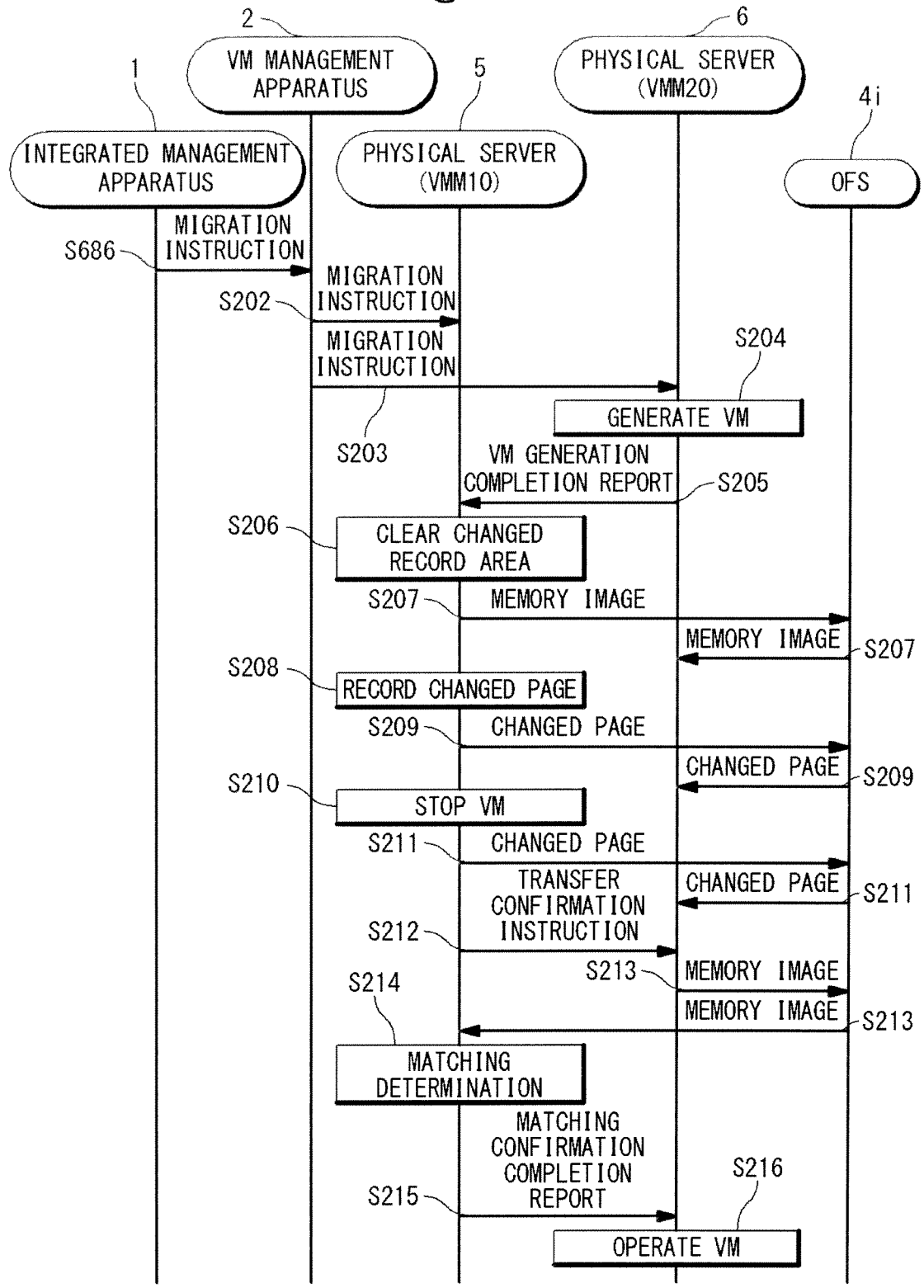
FIG. 29 is a sequence diagram showing the memory image transferring processing in the first and second implementation examples in case of the migration processing by the virtual machine.
Figure 30:
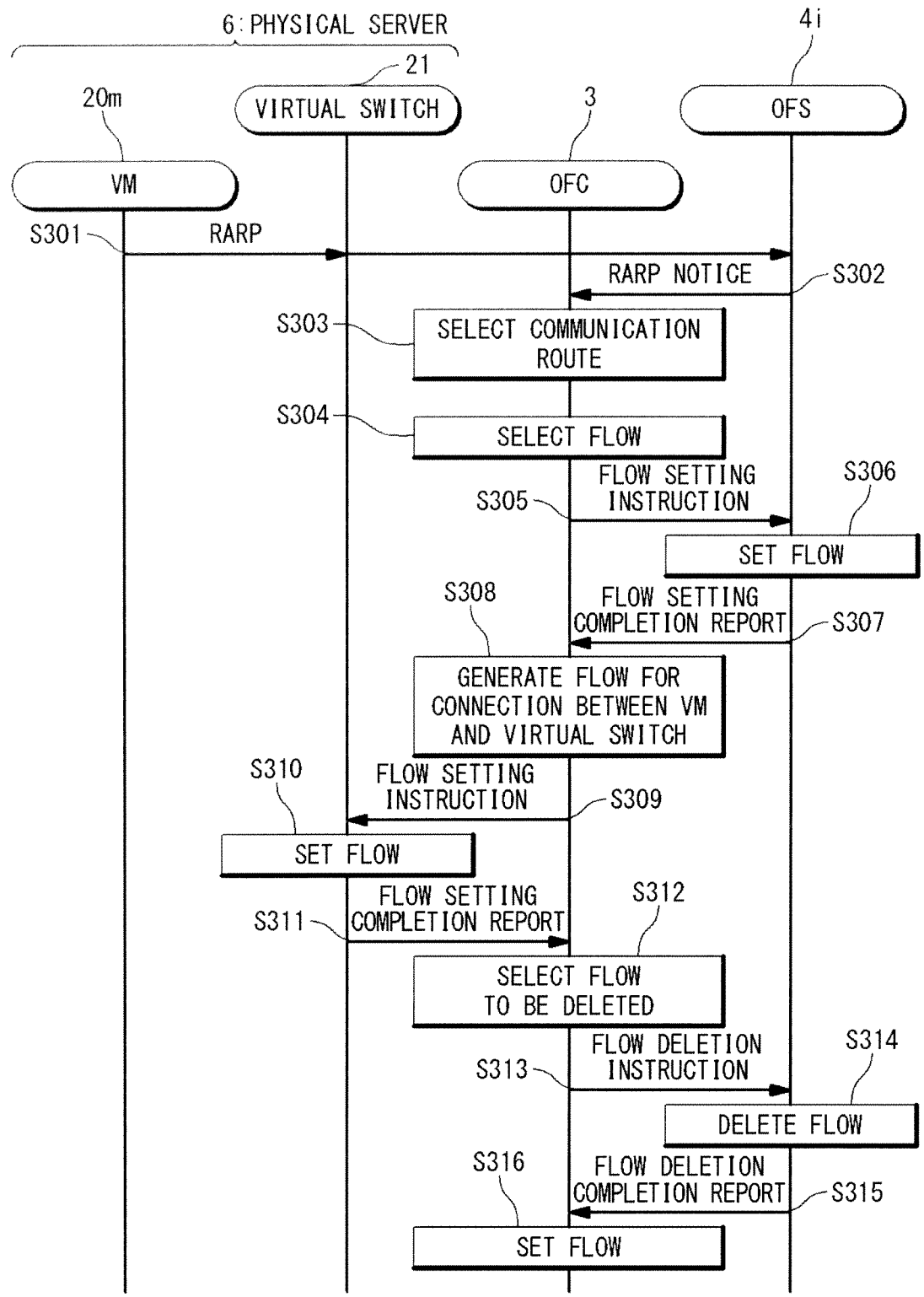
FIG. 30 is a sequence diagram showing the access destination switching processing in the first implementation example in case of migration processing by the virtual machine.

Referring to FIG. 28 to FIG. 30, the first implementation example of the virtual machine migration operation will be described. FIG. 28 is a sequence diagram showing the first implementation example of the migration preparation processing in case of the migration processing of the virtual machine. First, referring to FIG. 28, the first implementation example of the migration preparation processing at the step S685 shown in FIG. 18B will be described.

When the migration destination of the VM is determined at the step S683, the integrated management apparatus 1 issues the VM migration preparation instruction to the OFC 3 (Step S684). At this time, the integrated management apparatus 1 specifies the migration source VMM, the migration object VM, the migration destination VMM, and the migration destination VSW to the OFC 3 based on the VMM management data 323.

When receiving the migration preparation instructions, the OFC 3 first sets the communication route and a flow for the transfer of the memory image. The OFC 3 calculates the communication route (memory image transfer route) for transferring the memory image of the migration object VM between the migration source VMM and the migration destination VMM based on the topology data 335 (Step S104). Here, the area in which the memory image of the migration object VM before the migration is stored and the area in which the memory image of the migration object VM after the migration is stored are set as both endpoints, and are calculated as the memory image transfer route. The data of the calculated memory image transfer route is stored as the communication route data 336.

The OFC 3 generates the flow (memory image transfer flow) to be set to each OFS 4i on the memory image transfer route calculated at the step S104 (Step S105). The flow (rule 444+action data 445) for the memory image transfer processing generated every OFS 4i is related to each OFS 4i and is registered on the flow table 334. At this time, the setting data 446 of the memory image transfer flow is set as a "non-set" or "invalid" state.

The OFC 3 sets the memory image transfer flow to each OFS 4i and node (Step S106 to S108). In detail, the OFC 3 instructs the OFS 4i on the communication route to set the memory image transfer flow (Step S106). The OFS 4i instructed to set the flow sets the set flow (rule 444+action data 445) to its own flow table 343 (Step S107). When completing the setting of the flow, the OFS 4i transmits the flow setting completion report to the OFC 3 (Step S108). Here, the memory image transfer flow is set to the nodes on the memory image transfer route other than the OFS 4i. Also, when the virtual switch has the configuration corresponding to the open flow technique, the memory image transfer flow is set to the virtual switch on the memory image transfer route. The setting data 446 of the memory image transfer flow set to the OFS 4i and the virtual switch is set to an "already set" or "valid" state.

Next, the OFC 3 sets the communication route and the flow for access to the migration object VM (hereinafter, to be referred to as migration destination VM) after the VM migration. First, the OFC 3 calculates the communication route (communication route for the migration destination VM) to the migration destination VM (Step S109). In detail, the OFC 3 selects the communication route data 336 in the communication route of the migration object VM from the valid communication route data 336 retained in advance. Here, the valid communication route (valid communication route data 336) shows the communication route where the flow exists which can be set to the OFS 4i. The OFC 3 uses the topology data 335 to correct the communication route by changing one endpoint of the selected communication route from the migration object VM to a virtual switch connected with the migration destination VM, and calculates as the communication route for the migration destination VM. The data of the calculated communication route for the migration destination VM is stored as the communication route data 336.

The OFC 3 generates the flow (communication flow for the migration destination VM) to be set to each OFS 4i on the communication route for the migration destination VM which is calculated at the step S109 (Step 110). The communication flow (rule 444+action data 445) for the migration destination VM generated every OFS 4i is related to each OFS 4i and is registered on the flow table 334. At this time, the setting data 446 of the communication flow for the migration destination VM is set to a "non-set" or "invalid" state.

The OFC 3 reports that the migration preparation is completed, to the integrated management apparatus 1, when generating the communication flow for the migration destination VM (Step S111).

As mentioned above, in the migration preparation processing in the first implementation example, the calculation of the transfer route of the memory image of the migration object VM and the migration and the setting of the flow to control the migration, and the calculation of the communication route for access to the migration destination VM and the generation of the flow to control the communication are carried out. In the first implementation example, at the step that the setting of the memory image transfer flow to the OFS 4i and the generation of the communication flow for the migration destination VM are completed, the migration preparation ends.

The migration processing at the step S687 shown in FIG. 18B contains the memory image transfer processing shown in FIG. 29 and the access destination switching processing shown in FIG. 30.

FIG. 29 is a sequence diagram showing the memory image transfer processing in the first implementation example in case of migration processing of the virtual machine. Referring to FIG. 29, when receiving the migration ready report, the integrated management apparatus 1 issues the migration instruction to the VM management apparatus 2 (Step S686). The VM management apparatus 2 issues the migration instruction to the migration source VMM (VMM 10 here as an example) and the migration destination VMM (VMM 20 here as an example) which are specified in case of the migration preparation processing (Steps S202 and S203). At this time, the VM management apparatus 2 notifies the migration object VM to the VMMs 10 and 20. It should be noted that in case of the migration instruction at the step S201, the migration source VMM and the migration destination VMM may be specified.

The memory image transfer processing of the virtual machine is carried out between the VMMs 10 and 20 in response to the migration instruction from the VM management apparatus 2 (Steps S204 to S212). In detail, the VM which is specified by the VM management apparatus 2 in the migration destination VMM (hereinafter, to be referred to as a migration destination VMM 20) is generated (Step S204). The migration source VMM (hereinafter, to be referred to as a migration source VMM 10) transfers the memory image of the migration object VM in response to the VM generation completion report notified from the migration destination VMM 20 (Step S205 to S207). The memory image is transferred for the VM which is generated at the step S204. The memory image is transferred through the memory image transfer route set at the steps S104 to S107. At this time, the OFS 4i on the memory image transfer route transfers the memory image according to the flow transferring for the memory image set at the step S107.

When the access to another virtual machine other than the migration object VM (e.g. data transfer) occurs during the transfer of the memory image, the OFS 4i according to access executes the action (for example, the relay processing of data) corresponding to the header data of the reception packet according to the flow set to its own flow table 343. In this case, by setting the memory image transfer route to the route which does not hinder access to another virtual machine that does not have relation with the migration, the migration object VM can be migrated without hindering communication with the other virtual machine.

On the other hand, when the access for the migration object VM occurs during the transfer of the memory image (for example, when data for the migration object VM is transferred), the OFS 4i on the communication route to the migration object VM executes the action (for example, the relay processing of data) corresponding to the header data of the reception packet according to the flow set to its own flow table 343. Here, because the flow is set, supposing that the migration object VM is operating on the VMM 10, the data for the migration object VM is transferred to the migration object VM on the physical server 5. The migration source VMM 10 stores the data of transferred migration object VM in the memory page of the migration object VM.

During the transfer of the memory image, there are cases that the process processing of the migration object VM and the memory page based on the data transferred for the migration object VM are changed. The changed memory page is stored in the changed page record area of the storage unit as a copy object (Step S208). It is desirable that the record processing of the changed page is carried out until the migration destination VM starts the operation.

When the transfer of all the memory images related to the migration object VM is ended, the migration source VMM 10 transfers the changed page to the migration destination VMM 20 through the memory image transfer route set at the steps S104 to S107 (Step S209). However, it is desirable that the number of the changed pages which have been stored when the transfer of all the memory images related to the migration object VM is ended is equal to or less than a predetermined number, the transfer processing of the changed page at the step S209 is omitted. Also, during the transfer processing of the changed page at the step S209, the memory page is sometimes changed. Therefore, at the step S209, the migration source VMM 10 stores a further changed page in the changed page record area to another area, and transfers the further changed page to the migration destination VMM 20 after clearing the changed page record area.

When the transfer of all the memory images (containing the transfer of the changed page) related to the migration object VM is completed, the operation of the migration object VM (hereinafter, to be referred to as the migration source VM) which operates on the migration source VMM 10 stops (Step S210). At this time, the network interface of the virtual migration source VM also stops. It should be noted that it is desirable that the migration source VMM 10 repeats the transfer of the changed pages and the record of the changed pages at the step S209 and stop the migration source VM when the number of changed pages becomes equal to or less than a predetermined number. After the migration source VM stops, the migration source VMM 10 transfers the changed pages to the migration destination VMM 20 through the memory image transfer route set at the steps S104 to S107 (Step S211). Thus, the transfer of the memory image from the migration source VMM 10 to the migration destination VMM is completed. Here, the VM (hereinafter, to be referred to as the migration destination VM) which is generated on the migration destination VMM 20 may start to operate, but it is desirable that the matching determination of the memory images between the migration source VM and the migration destination VM is carried out. In detail, the migration source VMM 10 confirms that the migration source VM stopped, and issues the transfer confirmation instruction to the migration destination VMM 20 (Step S212). The migration destination VMM 20 transfers the memory image of the migration destination VM to the migration source VMM 10 through the memory image transfer route set at the steps S104 to S107 in response to the transfer confirmation instruction (Step S213). The migration source VMM 10 determines whether the memory image which is transferred from the migration destination VMM 20 and the memory image of the migration source VM are coincident with each other (Step 14).

At the step S214, when the matching of the memory images of the migration destination VM and the migration source VM is confirmed, a matching confirmation completion report is transmitted to the migration destination VMM 20 from the migration source VMM 10 (Step S215). When receiving the matching confirmation completion report. The migration destination VMM 20 operates the migration destination VM (Step S216). At this time, the virtual network interface in the migration destination VM becomes an operating condition.

On the other hand, when the memory image of the migration destination VM and the migration source VM does not agree of the step S216, the transfer processing of the memory page which does not agree is carried out (It is not in the illustration).

As mentioned above, the transfer of the memory image of the VM is carried out by using the route (memory image transfer route) which is specified by the integrated management apparatus 1. At this time, access to the migration source VM is carried out according to the flow set to the OFS group 4 before the migration processing. Therefore, the memory image of the VM can be transferred without stopping the communication to the migration source VM. Also, because the memory image transfer route can be optionally set by the integrated management apparatus 1, a route which does not obstruct communication to the other virtual machines can be selected. Thus, the transfer of the memory image becomes possible without influence on communication to the other virtual machines.

Generally, when the physical servers belong to an identical subnet, the data transfer between the physical servers is carried out through the switch of layer 2. However, when the physical servers belong to different subnets, the layer 3 switch must be provided between the physical servers. On the other hand, in the present invention, the transfer of the memory image is carried out by using the open flow technique in which the action (e.g. the relay operation) is determined according to a combination of the addresses of layer 1 to layer 4 and identifiers. Therefore, even when the physical servers 5 and 6 belong to the different subnets, the data transfer between the physical servers becomes possible only by changing the setting of the flow.

FIG. 30 is a sequence diagram showing the access destination switching processing operation in the migration processing of the virtual machine in the first implementation example. Here, supposing that the migration destination VM started at the step S218 is the VM 20*m*, the access destination switching processing from the migration source VM to the migration destination VM 20*m* will be described. Referring to FIG. 30, the VM 20*m* generated on the migration destination VMM 20 first transmits RARP (Reverse Address Resolution Protocol) when become an operating condition (Step S301). RARP is detected by the virtual switch 21 and is transferred to the OFS 4*i*. When detecting the RARP, the OFS 4*i* notifies the detected RARP to the OFC 3 (Step S302). In detail, the OFS 4*i* receives the packet data in the RARP transmission from the migration destination VM in the operating condition, and notifies the reception of the first packet to the OFC 3, because the flow (rule) adapted for the packet data is not set. At this time, the OFS 4*i* notifies the packet data or a MAC address contained in the packet data to the OFC 3. The OFC 3 selects the communication route corresponding to the notified MAC address as the communication route for the migration destination VM and generates a communication flow for the migration destination VM. Here, the packet data in the RARP communication is transferred from the OFS 4*i* and the OFC 3 acquires the MAC address of the VM 20*m* in the RARP transmission.

The OFC 3 selects the communication route (communication route data 336) corresponding to RARP (MAC address) which is notified at the step S302 of the valid communication route data 336 (S303). Here, the communication route which passes RARP (MAC address) is selected from the communication route for the migration destination VM which is calculated at the step S109. Next, the OFC 3 sets the communication flow for the migration destination VM which is generated at the step S110 to the OFS 4*i* and nodes on the selected communication route (Step S304 to S307). In detail, the OFC 3 extracts the OFS 4*i* and nodes on the selected communication route for the migration destination VM from the communication route data 336 and the topology data 335 and selects the communication flow for the migration destination VM corresponding to each of the extracted OFS 4*i* and nodes (Step S304). The OFC 3 issues the setting instruction of the communication flow for the migration destination VM which is selected every OFS 4*i* (Step S305). The OFS 4*i* sets the transmitted communication flow for the migration destination VM in response to the setting instruction of the communication flow for the migration destination VM to its own flow table 343 (Step S306). When the setting of the flow is completed, the OFS 4*i* notifies a flow setting completion report to the OFC 3 (Step S307). The setting data 446 of the communication flow for the migration destination VM set to the OFS 4*i* is set to an "already set" and "valid" state.

The OFC 3 sets the communication flow for the migration destination VM to the OFS 4*i* and nodes on the communication route for the migration destination VM, and generates the flow to connect between the migration destination VM and the virtual switch 21 by using the topology data 335, when confirming the setting completion (Step S308). The OFC 3 sets the generated flow to the virtual switch 21 (Steps S309 and S310). In detail, the OFC 3 issues the setting instruction of the flow generated at the step S308 to the virtual switch 21 (Step S309). The virtual switch 21 sets the flow transmitted from the OFC 3 to its own flow table 343 in response to the setting instruction of the flow (Step S310). When the setting of the flow is completed, the virtual switch 21 notifies the flow setting completion report to the OFC 3 (Step S311). The setting data 446 of the communication flow for the migration destination VM set to the virtual switch 21 is set to an "already set" or "valid" state.

When confirming the setting completion of the flow which connects the migration destination VM 20*m* and the virtual switch 21, the OFC 3 selects the flow for the migration source VM and issues the deletion instruction of the flow (Steps S312 and S313). The OFS 4*i* and nodes set the flow for the migration source VM to a deletion or use impossible state (Step S314). The OFS 4*i* and nodes in which the deletion of the flow is ended notify a flow deletion completion report to the OFC 3 (Step S315). When confirming the deletion of the flow for the migration source VM in the OFS 4*i* and nodes on the communication route for the migration source VM, the OFC 3 sets the communication flow for the migration destination VM as the current use flow and sets the communication flow for the migration source VM as a non-use flow (Step S316). Here, the data showing the use or non-use (valid or invalid) is set in the setting data 446 corresponding to each flow (rule 444+action data 445). At this time, the unused communication flow for the migration source VM may be deleted from the flow table 334. However, by setting the use or non-use (validation or invalidation) of the flow by the change of the setting data 446 without deleting the unused flow, the setting of the flow becomes possible without generating a flow once again when returning the migrated virtual machine to the original physical server or VMM.

Since then, the communication for the migration destination VM 20*m* is executed to the VMM 20 which operates on the physical server 6 (VMM 20) according to the communication flow for the migration destination VM set to each OFS 4*i*.

As mentioned above, according to the migration method of the present invention, the migration of the virtual machine becomes possible without stopping the communication with the virtual machine. In the present exemplary embodiment, the migration between the different physical servers has been described as an example, but the migration in the identical physical server can be realized by the similar method.

Also, according to the present invention, the setting for the transfer of the memory image and the setting for the communication with the migration destination VM can be carried out integratedly by the integrated management apparatus 1. That is, the migration of the virtual machine can be controlled by one management apparatus. Therefore, according to the present invention, the computer system which is separately managed conventionally by the network manager and the IT manager can be managed by one management apparatus.

It should be noted that when the virtual switch 21 is a virtual switch which carries out a usual switching operation (layer 2), the processing of the steps S308 to S311 is omitted.

(2) Second Implementation Example

Next, referring to FIG. 29, FIG. 31 and FIG. 32, the migration method of the virtual machine in the computer system according to the second implementation example of the present invention will be described.

In the migration method of the virtual machine of the second implementation example, the communication flow for the migration destination VM is set to the OFS 4*i* at the step of the migration preparation processing. Thus, the packet data for the migration object VM is duplicated and is transferred to both of the migration source VM and the migration destination VM. In the first implementation example, because the communication flow for the migration destination VM is set after the memory image transfer processing of the migration object VM, the packet loss would sometimes occur in the period from the stop of the migration destination VM to the setting of the communication flow for the migration object VM (switching of the access destination to the migration object VM). However, in the second implementation example, because both of the flow for the migration source VM and the flow for the migration destination VM are set in the step of the migration preparation, the occurrence of the packet loss when switching the access destination to the migration destination VM can be prevented.

Figure 31:
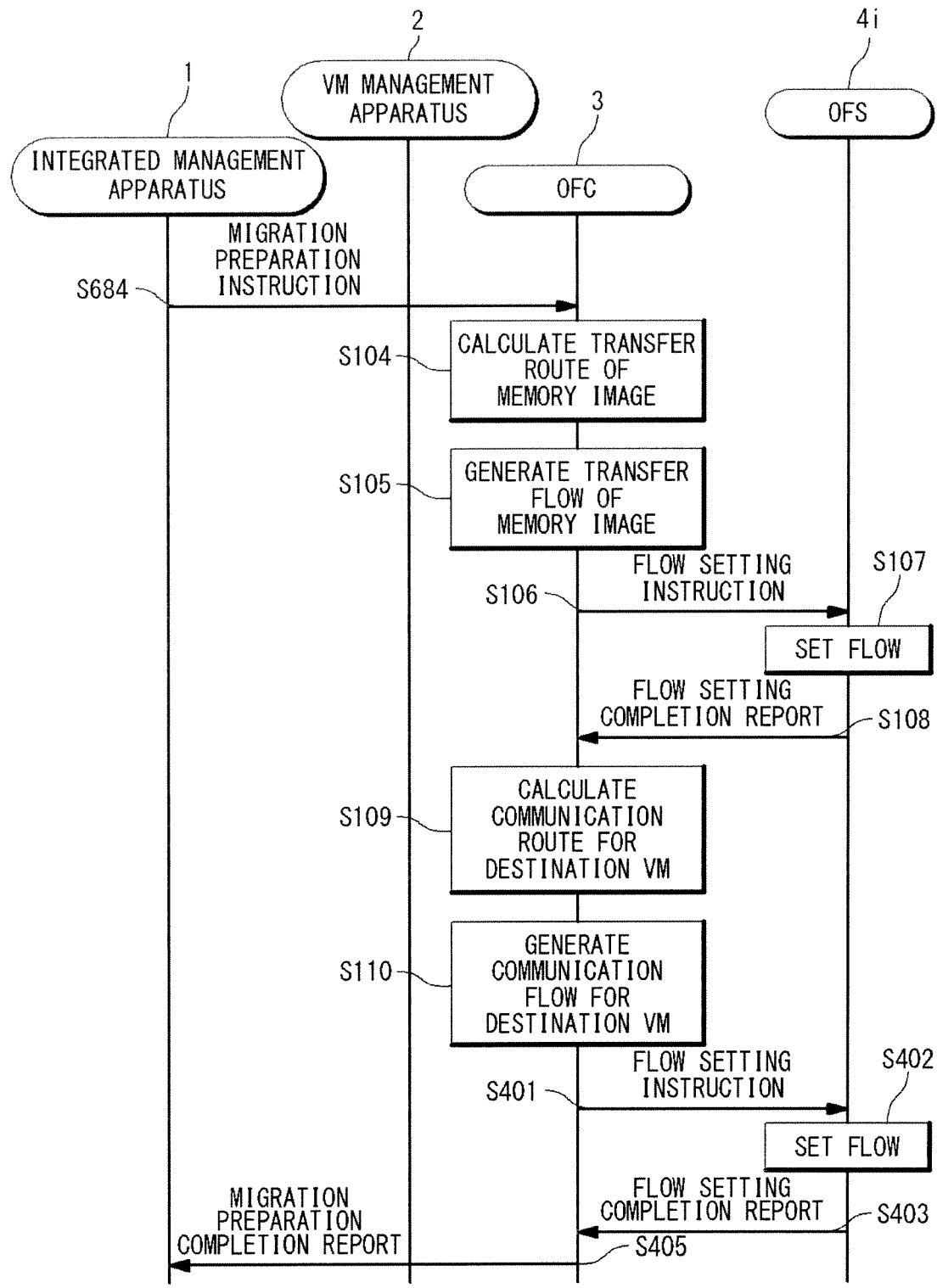
FIG. 31 is a sequence diagram showing the migration preparation processing in the second implementation example in case of migration processing by the virtual machine.

FIG. 31 is a sequence diagram showing the migration preparation processing in the migration processing by the virtual machine at the step S685 shown in FIG. 18B in the second implementation example. Referring to FIG. 31, in the migration preparation processing of the second implementation example, the processing of the step S684 and S104 to S110 is first carried out, like the first implementation example. In the second exemplary embodiment, the OFC 3 sets a communication flow for the migration destination VM to each OFS 4*i* in the migration preparation processing (Step S401 to S403). In detail, the OFC 3 extracts the OFS 4*i* and nodes on the communication route for the migration destination VM which is selected based on the communication route data 336 and the topology data 335 and selects the communication flow for the migration destination VM corresponding to each of the communication flows. Then, the OFC 3 issues the setting instruction of the communication flow for the migration destination VM which is selected every OFS 4*i* (Step S401). The OFS 4*i* sets the transmitted communication flow for the migration destination VM to its own flow table 343 in response to the setting instruction of the communication flow for the migration destination VM (Step S402). When the setting of the flow is completed, the OFS 4*i* notifies the flow setting completion report to the OFC 3 (Step S403). The setting data 446 of the communication flow for the migration destination VM set to the OFS 4*i* is set to the "already set" or "valid" state.

When the setting of the communication flow for the migration destination VM is completed, the OFC 3 reports that the migration preparation processing is completed, to the integrated management apparatus 1 (Step S405).

As mentioned above, in the migration preparation processing of the second exemplary embodiment, the transfer route of the memory image of the migration object VM and the setting of the flow for controlling the migration, and the setting of the communication route for the access to the migration destination VM and the setting of the flow for controlling the communication are carried out. In the second exemplary embodiment, when the setting of the memory image transfer flow and the communication flow for the migration destination VM to the OFS 4*i* are completed, the migration preparation processing is completed.

Referring to FIG. 29, in the image transfer processing of the second implementation example, the processing (memory image transfer processing) at the step S686 and the steps S202 to S207 is first carried out, like the first exemplary embodiment. When the access to another virtual machine other than the migration object VM (e.g. the data transfer) occurs during the memory image transfer processing, the OFS 4*i* according to the access executes the action (for example, the relay processing of data) corresponding to the header data of the reception packet according to the flow set to its own flow table 343. In this case, by setting the memory image transfer route so as not to hinder the access to the other virtual machine not related to the migration, the migration object VM can be migrated without hindering communication with the other virtual machine.

On the other hand, when the access to the migration object VM occurs during the memory image transfer processing (for example, when data for the migration object VM is transferred), the OFS 4*i* on the communication route to the migration object VM executes the action (for example, are the relay processing of data) corresponding to the header data of the reception packet according to the flow set to its own flow table 343. In the present exemplary embodiment, because the flow is set, supposing that the migration object VM is operating on the VMM 10 and the VMM 20, the data for the migration object VM is copied and is transferred to both of the migration object VM (migration source VM) on the physical server 5 and the migration destination VM generated on the physical server 6. The migration source VMM 10 stores the memory page of the migration object VM in the data for transferred migration object VM. At this time, the transferred data for migration object VM is stored in the memory page of the migration destination VM, in the migration destination VMM 20, too.

During the memory image transfer processing, the memory page is sometimes changed due to the process processing by the migration object VM and the data which is transferred for the migration object VM. The changed memory page is stored in the changed page record area of the storage unit as a copy object (Step S208). It is desirable that the record processing of a changed page is carried out until the migration destination VM starts the operation.

Since then, the same processing as in the first implementation example is carried out from the record (Step S208) of the changed page to the operation (Step S216) of the migration destination VM.

As mentioned above, in the migration method of the second implementation example, the transfer of the memory image of the VM is carried out by using the route (memory image transfer route) which is specified by the integrated management apparatus 1, like the first implementation example. At this time, because the access to the migration source VM is carried out according to the flow set to the OFS group 4 before the migration processing, the memory image of the VM can be transferred without stopping the communication with the migration source VM. Also, because the memory image transfer route can be optionally set by the integrated management apparatus 1, the route can be selected so as not to obstruct the communication with the other virtual machine. Thus, the transfer of the memory image which does not influence the communication with the other virtual machine becomes possible.

FIG. 32 is a sequence diagram showing the access destination switching processing in the second implementation example in case of the migration processing of the virtual machine. Referring to FIG. 32, in the access destination switching processing of the second implementation example, the channel selection processing at steps S301 to S301 is first carried out, like the first implementation example. Next, because the setting processing (Steps S304 to S307) of the communication flow for the migration destination VM to the OFS 4i which is carried out in the first implementation example is executed in case of the migration preparation processing, the description is omitted in the second implementation example.

Since then, the processing is carried out from the generation processing (Step S308) of the flow to connect between the migration destination VM and the virtual switch 21 to the flow setting processing (Step S316), like the first implementation example.

As mentioned above, in the second exemplary embodiment, when in the migration preparation processing, both of the flow for the migration source VM and the flow for the migration destination VM are set. Therefore, the data transferred for the migration object VM reaches the migration destination VM without being discarded in the period from the stop of the migration source VM at the step S213 to the flow setting at the step S316. In this way, in the computer system of the present exemplary example, the packet loss in the migration of the virtual machine can be prevented. Also, it is never conscious of the migration of the virtual machine from the external network 8.

Moreover, in the second implementation example, the flow (communication flow for the migration destination VM) corresponding to a new communication route (communication route for the migration destination VM) after the migration of the VM is set in the migration preparation processing. Therefore, the time for establishing the new communication route in the second implementation example can be reduced, compared with the first implementation example in which the new communication route is established after detecting the migration of the VM.

The load balancer 9 may change the load assignment such that the processing (access) to the migration source VM is not generated during the migration processing. Thus, because a processing quantity of the record and transfer of the changed page is reduced, the time of the VM migration is reduced. Also, during the transfer of the memory page of the migration object VM, the load to the migration source VM decreases.

In the above, the exemplary embodiments of the present invention are described in detail. Specific configuration is not limited to the above exemplary embodiments. The configuration is contained in the present invention even if there is a change of a range which does not deviate from the point of the present invention. A method of maintenance processing in the first to fourth exemplary embodiments and a method for the VM migration processing in the first to second implementation examples can be applied by technically combining them in a range where there is not contradiction.

In case of the VM migration processing, the OFC 3 carries out the "selection of the communication route for the migration destination VM" and the "confirmation of the change of the migration destination of the VM" by using the MAC address which is notified in the RARP transmission. However, the present invention is not limited to this. When receiving the packet data transmitted by the migration destination VM which is in the operating condition after the migration processing, for example, the OFS 4i notifies the reception of the first packet to the OFC 3 because the flow (rule) matching to the packet data is not set. At this time, the OFS 4i notifies the MAC address of the packet data to the OFC 3. The OFC 3 selects the communication route corresponding to the notified MAC address as the communication route for the migration destination VM and generates the communication flow for the migration destination VM. Or, in the same way, the OFC 3 may extract the communication route having the MAC address acquired from the report of the first packet as the endpoint, and confirm the change of the connection destination of the reception, by detecting that the connection destination of the VM as an endpoint on the communication route and the switch by which the packet data is received are different.

Also, the migration preparation processing of the VM migration processing may be carried out according to a first packet receipt report (RARP detection report) from the OFS 4i. In this case, the preparation instruction at the steps S684 and S685 and the migration preparation processing are omitted.

It should be noted that this patent application claims a priority based on Japanese Patent Application No. 2009-233095, and the disclosure thereof is incorporated herein by reference.

The invention claimed is:

1. A computer system comprising a physical server connected through a switch, comprising:
   a switch configured to transfer received packet data for a destination node based on a flow set to said switch itself;
   an integrated management apparatus configured to specify a maintenance object unit; and
   a controller configured to shutdown said maintenance object unit to separate from said computer system by controlling setting of a flow to said switch or deletion of the flow set to said switch,
   wherein each of said destination node and said maintenance object unit is defined by an IP (Internet Protocol) address or a MAC (Media Access Control) address,
   wherein said flow is defined by a rule and an action for processing said action to a packet matching with said rule,
   wherein, when said maintenance object unit comprises a switch, said integrated management apparatus issues a route detour instruction to said controller,
   wherein said controller calculates a detour route which goes around said maintenance object unit in response to said route detour instruction, sets a flow corresponding to said detour route to the switch on said detour route, and deletes the flow corresponding to a communication route before detour set to the switch on said detour route,
   wherein when said maintenance object unit comprises the switch, said controller verifies whether said detour route can be calculated in response to the route detour instruction,
   wherein said integrated management apparatus instructs a VM (Virtual Machine) management apparatus to migrate a virtual machine which operates at an endpoint which said detour route cannot be calculated by using topology data from which said maintenance object unit is excluded,
   wherein said VM management apparatus migrates said virtual machine to the migration destination which is specified by said integrated management apparatus, and
   wherein said controller sets to said switch, the flow for transferring packet data for said virtual machine to said virtual machine of the migration destination.

2. The computer system according to claim 1, further comprising:
   a server management apparatus configured to notify data of a cluster of a server specified by said integrated management apparatus to said integrated management apparatus,
   wherein said integrated management apparatus changes a separating method of said server specified as said maintenance object unit based on a condition of said server specified as said maintenance object unit in said cluster.

3. The computer system according to claim 2, further comprising:
a clustering mechanism configured to switch the condition of said server set to said cluster to either of an operating system and a standby system,
wherein said controller sets a flow corresponding to said communication route having as the endpoint, a server of the standby system to be switched to the operating system, to a switch on said communication route, before the condition of said server is switched from the operating system to the standby system.

4. The computer system according to claim 3, wherein, when the specified maintenance object unit comprises said server of the operating system, said controller sets a flow corresponding to a first communication route having as the endpoint, said server of the standby system which is to be switched to the operating system, to a switch on said first communication route, before a condition of said maintenance object unit is switched from the operating system to the standby system.

5. The computer system according to claim 3, wherein said controller sets, after the condition of said maintenance object unit is switched from the operating system to the standby system, the flow corresponding to a second communication route having said maintenance object unit as the endpoint, to a switch on a second communication route.

6. The computer system according to claim 2,
wherein said VM management apparatus is configured to manage a virtual machine monitor which operates on said physical server,
wherein, when the specified maintenance object unit comprises a single server on which said virtual machine monitor operates, said integrated management apparatus instructs said VM management apparatus to migrate said virtual machine which operates on said single server.

7. The computer system according to claim 2, further comprising:
a load balancer configured to carry out a load distribution to said server set to a load distribution cluster,
wherein, when the specified maintenance object unit comprises a server set to said load distribution cluster, said integrated management apparatus instructs said load balancer to stop assignment of a load to said maintenance object unit,
wherein said load balancer stops the assignment of the load to said maintenance object unit, and
wherein said integrated management apparatus instructs said server management apparatus to carry out maintenance processing to said maintenance object unit, when it is confirmed by said controller that a flow related to the data transfer to said maintenance object unit is not set to said switch.

8. The computer system according to claim 7, wherein the flow set to said switch is deleted from said switch after elapse of a predetermined time period, so that the flow is not set to said switch, and
wherein said controller sets the time period to said switch when setting the flow to said switch, and stores a setting situation of the flow to said switch in its own flow table.

9. A computer system comprising a physical server connected through a switch, comprising:
a switch configured to transfer received packet data for a destination node based on a flow set to said switch itself;
an integrated management apparatus configured to specify a maintenance object unit;
a controller configured to shutdown said maintenance object unit to separate from said computer system by controlling setting of a flow to said switch or deletion of the flow set to said switch,
wherein each of said destination node and said maintenance object unit is defined by an IP (Internet Protocol) address or a MAC (Media Access Control) address,
wherein said flow is defined by a rule and an action for processing said action to a packet matching with said rule,
wherein, when said maintenance object unit comprises a switch, said integrated management apparatus issues a route detour instruction to said controller, and
wherein said controller calculates a detour route which goes around said maintenance object unit in response to said route detour instruction, sets a flow corresponding to said detour route to the switch on said detour route, and deletes the flow corresponding to a communication route before detour set to the switch on said detour route; and
a server management apparatus configured to control a change of a cluster set to said server,
wherein, when said maintenance object unit comprises the switch, said controller verifies whether or not said detour route can be calculated in response to the route detour instruction, and
wherein said integrated management apparatus instructs said server management apparatus to change the cluster set to an endpoint for which said detour route cannot be calculated by using topology data from which said maintenance object unit is excluded.

10. A maintenance method executed by a computer system which comprises a physical server connected through a switch for transferring received packet data to a destination node based on a flow set to said switch itself, said maintenance method comprising:
an integrated management apparatus specifying maintenance object unit; and
a controller shutting down said maintenance object unit to separate from said computer system by controlling setting of a flow to said switch or deletion of the flow set to said switch,
wherein said separating said maintenance object unit from said computer system comprises said integrated management apparatus issuing a route detour instruction to said controller, when said maintenance object unit comprises a switch,
wherein said controller calculates a detour route which goes around said maintenance object unit in response to said route detour instruction,
wherein said controller setting a flow corresponding to said detour route to the switch on said detour route,
wherein said controller deleting the flow corresponding to a communication route before detour set to the switch on said detour route, and
wherein said separating said maintenance object unit from said computer system comprises:
said controller verifying whether or not said detour route can be calculated in response to said route detour instruction, when said maintenance object unit comprises the switch;
said integrated management apparatus instructing a server management apparatus to change a cluster set to an endpoint in which the detour route cannot be calculated by using topology data in which said maintenance object unit is excluded; and said server management apparatus controlling the change of the cluster set to said server corresponding to the endpoint.

11. A maintenance method executed by a computer system which comprises a physical server connected through a switch for transferring received packet data to a destination node based on a flow set to said switch itself, said maintenance method comprising:
- an integrated management apparatus specifying maintenance object unit; and
- a controller shutting down said maintenance object unit to separate from said computer system by controlling setting of a flow to said switch or deletion of the flow set to said switch,
- wherein said separating said maintenance object unit from said computer system comprises said integrated management apparatus issuing a route detour instruction to said controller, when said maintenance object unit comprises a switch,
- wherein said controller calculates a detour route which goes around said maintenance object unit in response to said route detour instruction,
- wherein said controller setting a flow corresponding to said detour route to the switch on said detour route,
- wherein said controller deleting the flow corresponding to a communication route before detour set to the switch on said detour route, and
- wherein said separating said maintenance object unit from said computer system comprises:
- said controller verifying whether or not said detour route can be calculated in response to said route detour instruction when said maintenance object unit comprises the switch;
- said integrated management apparatus instructing a VM (Virtual Machine) management apparatus to migrate a virtual machine which operates at an endpoint in which the detour route cannot be calculated by using topology data in which said maintenance object unit is excluded;
- said VM management apparatus migrating said virtual machine to a migration destination which is specified by said integrated management apparatus; and
- said controller setting the flow for transferring the packet data for said virtual machine to said virtual machine of the migration destination to said switch.

12. The maintenance method according to claim 11, further comprising:
- a server management apparatus notifying data of a cluster of a server specified by said integrated management apparatus to said integrated management apparatus; and
- said integrated management apparatus changing a separation method of the server specified as said maintenance object unit based on a condition of said server specified as said maintenance object unit in said cluster.

13. The maintenance method according to claim 12, further comprising:
- switching the condition of said server set to the cluster from an operating system to a standby system; and
- said controller setting a flow corresponding to said communication route having the endpoint, a server of the standby system switched to the operating system, to the switch on said communication route, before the condition of said server is switched from the operating system to the standby system.

14. The maintenance method according to claim 13, wherein said setting the flow comprises:
- setting, when the specified maintenance object unit comprises said server of the operating system, a flow corresponding to a first communication route having as the endpoint, said server of the standby system which is switched to the operating system, to a switch on said first communication route, before a condition of said maintenance object unit is switched from the operating system to the standby system.

15. The maintenance method according to claim 13, wherein said setting said flow comprises:
- said controller setting, after the condition of the maintenance object unit is switched from the operating system to the standby system, a flow corresponding to a second communication route having said maintenance object unit as the endpoint to said switch on said second communication route.

16. The maintenance method according to claim 12, wherein said separating said maintenance object unit from said computer system comprises:
- said integrated management apparatus instructing said VM management apparatus to migrate said maintenance object unit to migrate a virtual machine which operates on said single server when the specified maintenance object unit comprises a single server on which said virtual machine monitor operates.

17. The maintenance method according to claim 12, wherein said separating said maintenance object unit from said computer system comprises:
- said integrated management apparatus instructing, when the specified maintenance object unit comprises a server set to a load distribution cluster, a load balancer to stop assignment of a load to said maintenance object unit; and
- said load balancer stopping the assignment of the load to said maintenance object unit, and
- wherein said integrated management apparatus instructs said server management apparatus to carry out maintenance processing to said maintenance object unit, when it is confirmed by said controller that a flow related to the data transfer to said maintenance object unit is not set to said switch.

18. The maintenance method according to claim 17, wherein the flow set to said switch is deleted from said switch after elapse for a predetermined time to be set to a non-set condition, and
- wherein said maintenance method further comprises:
- said controller setting said time to the non-set condition to said switch when setting the flow to said switch; and
- said controller storing a setting situation of the flow to said switch in its own flow table.

\* \* \* \* \*